US012776280B1

(12) United States Patent
Cao et al.

(10) Patent No.: US 12,776,280 B1
(45) Date of Patent: Oct. 27, 2026

(54) DISPLAY PANEL AND DISPLAY DEVICE

(71) Applicant: Guangzhou China Star Optoelectronics Semiconductor Display Technology Co., LTd., Guangzhou (CN)

(72) Inventors: Weiran Cao, Guangzhou (CN); Jun Zhao, Guangzhou (CN); Shan Li, Guangzhou (CN); Yuanjun Hsu, Guangzhou (CN); Kai He, Guangzhou (CN); Shimin Ge, Guangzhou (CN); Baixiang Han, Guangzhou (CN)

(73) Assignee: GUANGZHOU CHINA STAR OPTOELECTRONICS SEMICONDUCTOR DISPLAY TECHNOLOGY CO., LTD., Guangzhou (CN)

( * ) Notice: Subject to any disclaimer, the term of this patent is extended or adjusted under 35 U.S.C. 154(b) by 0 days.

(21) Appl. No.: 19/287,523

(22) Filed: Jul. 31, 2025

(30) Foreign Application Priority Data

Apr. 23, 2025 (CN) ........................ 202510517934.0

(51) Int. Cl.
*G09G 3/3266* (2016.01)

(52) U.S. Cl.
CPC ... *G09G 3/3266* (2013.01); *G09G 2300/0426* (2013.01)

(58) Field of Classification Search
CPC .................... G09G 3/3266; G09G 2300/0426
USPC ................................................ 345/204–211
See application file for complete search history.

(56) References Cited

U.S. PATENT DOCUMENTS

2010/0012940 A1* 1/2010 Sato .................. H10D 30/6734 438/22
2024/0046872 A1* 2/2024 Yang ........................ G09G 3/20
2025/0140203 A1* 5/2025 Park ..................... G09G 3/3266
2025/0209979 A1* 6/2025 Zhang ...................... G09G 3/32

FOREIGN PATENT DOCUMENTS

CN 117612475 A 2/2024
CN 119626129 A * 3/2025 .............. G09G 3/32

OTHER PUBLICATIONS

European Office Action issued in corresponding European Patent Application No. 25215501.5 dated Apr. 16, 2026, pp. 1-14.

* cited by examiner

*Primary Examiner* — Kwin Xie
(74) *Attorney, Agent, or Firm* — PV IP PC; Wei Te Chung

(57) ABSTRACT

A display panel and a display device are provided. In the display panel, at least one of a first clock signal line, a second clock signal line, a third clock signal line, a first high potential signal line, a second high potential signal line, a first low potential signal line, a second low potential signal line, a second reset control line, and a low-frequency signal line is arranged between a first reset control line and a third low potential signal line in a first direction. The display device includes the display panel.

20 Claims, 22 Drawing Sheets

DISPLAY PANEL AND DISPLAY DEVICE

CROSS-REFERENCE TO RELATED APPLICATION

This application claims priority to Chinese Patent Application No. 202510517934.0, filed on Apr. 23, 2025. The disclosure of which is herein incorporated by references in its entirety.

TECHNICAL FIELD

The present disclosure relates to the field of display technologies, and in particular, to a display panel and a display device.

BACKGROUND

Organic light-emitting diode (OLED) display devices are widely used in various fields because of their lightweight, wide viewing angle, low power consumption, fast response speed, low temperature resistance, high luminous efficiency, and the ability to prepare curved flexible display screens. In order to reduce the number of driving chips, reduce the bezel, and reduce costs, gate driving circuits will be used instead of gate driving chips to drive the pixel circuits. The gate driving circuits include thin film transistor setting regions and signal wiring regions. Thin film transistors are disposed in the thin film transistor setting regions. Signal wirings are disposed in the signal wiring regions. The signal wirings are connected to the thin film transistors through connecting wires. However, during actual use, it was found that a space occupied by the gate driving circuits is relatively large. Moreover, as a resolution of the OLED display device increases, the number of stages of the gate driving circuits increases, a vertical space occupied by the gate driving circuits is reduced, and a lateral space occupied by the gate driving circuits is further increased, resulting in a relatively large bezel of the display panel.

SUMMARY

According to a first aspect of the present disclosure, a display panel is provided. The display panel includes:

- a plurality of rows of pixels including light-emitting devices and pixel driving circuits; and
- a plurality of stages of gate driving circuits, where each of the plurality of stages of the gate driving circuits is electrically connected to a corresponding one of the pixel driving circuits and includes a first-type gate circuit, a second-type gate circuit, and a third-type gate circuit, the first-type gate circuit is electrically connected to at least a first clock signal line, a second clock signal line, a first high potential signal line, a first low potential signal line, a second low potential signal line, a first reset control line, and a low-frequency signal line, and the second-type gate circuit is electrically connected to at least the first high potential signal line, the second low potential signal line, a third clock signal line of the display panel, and a second reset control line of the display panel, and the third-type gate circuit is electrically connected to at least the first high potential signal line, a second high potential signal line, the second low potential signal line, and a third low potential signal line.

The first reset control line, the first-type gate circuit, the second-type gate circuit, the third-type gate circuit, and the third low potential signal line are arranged along a first direction. In the first direction, at least one of the first clock signal line, the second clock signal line, the third clock signal line, the first high potential signal line, the second high potential signal line, the first low potential signal line, the second low potential signal line, the second reset control line, and the low-frequency signal line is arranged between the first reset control line and the third low potential signal line.

According to a second aspect of the present disclosure, a display device is provided. The display device includes the display panel according to any of the above-described embodiments.

DESCRIPTION OF REFERENCE SIGNS ARE AS FOLLOWS

Figure 1:
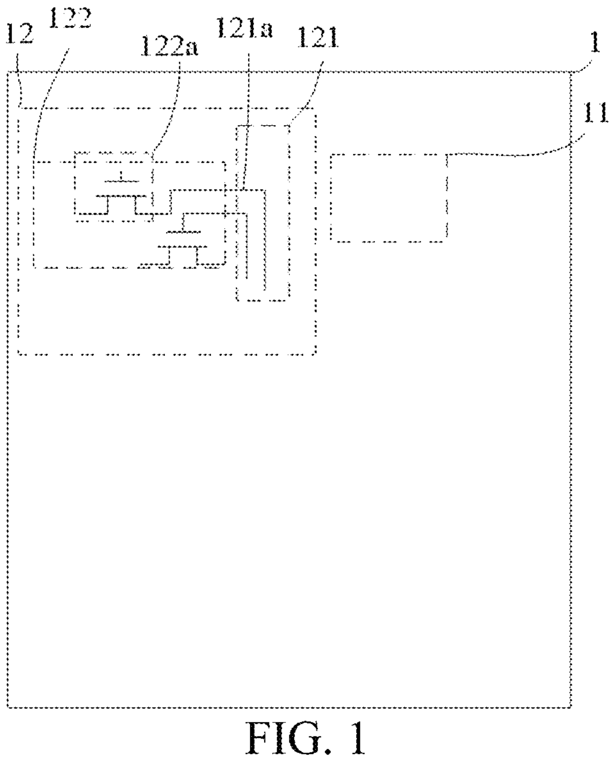
FIG. 1 is a schematic view of a comparative display device.

1, comparative display device; 11, pixel circuit; 12, gate circuit; 121, wiring region; 122, transistor region; 121*a*, signal wiring; 122*a*, thin film transistor.

2, display panel; 201, display region; 202, non-display region; 21, pixel driving circuit; 22, gate driving circuit; 22*a*, first-type gate circuit; 22*b*. second-type gate circuit; 22*c*, third-type gate circuit.

211, substrate; 212, light shielding layer; 213, buffer layer; 214, semiconductor layer; 215, first gate insulating layer; 216, active layer; 217, second gate insulating layer; 218, gate layer; 219, first interlayer insulating layer; 221, first source-drain layer; 222, second interlayer insulating layer; 223, second source-drain layer; 224, passivation layer; 225, third source-drain layer; 226, first planarization layer; 227, second planarization layer; 228, pixel electrode layer; 229, first pixel definition layer; 231, second pixel definition layer; 411, first via hole; 412, second via hole; T1, driving transistor; T2, switching transistor; T3, reset transistor; T4, initialization transistor.

VST1, first reset control line; VST2, second reset control line; VGH1, first high potential signal line; VGH2, second high potential signal line; VGL1, first low potential signal line; VGL2, second low potential signal line; VGL3, third low potential signal line; LC, low-frequency signal line; CKA, first clock signal line; CKA1, first clock first line; CKA2, first clock second line; CKA3, first clock third line; CKA4, first clock fourth line; CKB, second clock signal line; CKBi, first group of sub-lines; CKBj, second group of sub-lines; CKB1, second clock first line; CKB2, second clock second line; CKB3, second clock third line; CKB4, second clock fourth line; CKB5, second clock fifth line; CKB6, second clock sixth line; CKB7, second clock seventh line; CKB8, second clock eighth line; CKC, third clock signal line; CKC1, third clock first line; CKC2, third clock second line; CKC3, third clock third line; CKC4, third clock fourth line.

VST1*a*, first portion of first reset control line; VST1*b*, second portion of first reset control line; VST1*c*, third portion of first reset control line; VST2*a*, first portion of second reset control line; VST2*b*, second portion of second reset control line; VST2*c*, third portion of second reset control line; VGH1*a*, first portion of first high potential signal line; VGH1*b*, second portion of first high potential signal line; VGH1*c*, third portion of first high potential signal line; VGH2*a*, first portion of second high potential signal line; VGH2*b*, second portion of second high potential signal line; VGH2*c*, third portion of second high potential signal line; VGL1*a*, first portion of first low potential signal line; VGL1*b*, second portion of first low potential signal line; VGL1*c*, third portion of first low potential signal line; VGL2*a*, first portion of second low potential signal line; VGL2*b*, second portion of second low potential signal line; VGL2*c*, third portion of second low potential signal line; VGL3*a*, first portion of third low potential signal line; VGL3*b*, second portion of third low potential signal line; VGL3*c*, third portion of third low potential signal line; LCa, first portion of low-frequency signal line; LCb, second portion of low-frequency signal line; LCc, third portion of low-frequency signal line; CKAa, first portion of first clock signal line; CKAb, second portion of first clock signal line; CKAc, third portion of first clock signal line; CKA1*a*, first portion of first clock first line; CKA1*b*, second portion of first clock first line; CKA1*c*, third portion of first clock first line; CKA2*a*, first portion of first clock second line; CKA2*b*, second portion of first clock second line; CKA2*c*, third portion of first clock second line; CKA3*a*, first portion of first clock third line; CKA3*b*, second portion of first clock third line; CKA3*c*, third portion of first clock third line; CKA4*a*, first portion of first clock fourth line; CKA4*b*, second portion of first clock fourth line; CKA4*c*, third portion of first clock fourth line; CKBa, first portion of second clock signal line; CKBb, second portion of second clock signal line; CKBc, third portion of second clock signal line; CKBia, first portion of first group of sub-lines; CKBib, second portion of first set of sub-lines; CKBic, third portion of first group of sub-lines; CKBja, first portion of second group of sub-lines; CKBjb, second portion of second group of sub-lines; CKBjc, third portion of second group of sub-lines; CKB1*a*, first portion of second clock first line; CKB1*b*, second portion of second clock first line; CKB1*c*, third portion of second clock first line; CKB2*a*, first portion of second clock second line; CKB2*b*, second portion of second clock second line; CKB2*c*, third portion of second clock second line; CKB3*a*, first portion of second clock third line; CKB3*b*, second portion of second clock third line; CKB3*c*, third portion of second clock third line; CKB4*a*, first portion of second clock fourth line; CKB4*b*, second portion of second clock fourth line; CKB4*c*, third portion of second clock fourth line; CKB5*a*, first portion of second clock fifth line; CKB5*b*, second portion of second clock fifth line; CKB5*c*, third portion of second clock fifth line; CKB6*a*, first portion of second clock sixth line; CKB6*b*, second portion of second clock sixth line; CKB6*c*, third portion of second clock sixth line; CKB7*a*, first portion of second clock seventh line; CKB7*b*, second portion of second clock seventh line; CKB7*c*, third portion of second clock seventh line; CKB8*a*, first portion of second clock eighth line; CKB8*b*, second portion of second clock eighth line; CKB8*c*, third portion of second clock eighth line; CKCa, first portion of third clock signal line; CKCb, second portion of third clock signal line; CKCc, third portion of third clock signal line; CKC1*a*, first portion of third clock first line; CKC1*b*, second portion of third clock first line; CKC1*c*, third portion of third clock first line; CKC2*a*, first portion of third clock second line; CKC2*b*, second portion of third clock second line; CKC2*c*, third portion of third clock second line; CKC3*a*, first portion of third clock third line; CKC3*b*, second portion of third clock third line; CKC3*c*, third portion of third clock third line; CKC4*a*, first portion of third clock fourth line; CKC4*b*, second portion of third clock fourth line; CKC4*c*, third portion of third clock fourth line.

311, first pull-up control module; 312, first pull-up module; 313, first pull-down module; 314, first pull-down maintaining module; 315, first inverter module; 316, first anti-negative bias module; 317, first reset module; T11*j*, first pull-up control transistor; T12*j*, second pull-up control transistor; T81*j*, third pull-up control transistor; T81*j*1, first pull-up control sub-transistor; T81*j*2, second pull-up control sub-transistor; T21*j*, first pull-up transistor; T22*j*, second pull-up transistor; T23*j*, third pull-up transistor; T31*j*, first pull-down transistor; T32*j*, second pull-down transistor; T33*j*, third pull-down transistor; T41*j*, fourth pull-down transistor; T41*j*1, first pull-down sub-transistor; T41*j*2, second pull-down sub-transistor; T42*j*, first pull-down maintaining transistor; T42*j*1, first pull-down maintaining sub-transistor; T42*j*2, second pull-down maintaining sub-transistor; T51*j*, first inverter transistor; T51*j*1, first inverter sub-transistor; T51*j*2, second inverter sub-transistor; T52*j*, second inverter transistor; T53*j*, third inverter transistor; T54*j*, fourth inverter transistor; T55*j*, fifth inverter transistor; T71*j*, first anti-negative bias transistor; T71*j*1, first anti-negative bias sub-transistor; T71*j*2, second anti-negative bias sub-transistor; T43*j*, first reset transistor; T43*j*1, first reset sub-transistor; T43*j*2, second reset sub-transistor; C1, first capacitor; C11, first sub-capacitor; C12, second sub-capacitor; C13, third sub-capacitor; C14, fourth sub-capacitor.

T11*j*A, active portion of first pull-up control transistor; T12*j*A, active portion of second pull-up control transistor; T81*j*A, active portion of third pull-up control transistor; T81*j*1A, active portion of first pull-up control sub-transistor; T81*j*2A, active portion of second pull-up control sub-transistor; T21*j*A, active portion of first pull-up transistor; T22*j*A, active portion of second pull-up transistor; T23*j*A, active portion of third pull-up transistor; T31*j*A, active portion of first pull-down transistor; T32*j*A, active portion of second pull-down transistor; T33*j*A, active portion of third pull-down transistor; T41*j*A, active portion of fourth pull-down transistor; T41*j*1A, active portion of first pull-down transistor; T41*j*2A, active portion of second pull-down transistor; T42*j*A, active portion of first pull-down maintaining transistor; T42*j*1A, active portion of first pull-down maintaining sub-transistor; T42*j*2A, active portion of second pull-down maintaining sub-transistor; T51*j*A, active portion of first inverter transistor; T51*j*1A, active portion of first inverter sub-transistor; T51*j*2A, active portion of second inverter sub-transistor; T52*j*A, active portion of second inverter transistor; T53*j*A, active portion of third inverter transistor; T54*j*A, active portion of fourth inverter transistor; T55*j*A, active portion of fifth inverter transistor; T43*j*A, active portion of first reset transistor; T43*j*1A, active portion of first reset sub-transistor; T43*j*1A, active portion of second reset sub-transistor; T71*j*A, active portion of first anti-negative bias transistor; T71*j*1A, active portion of first anti-negative bias sub-transistor; T71*j*2A, active portion of second anti-negative bias sub-transistor.

T11*j*G, gate of first pull-up control transistor; T12*j*G, gate of second pull-up control transistor; T81*j*G, gate of third pull-up control transistor; T81*j*1G, gate of first pull-up control sub-transistor; T81*j*2G, gate of second pull-up control sub-transistor; T21*j*G, gate of first pull-up transistor; T22*j*G, gate of second pull-up transistor; T23*j*G, gate of third pull-up transistor; T31*j*G, gate of first pull-down transistor; T32*j*G, gate of second pull-down transistor; T33*j*G, gate of third pull-down transistor; T41*j*G, gate of fourth pull-down transistor; T41*j*1G, gate of first pull-down sub-transistor; T41*j*2G, gate of second pull-down sub-transistor; T42*j*G, gate of first pull-down maintaining transistor; T42*j*1G, gate of first pull-down maintaining sub-transistor; T42*j*2G, gate of second pull-down maintaining sub-transistor; T51*j*G, gate of first inverter transistor; T51*j*1G, gate of first inverter sub-transistor; T51*j*2G, gate of second inverter sub-transistor; T52*j*G, gate of second inverter transistor; T53*j*G, gate of third inverter transistor; T54*j*G, gate of fourth inverter transistor; T55*j*G, gate of fifth inverter transistor; T43*j*G, gate of first reset transistor; T43*j*1G, gate of first reset sub-transistor; T43*j*1G, gate of second reset sub-transistor; T71*j*G, gate of first anti-negative bias transistor; T71*j*1G, gate of first anti-negative bias sub-transistor; T71*j*2G, gate of second anti-negative bias sub-transistor.

T11*j*S, first electrode of first pull-up control transistor; T12*j*S, first electrode of second pull-up control transistor; T81*j*S, first electrode of third pull-up control transistor; T81*j*2S, first electrode of second pull-up control sub-transistor; T21*j*S, first electrode of first pull-up transistor; T22*j*S, first electrode of second pull-up transistor; T23*j*S, first electrode of third pull-up transistor; T31*j*S, first electrode of first pull-down transistor; T32*j*S, first electrode of second pull-down transistor; T33*j*S, first electrode of third pull-down transistor; T41*j*S, first electrode of fourth pull-down transistor; T41*j*1S, first electrode of first pull-down transistor; T41*j*2S, first electrode of second pull-down transistor; T42*j*S, first electrode of first pull-down maintaining transistor; T42*j*1S, first electrode of first pull-down maintaining sub-transistor; T42*j*2S, first electrode of second pull-down maintaining sub-transistor; T51*j*S, first electrode of first inverter transistor; T51*j*1S, first electrode of first inverter sub-transistor; T52*j*S, first electrode of second inverter transistor; T53*j*S, first electrode of third inverter transistor; T54*j*S, first electrode of fourth inverter transistor; T55*j*S, first electrode of fifth inverter transistor; T43*j*S, first electrode of first reset transistor; T43*j*1S, first electrode of first reset sub-transistor; T71, first electrode of first anti-negative bias transistor; T71*j*2S, first electrode of second anti-negative bias sub-transistor.

T11*j*D, second electrode of first pull-up control transistor; T12*j*D, second electrode of second pull-up control transistor; T81*j*D, second electrode of third pull-up control transistor; T81*j*1D, second electrode of first pull-up control sub-transistor; T81*j*2D, second electrode of second pull-up control sub-transistor; T21*j*D, second electrode of first pull-up transistor; T22*j*D, second electrode of second pull-up transistor; T23*j*D, second electrode of third pull-up transistor; T31*j*D, second electrode of first pull-down transistor; T32*j*D, second electrode of second pull-down transistor; T33*j*D, second electrode of third pull-down transistor; T41*j*D, second electrode of fourth pull-down transistor; T41*j*1D, second electrode of first pull-down transistor; T41*j*2D, second electrode of second pull-down transistor; T42*j*D, second electrode of first pull-down maintaining transistor; T42*j*2D, second electrode of second pull-down maintaining sub-transistor; T51*j*D, second electrode of first inverter transistor; T51*j*1D, second electrode of first inverter sub-transistor; T51*j*2D, second electrode of second inverter sub-transistor; T52*j*D, second electrode of second inverter transistor; T53*j*D, second electrode of third inverter transistor; T54*j*D, second electrode of fourth inverter transistor; T55*j*D, second electrode of fifth inverter transistor; T43*j*D, second electrode of first reset transistor; T43*j*1D, second electrode of first reset sub-transistor; T43*j*1D, second electrode of second reset sub-transistor; T71*j*D, second electrode of first anti-negative bias transistor; T71*j*1D, second electrode of first anti-negative bias sub-transistor; T71*j*2D, second electrode of second anti-negative bias sub-transistor; C11*a*, first electrode plate of first sub-capacitor; C11*a*1, first portion of first electrode plate of first sub-capacitor; C11*a*2, second portion of first electrode plate of first sub-capacitor; C11*b*, second electrode plate of first sub-capacitor; C12*a*, first electrode plate of second sub-capacitor; C12*a*1, first portion of first electrode plate of second sub-capacitor; C12*a*2, second portion of first electrode plate of second sub-capacitor; C12*b*, second electrode plate of second sub-capacitor; C13*a*, first electrode plate of third sub-capacitor; C13*a*1, first portion of first electrode plate of third sub-capacitor; C13*a*2, second portion of first electrode plate of third sub-capacitor; C13*b*, second electrode plate of fourth sub-capacitor; C14*a*, first electrode plate of fourth sub-capacitor; C14*a*1, first portion of first electrode plate of fourth sub-capacitor; C14*a*2, second portion of first electrode plate of fourth sub-capacitor; C14*b*, second electrode plate of fourth sub-capacitor.

Q1[*n*], first pull-up node; QB1[*n*], first pull-down node; N1[*n*], first internal node; Gn[n], first signal output terminal of first-type gate circuit of current stage; Gn[n−1], first signal output terminal of first-type gate circuit of upper stage; Gn[m], first signal output terminal of first-type gate circuit of another stage; Cout[n], stage transmission output terminal of first-type gate circuit of current stage; Cout[n−2], stage transmission output terminal of first-type gate circuit of upper two stages; Cout[n+2], stage transmission output terminal of first-type gate circuit of next two stages.

321, second pull-up control module; 322, second pull-up module; 323, second pull-down module; 324, second pull-down maintaining module; 325, second inverter module; 326, second anti-negative bias module; 327, second reset module; T11*i*, fourth pull-up control transistor; T12*i*, fifth pull-up control transistor; T81*i*, sixth pull-up control transistor; T81*i*1, third pull-up control sub-transistor; T81*i*2, fourth pull-up control sub-transistor; T21*i*, fourth pull-up transistor; T31*i*, fifth pull-down transistor; T41*i*, sixth pull-down transistor; T41*i*1, third pull-down sub-transistor; T41*i*2, fourth pull-down sub-transistor; T42*i*, second pull-down maintaining transistor; T42*i*1, third pull-down maintaining sub-transistor; T42*i*2, fourth pull-down maintaining sub-transistor; T51*i*, sixth inverter transistor; T51*i*1, third inverter sub-transistor; T51*i*2, fourth inverter sub-transistor; T52*i*, seventh inverter transistor; T53*i*, eighth inverter transistor; T54*i*, ninth inverter transistor; T55*i*, tenth inverter transistor; T61*i*, second anti-negative bias transistor; T61*i*1, third anti-negative bias sub-transistor; T61*i*2, fourth anti-negative bias sub-transistor; T43*i*, second reset transistor; T43*i*1, third reset sub-transistor; T4312, fourth reset sub-transistor; C2, second capacitor.

T11*i*A, active portion of fourth pull-up control transistor; T12*i*A, active portion of fifth pull-up control transistor; T81*i*A, active portion of sixth pull-up control transistor; T81*i*1A, active portion of third pull-up control sub-transistor; T81*i*2A, active portion of fourth pull-up control sub-transistor; T21*i*A, active portion of fourth pull-up transistor; T31*i*A, active portion of fifth pull-down transistor; T41*i*A, active portion of sixth pull-down transistor; T41*i*1A, active portion of third pull-down transistor; T41*i*2A, active portion of fourth pull-down transistor; T42*i*A, active portion of second pull-down maintaining transistor; T42*i*1A, active portion of third pull-down maintaining sub-transistor; T42*i*2A, active portion of fourth pull-down maintaining sub-transistor; T51*i*A, active portion of sixth inverter transistor; T51*i*1A, active portion of third inverter sub-transistor; T51*i*2A, active portion of fourth inverter sub-transistor; T52*i*A, active portion of seventh inverter transistor; T53*i*A, active portion of eighth inverter transistor; T54*i*A, active portion of ninth inverter transistor; T55*i*A, active portion of tenth inverter transistor; T43*i*A, active portion of second reset transistor; T43*i*1A, active portion of third reset sub-transistor; T431*i*A, active portion of fourth reset sub-transistor; T61*i*A, active portion of second anti-negative bias transistor; T61*i*1A, active portion of third anti-negative bias sub-transistor; T61*i*2A, active portion of fourth anti-negative bias sub-transistor.

T11*i*G, gate of fourth pull-up control transistor; T12*i*G, gate of fifth pull-up control transistor; T81*i*G, gate of sixth pull-up control transistor; T81*i*1G, gate of third pull-up control sub-transistor; T81*i*2G, gate of fourth pull-up control sub-transistor; T21*i*G, gate of fourth pull-up transistor; T31*i*G, gate of fifth pull-down transistor; T41*i*G, gate of sixth pull-down transistor; T41*i*1G, gate of third pull-down sub-transistor; T41*i*2G, gate of fourth pull-down sub-transistor; T42*i*G, gate of second pull-down maintaining transistor; T42*i*1G, gate of third pull-down maintaining sub-transistor; T42*i*2G, gate of fourth pull-down maintaining sub-transistor; T51*i*G, gate of sixth inverter transistor; T51*i*1G, gate of third inverter sub-transistor; T51*i*2G, gate of fourth inverter sub-transistor; T52*i*G, gate of seventh inverter transistor; T53*i*G, gate of eighth inverter transistor; T54*i*G, gate of ninth inverter transistor; T55*i*G, gate of tenth inverter transistor; T43*i*G, gate of second reset transistor; T43*i*1G, gate of third reset sub-transistor; T43*i*1G, gate of fourth reset sub-transistor; T61*i*G, gate of second anti-negative bias transistor; T61*i*1G, gate of third anti-negative bias sub-transistor; T61*i*2G, gate of fourth anti-negative bias sub-transistor.

T11*i*S, first electrode of fourth pull-up control transistor; T12*i*S, first electrode of fifth pull-up control transistor; T81*i*S, first electrode of sixth pull-up control transistor; T81*i*2S, first electrode of fourth pull-up control sub-transistor; T21*i*S, first electrode of fourth pull-up transistor; T31*i*S, first electrode of fifth pull-down transistor; T41*i*S, first electrode of sixth pull-down transistor; T41*i*1S, first electrode of third pull-down sub-transistor; T41*i*2S, first electrode of fourth pull-down sub-transistor; T42*i*S, first electrode of second pull-down maintaining transistor; T42*i*1S, first electrode of third pull-down maintaining sub-transistor; T42*i*2S, first electrode of fourth pull-down maintaining sub-transistor; T51*i*S, first electrode of sixth inverter transistor; T51*i*1S, first electrode of third inverter sub-transistor; T52*i*S, first electrode of seventh inverter transistor; T53*i*S, first electrode of eighth inverter transistor; T54*i*S, first electrode of ninth inverter transistor; T55*i*S, first electrode of tenth inverter transistor; T43*i*S, first electrode of second reset transistor; T43*i*1S, first electrode of third reset sub-transistor; T61*i*S, first electrode of second anti-negative bias transistor; T61*i*2S, first electrode of fourth anti-negative bias sub-transistor.

T11*i*D, second electrode of fourth pull-up control transistor; T12*i*D, second electrode of fifth pull-up control transistor; T81*i*D, second electrode of sixth pull-up control transistor; T81*i*1D, second electrode of third pull-up control sub-transistor; T81*i*2D, second electrode of fourth pull-up control sub-transistor; T21*i*D, second electrode of fourth pull-up transistor; T31*i*D, second electrode of fifth pull-down transistor; T41*i*D, second electrode of sixth pull-down transistor; T41*i*1D, second electrode of third pull-down transistor; T41*i*2D, second electrode of fourth pull-down sub-transistor; T42*i*D, second electrode of second pull-down maintaining transistor; T42*i*2D, second electrode of fourth pull-down maintaining sub-transistor; T51*i*D, second electrode of sixth inverter transistor; T51*i*1D, second electrode of third inverter sub-transistor; T51*i*2D, second electrode of fourth inverter sub-transistor; T52*i*D, second electrode of seventh inverter transistor; T53*i*D, second electrode of eighth inverter transistor; T54*i*D, second electrode of ninth inverter transistor; T55*i*D, second electrode of tenth inverter transistor; T43*i*D, second electrode of second reset transistor; T43*i*1D, second electrode of third reset sub-transistor; T43*i*1D, second electrode of fourth reset sub-transistor; T61*i*D, second electrode of second anti-negative bias transistor; T61*i*1D, second electrode of third anti-negative bias sub-transistor; T61*i*2D, second electrode of fourth anti-negative bias sub-transistor; C2*a*, first electrode plate of second capacitor; C2*a*1, first portion of first electrode plate of second capacitor; C2*a*2, second portion of first electrode plate of second capacitor; C2*b*, second electrode plate of second capacitor.

Q2[*n*], second pull-up node; QB2[*n*], second pull-down node; N2[*n*], second internal node; INI[n], second signal output terminal of second-type gate circuit of current stage; INI[n−2], second signal output terminal of second-type gate circuit of upper two stages; INI[n+1], second signal output terminal of second-type gate circuit of next stage; INI[n+2], second signal output terminal of second-type gate circuit of next two stages.

331, third pull-up control module; 332, third pull-up module; 333, third pull-down module; 334, third pull-down maintaining module; 335, third inverter module; 336, third anti-negative bias module; T11*r*, seventh pull-up control transistor; T21*r*, fifth pull-up transistor; T31*r*, seventh pull-down transistor; T41*r*, eighth pull-down transistor; T41*r*1, fifth pull-down sub-transistor; T41*r*2, sixth pull-down sub-transistor; T42*r*, third pull-down maintaining transistor; T42*r*1, fifth pull-down maintaining sub-transistor; T42*r*2, sixth pull-down maintaining sub-transistor; T51*r*, eleventh inverter transistor; T51*r*1, fifth inverter sub-transistor; T51*r*2, sixth inverter sub-transistor; T52*r*, twelfth inverter transistor; T52*r*1, seventh inverter sub-transistor; T52*r*2, eighth inverter sub-transistor; T53*r*, thirteenth inverter transistor; T54*r*, fourteenth inverter transistor; T55*r*, fifteenth inverter transistor; T56*r*, sixteenth inverter transistor; T61*r*, third anti-negative bias transistor; T61*r*1, fifth anti-negative bias sub-transistor; T61*r*2, sixth anti-negative bias sub-transistor; C3, third capacitor; C4, fourth capacitor.

T11*r*A, active portion of seventh pull-up control transistor; T21*r*A, active portion of fifth pull-up transistor; T31*r*A, active portion of seventh pull-down transistor; T41*r*A, active portion of eighth pull-down transistor; T41*r*1A, active portion of fifth pull-down transistor; T41*r*2A, active portion of sixth pull-down transistor; T42*r*A, active portion of third pull-down maintaining transistor; T42*r*1A, active portion of fifth pull-down maintaining sub-transistor; T42*r*2A, active portion of sixth pull-down maintaining sub-transistor; T51*r*A, active portion of eleventh inverter transistor; T51*r*1A, active portion of fifth inverter sub-transistor; T51*r*2A, active portion of sixth inverter sub-transistor; T52*r*A, active portion of twelfth inverter transistor; T52*r*1A, active portion of seventh inverter sub-transistor; T52*r*2A, active portion of eighth inverter sub-transistor; T53*r*A, active portion of thirteenth inverter transistor; T54*r*A, active portion of fourteenth inverter transistor; T55*r*A, active portion of fifteenth inverter transistor; T56*r*A, active portion of sixteenth inverter transistor; T61*r*A, active portion of third anti-negative bias transistor; T61*r*1A, active portion of fifth anti-negative bias sub-transistor; T61*r*2A, active portion of sixth anti-negative bias sub-transistor.

T11*r*G, gate of seventh pull-up control transistor; T21*r*G, gate of fifth pull-up transistor; T31*r*G, gate of seventh pull-down transistor; T41*r*G, gate of eighth pull-down transistor; T41*r*1G, gate of fifth pull-down sub-transistor; T41*r*2G, gate of sixth pull-down sub-transistor; T42*r*G, gate of third pull-down maintaining transistor; T42*r*1G, gate of fifth pull-down maintaining sub-transistor; T42*r*2G, gate of sixth pull-down maintaining sub-transistor; T51*r*G, gate of eleventh inverter transistor; T51*r*1G, gate of fifth inverter sub-transistor; T51*r*2G, gate of sixth inverter sub-transistor; T52*r*G, gate of twelfth inverter transistor; T52*r*1G, gate of seventh inverter sub-transistor; T52*r*2G, gate of eighth inverter sub-transistor; T53*r*G, gate of thirteenth inverter transistor; T54*r*G, gate of fourteenth inverter transistor; T55*r*G, gate of fifteenth inverter transistor; T56*r*G, gate of sixteenth inverter transistor; T61*r*G, gate of third anti-negative bias transistor; T61*r*1G, gate of fifth anti-negative bias sub-transistor; T61*r*2G, gate of sixth anti-negative bias sub-transistor.

T11*r*S, first electrode of seventh pull-up control transistor; T21*r*S, first electrode of fifth pull-up transistor; T31*r*S, first electrode of seventh pull-down transistor; T41*r*S, first electrode of eighth pull-down transistor; T41*r*1S, first electrode of fifth pull-down transistor; T42*r*S, first electrode of third pull-down maintaining transistor; T42*r*1S, first electrode of fifth pull-down maintaining sub-transistor; T42*r*2S, first electrode of sixth pull-down maintaining sub-transistor; T51*r*S, first electrode of eleventh inverter transistor; T51*r*1S, first electrode of fifth inverter sub-transistor; T52*r*S, first electrode of twelfth inverter transistor; T52*r*1S, first electrode of seventh inverter sub-transistor; T52*r*2S, first electrode of eighth inverter sub-transistor; T53*r*S, first electrode of thirteenth inverter transistor; T54*r*S, first electrode of fourteenth inverter transistor; T55*r*S, first electrode of fifteenth inverter transistor; T56*r*S, first electrode of sixteenth inverter transistor; T61*r*S, first electrode of third anti-negative bias transistor; T61*r*2S, first electrode of sixth anti-negative bias sub-transistor.

T11*r*D, second electrode of seventh pull-up control transistor; T21*r*D, second electrode of fifth pull-up transistor; T31*r*D, second electrode of seventh pull-down transistor; T41*r*D, second electrode of eighth pull-down transistor; T41*r*1D, second electrode of fifth pull-down transistor; T41*r*2D, second electrode of sixth pull-down transistor; T42*r*D, second electrode of third pull-down maintaining transistor; T42*r*1D, second electrode of fifth pull-down maintaining sub-transistor; T42*r*2D, second electrode of sixth pull-down maintaining sub-transistor; T51*r*D, second electrode of eleventh inverter transistor; T51*r*1D, second electrode of fifth inverter sub-transistor; T51*r*2D, second electrode of sixth inverter sub-transistor; T52*r*D, second electrode of twelfth inverter transistor; T52*r*1D, second electrode of seventh inverter sub-transistor; T52*r*2D, second electrode of eighth inverter sub-transistor; T53*r*D, second electrode of thirteenth inverter transistor; T54*r*D, second electrode of fourteenth inverter transistor; T56*r*D, second electrode of sixteenth inverter transistor; T61*r*D, second electrode of third anti-negative bias transistor; T61*r*1D, second electrode of fifth anti-negative bias sub-transistor; T61*r*2D, second electrode of sixth anti-negative bias sub-transistor; C3*a*, first electrode plate of third capacitor; C3*a*1, first portion of first electrode plate of third capacitor; C3*a*2, second portion of first electrode plate of third capacitor; C3*b*, second electrode plate of third capacitor; C4*a*, first electrode plate of fourth capacitor; C4*b*, second electrode plate of fourth capacitor.

Q3[$n$], third pull-up node; QB3[$n$], third pull-down node; N3[$n$], third internal node; REF[n], third signal output terminal of third-type gate circuit of current stage.

X, first direction; Y, second direction.

DETAILED DESCRIPTION

In order to illustrate the principles of the embodiments of the present disclosure, the embodiments of the present disclosure provide some comparative display devices. It can be understood that these comparative display devices cannot be used as prior art in the embodiments of the present disclosure. As shown in FIG. 1, the comparative display device 1 includes pixel circuits 11 and gate circuits 12. Each of the gate circuits 12 is disposed in a wiring region 121 and a transistor region 122. Signal wirings 121*a* are disposed in the wiring region 121. Thin film transistors 122*a* are disposed in the transistor region 122. Each of the signal wirings 121*a* extends from the wiring region 121 to the transistor region 122 to be connected to a corresponding one of the transistors 122*a*, so as to realize normal operation of the gate circuits 12. However, it can be seen from FIG. 1 that since the wiring region 121 and the transistor region 122 are arranged separately, the wiring region 121 needs to occupy a relatively large space. Furthermore, when the signal wirings 121*a* extend into the transistor region 122, each transistor needs to occupy more space in order to avoid the unconnected signal wirings 121*a*, resulting in a relatively large space occupied by the gate circuits 12. As such, in current display devices, a lateral space occupied by the transistor region and the signal wiring region in the gate driving circuits is relatively large, resulting in a larger bezel of the display device.

Embodiments of the present disclosure provide a display panel 2 and a display device. In the embodiments of the present disclosure, aspects such as arrangement positions of signal lines, film layers where the signal lines are arranged, and arrangement ways of the signal lines are adjusted, and/or aspects such as arrangement positions of the transistors, arrangement ways of the transistors, and a design of structures of the transistors are adjusted, thereby reducing the space occupied by gate driving circuits 22 and reducing a bezel of the display panel 2.

Figure 2:
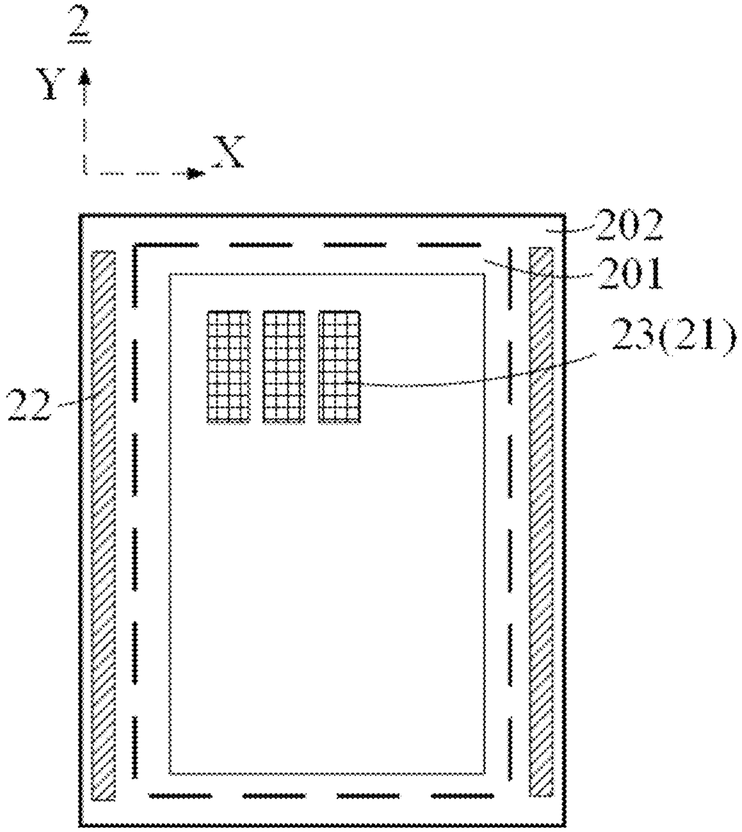
FIG. 2 is a schematic plan view of a display panel according to some embodiments of the present disclosure.
Figure 3:
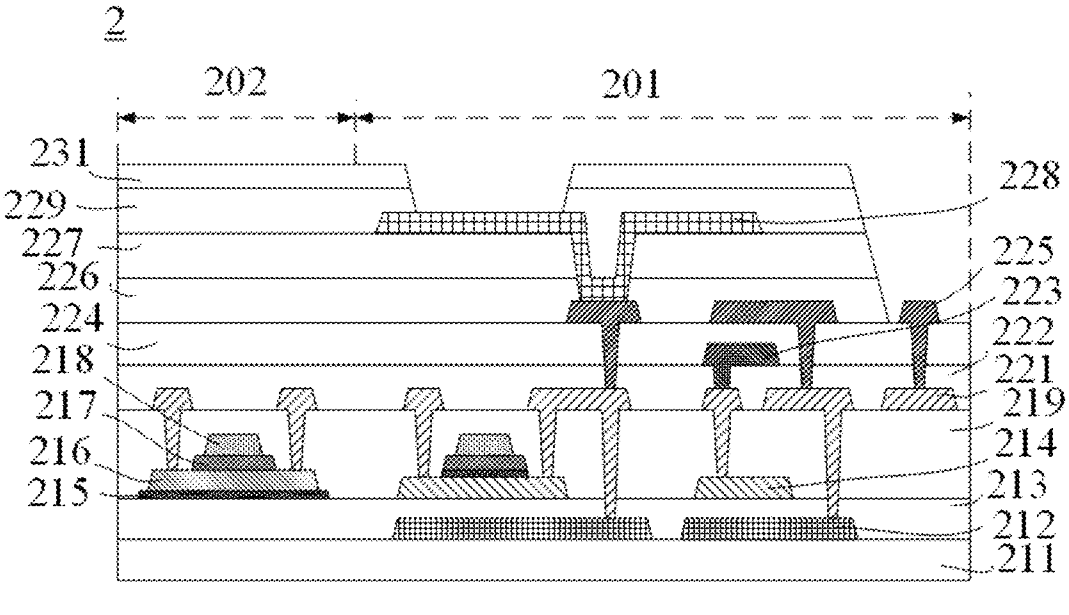
FIG. 3 is a schematic cross-sectional view of a display panel according to some embodiments of the present disclosure.
Figure 4:
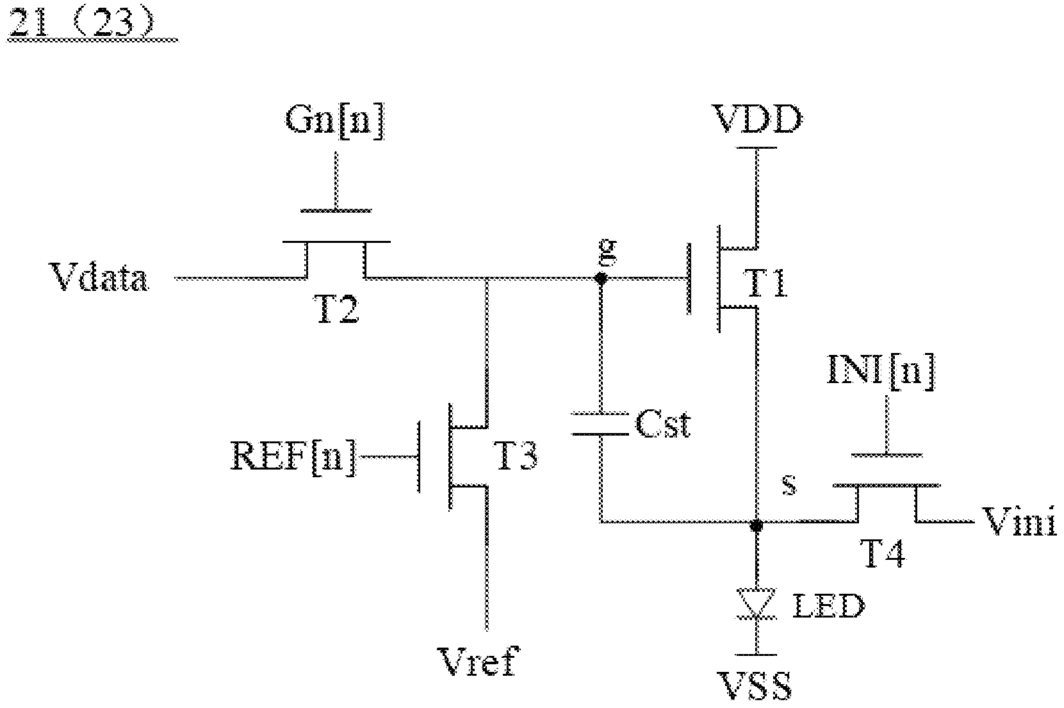
FIG. 4 is a circuit diagram of a pixel driving circuit according to some embodiments of the present disclosure.
Figure 5:
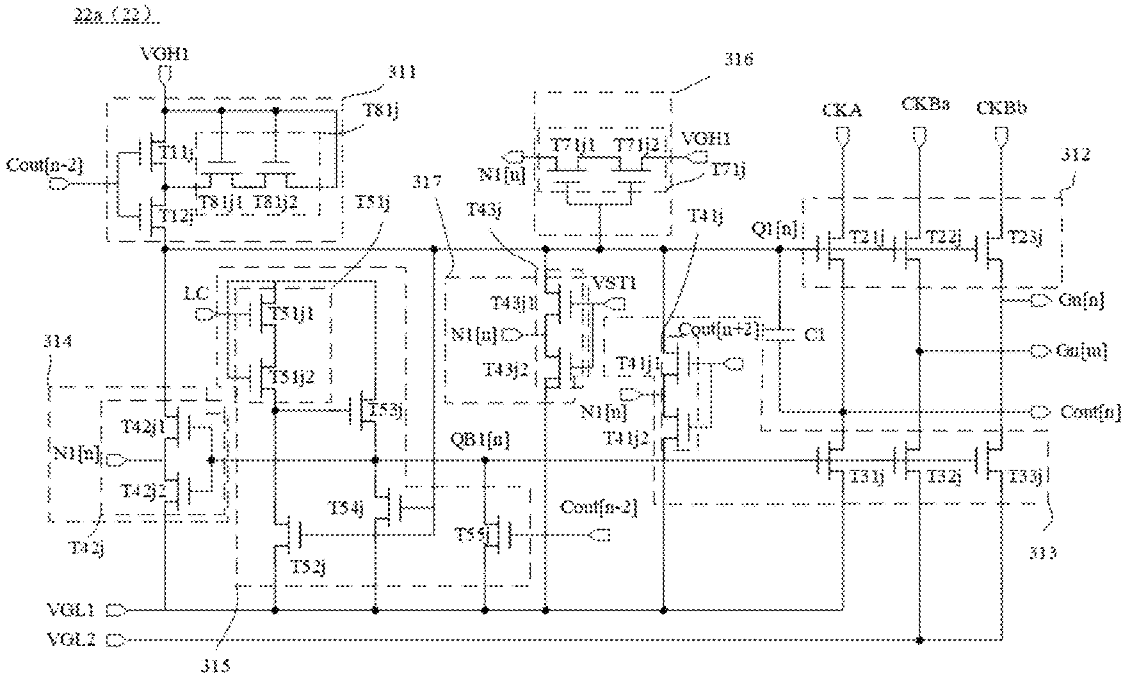
FIG. 5 is a circuit diagram of a first-type gate circuit according to some embodiments of the present disclosure.
Figure 6:
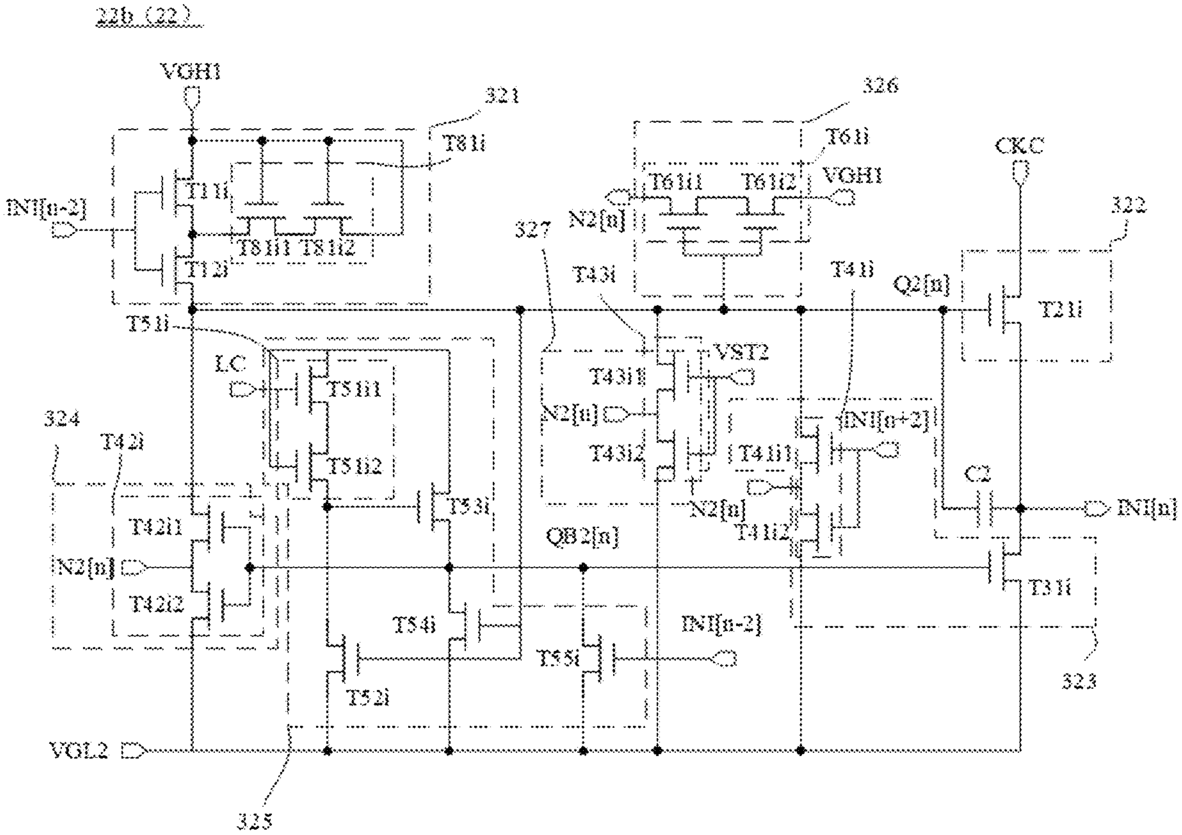
FIG. 6 is a circuit diagram of a second-type gate circuit according to some embodiments of the present disclosure.
Figure 7:
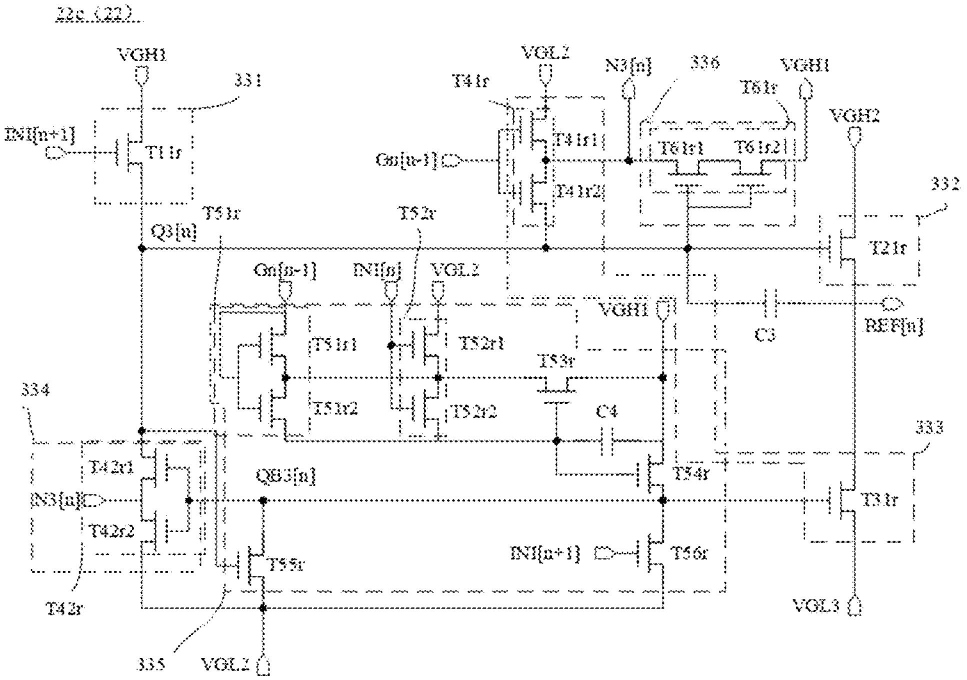
FIG. 7 is a circuit diagram of a third-type gate circuit according to some embodiments of the present disclosure.
Figure 8:
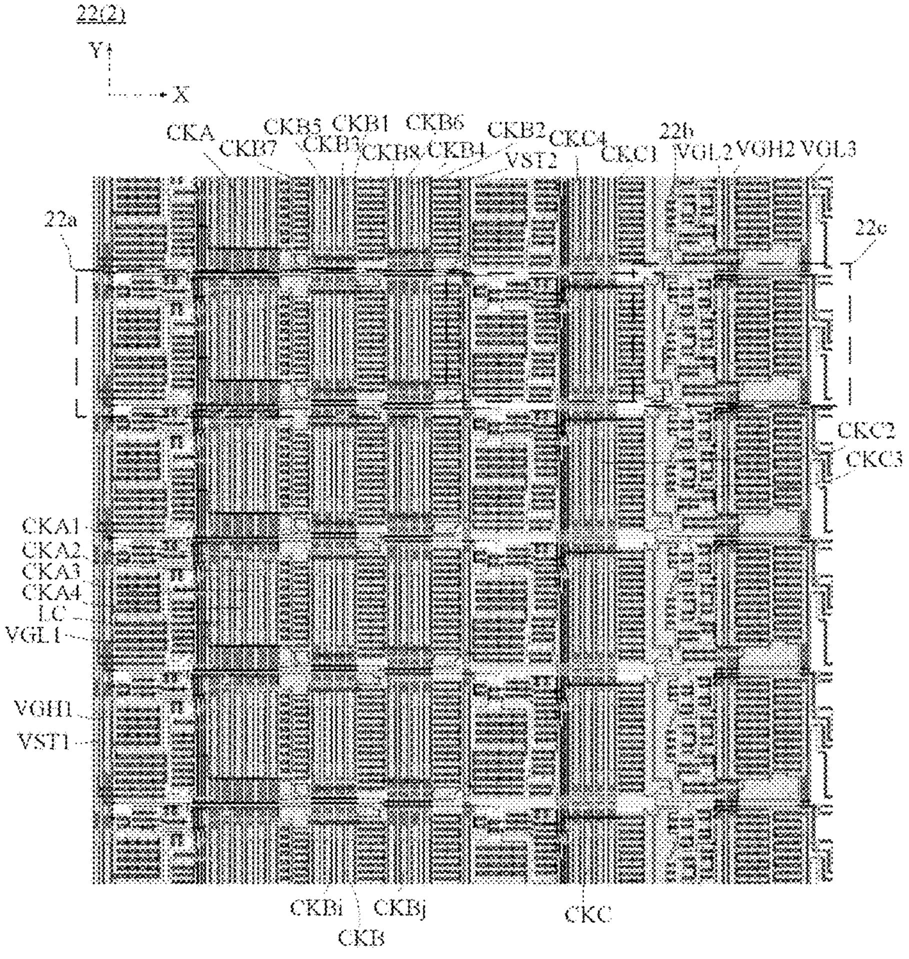
FIG. 8 is a view of a stacked layer of a light shielding layer, an active layer, a gate layer, and a first source-drain layer of a display panel according to some embodiments of the present disclosure.
Figure 9:
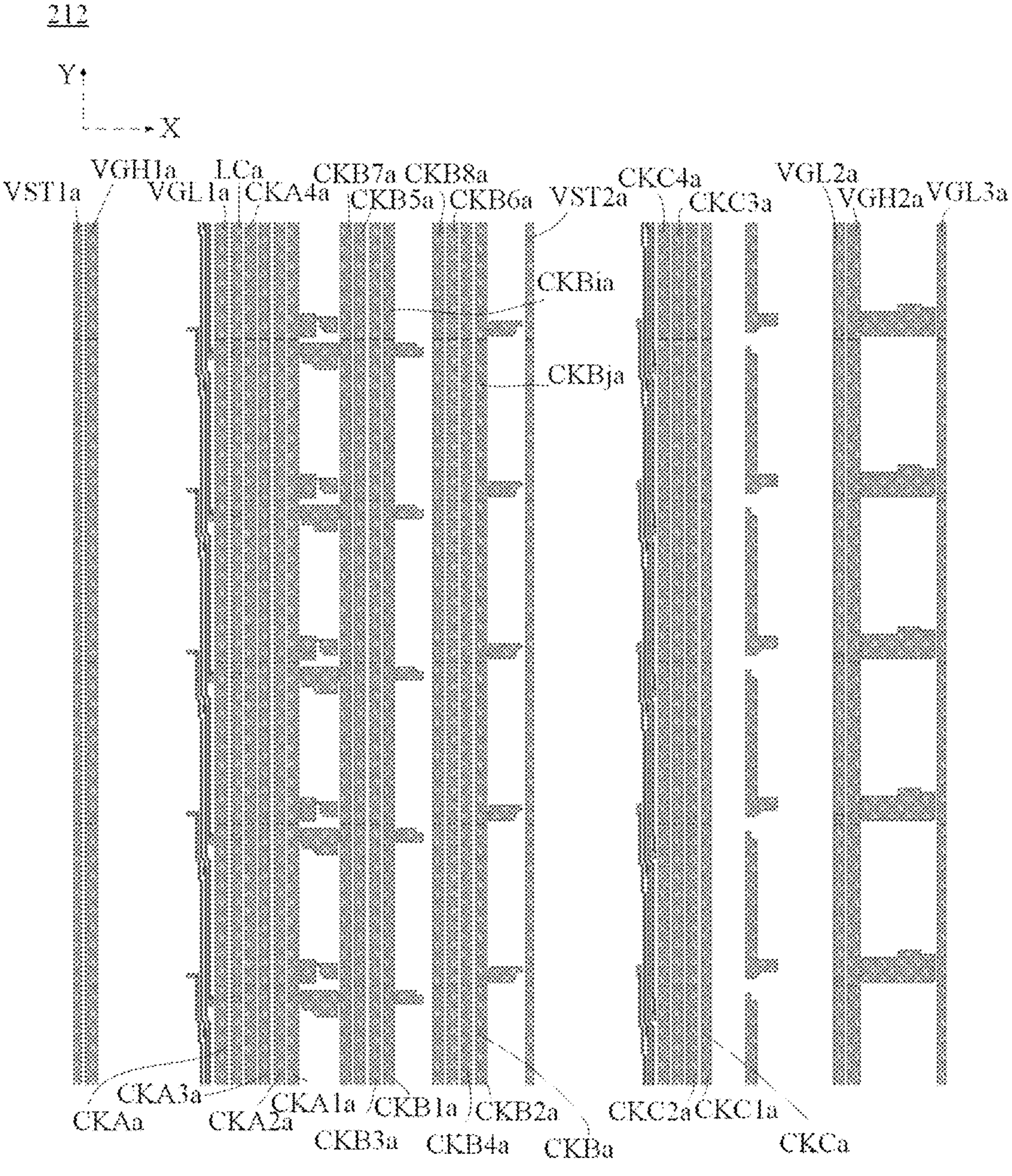
FIG. 9 is an exploded view of the light shielding layer of the display panel in FIG. 8.
Figure 10:
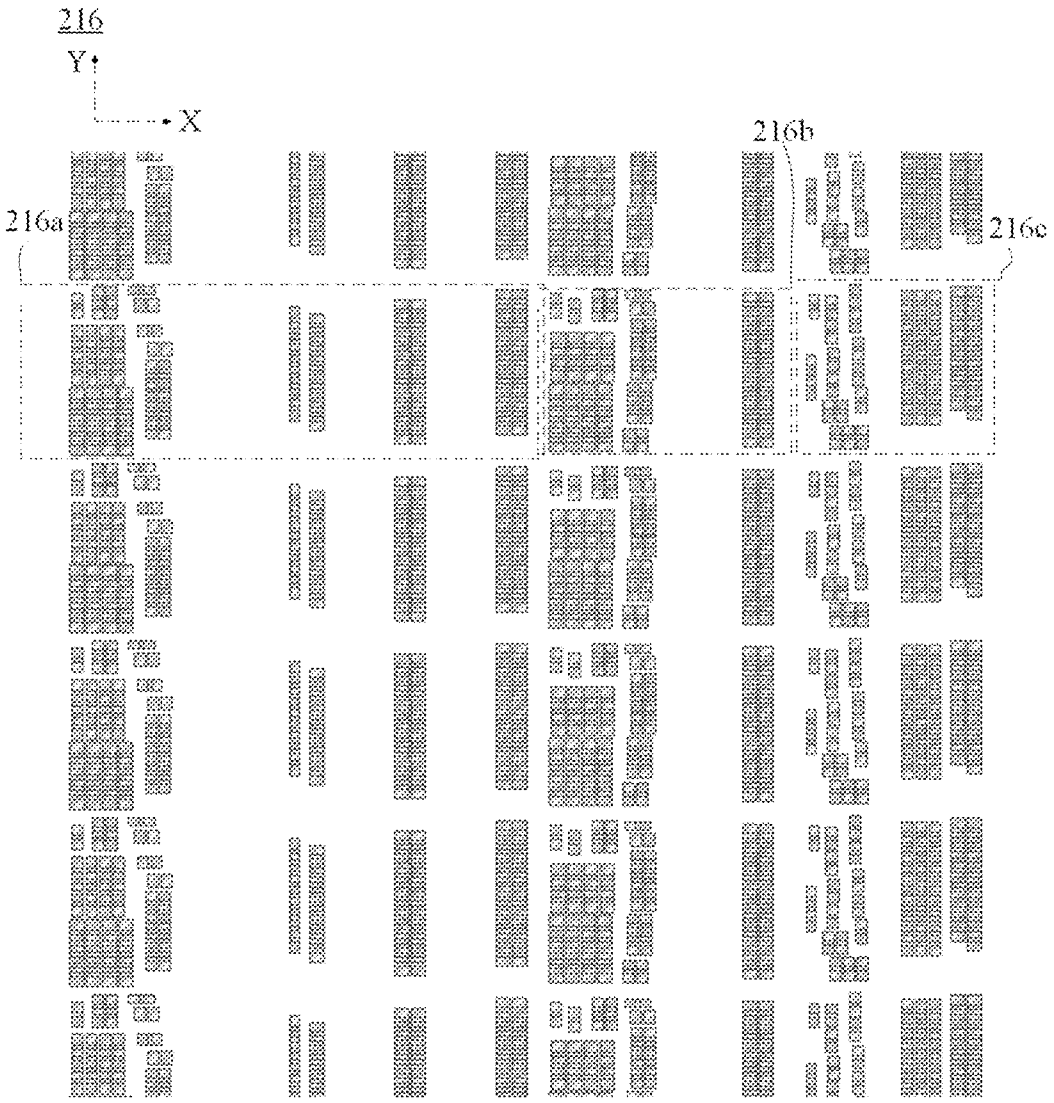
FIG. 10 is an exploded view of the active layer of the display panel in FIG. 8.
Figure 11:
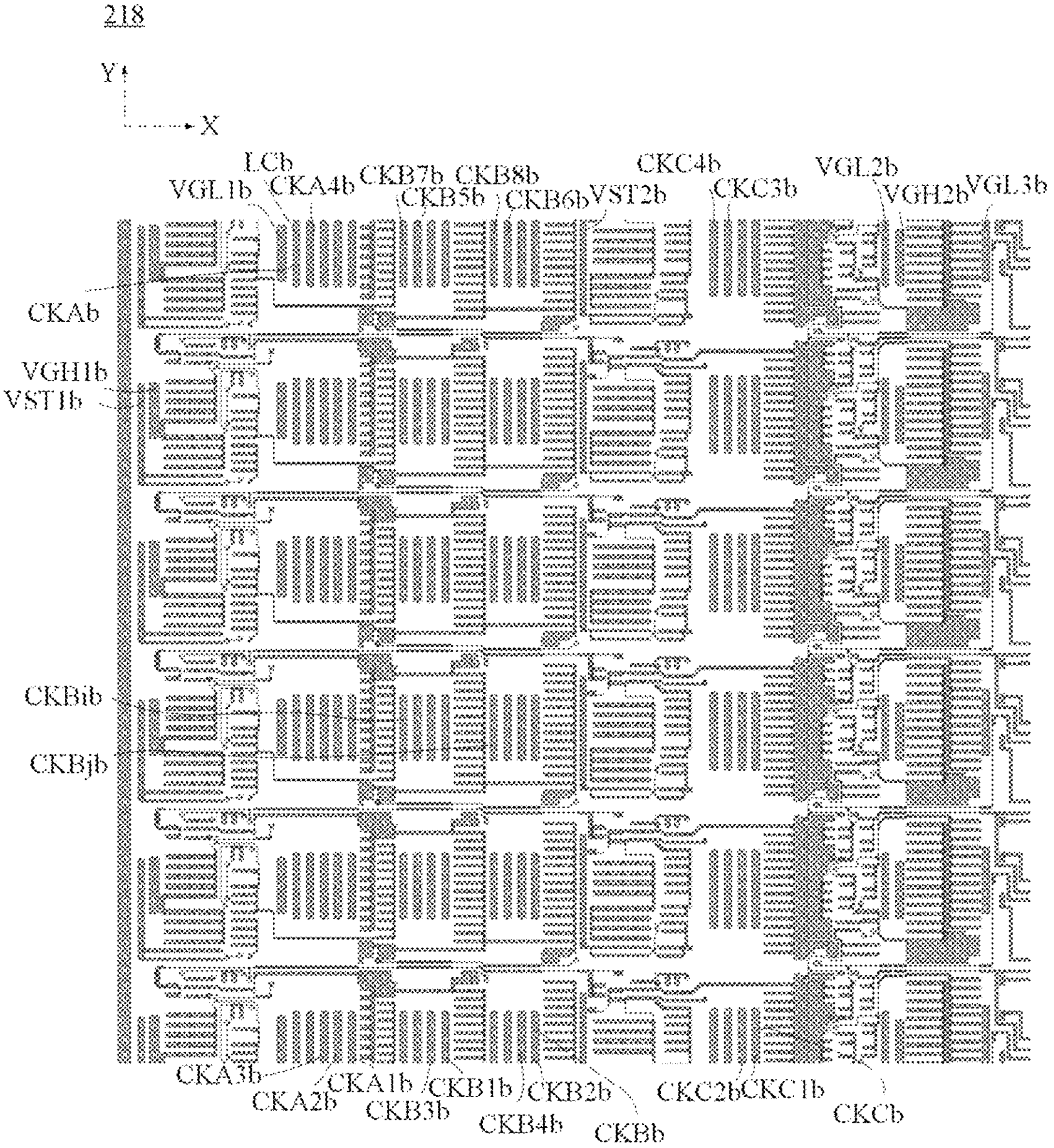
FIG. 11 is an exploded view of the gate layer of the display panel in FIG. 8.
Figure 12:
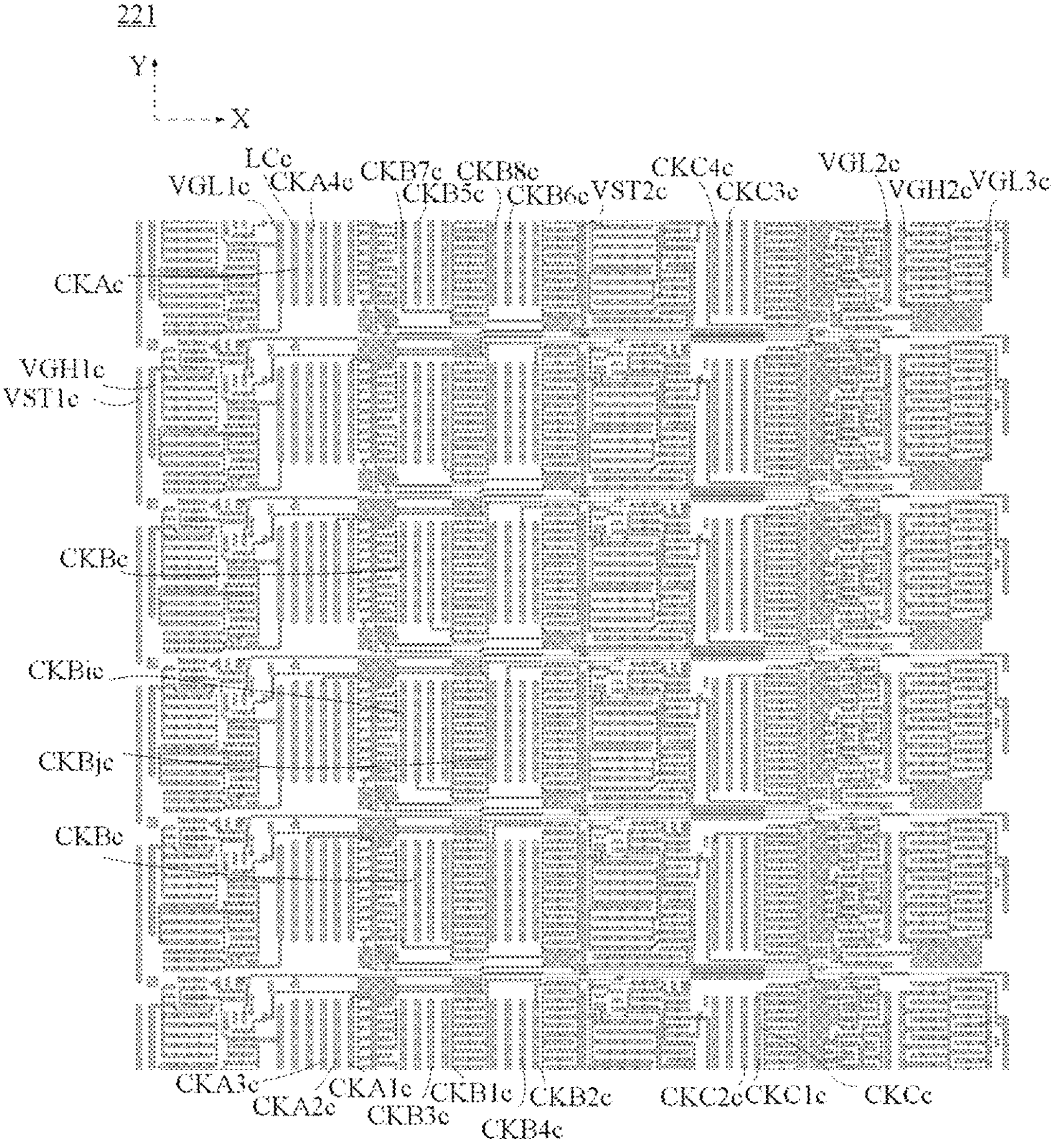
FIG. 12 is an exploded view of the first source-drain layer of the display panel in FIG. 8.
Figure 13:
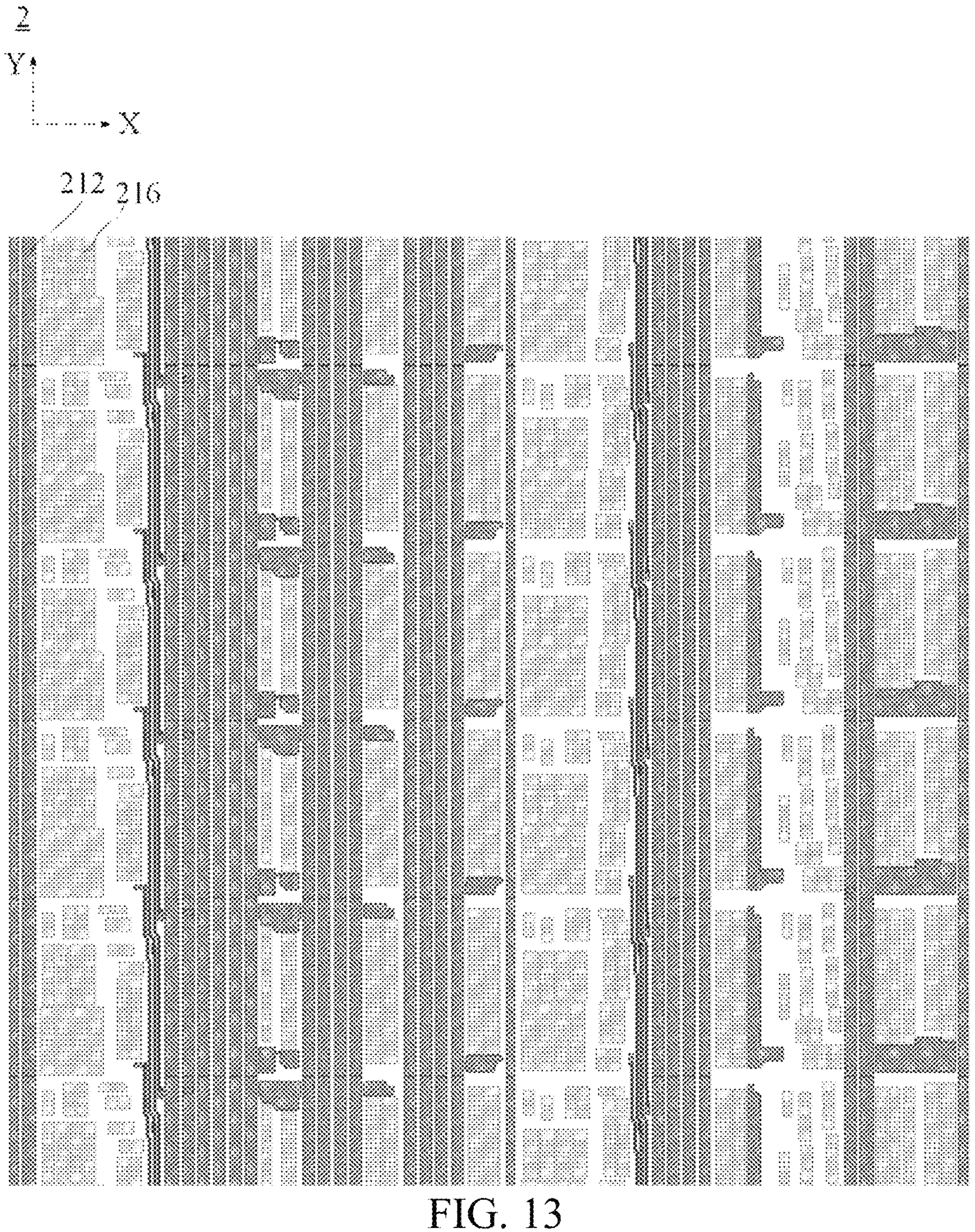
FIG. 13 is a view of a stacked layer of the light shielding layer and the active layer of the display panel in FIG. 8.
Figure 14:
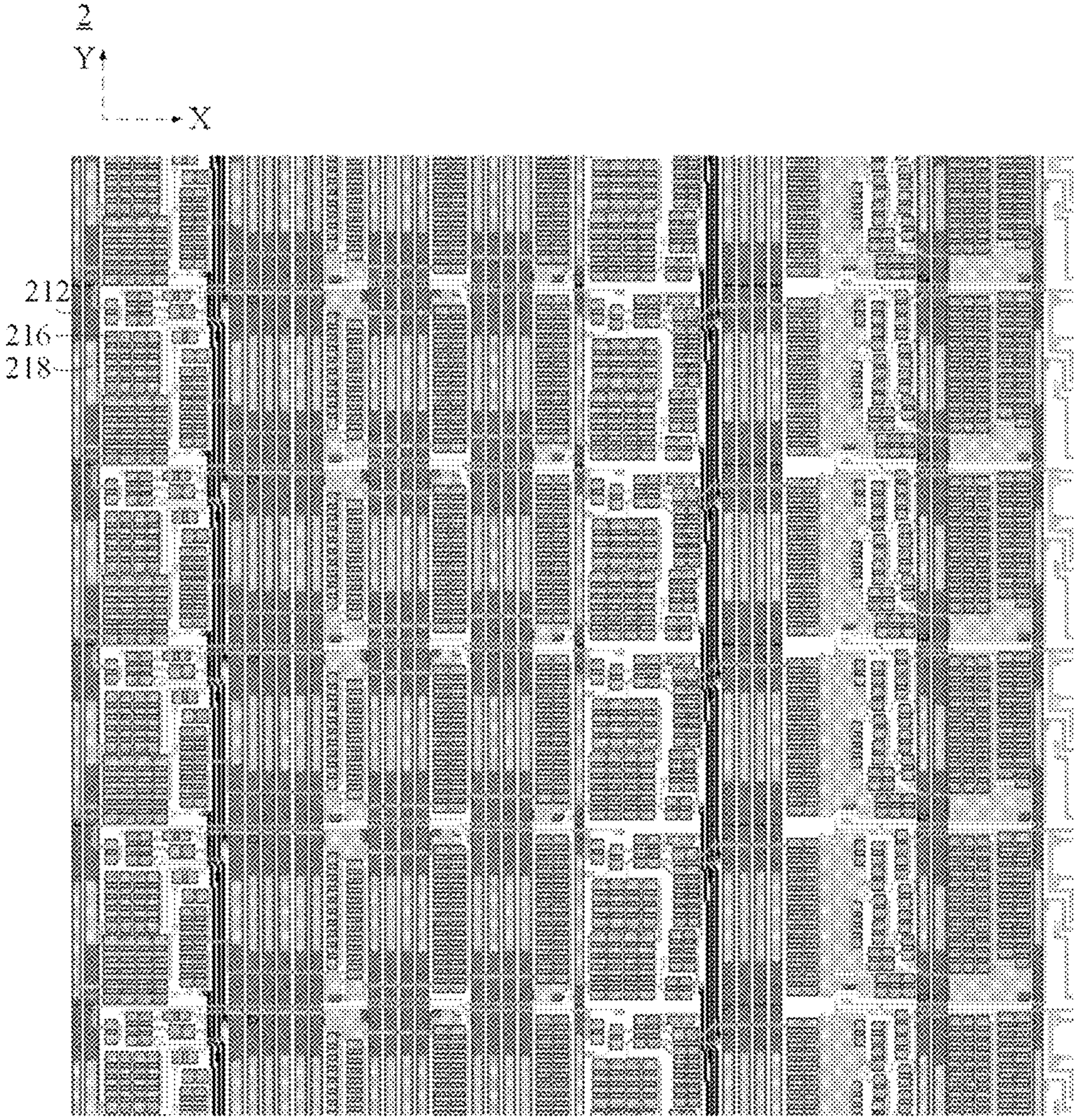
FIG. 14 is a view of a stacked layer of the light shielding layer, the active layer, and the gate layer of the display panel in FIG. 8.
Figure 15:
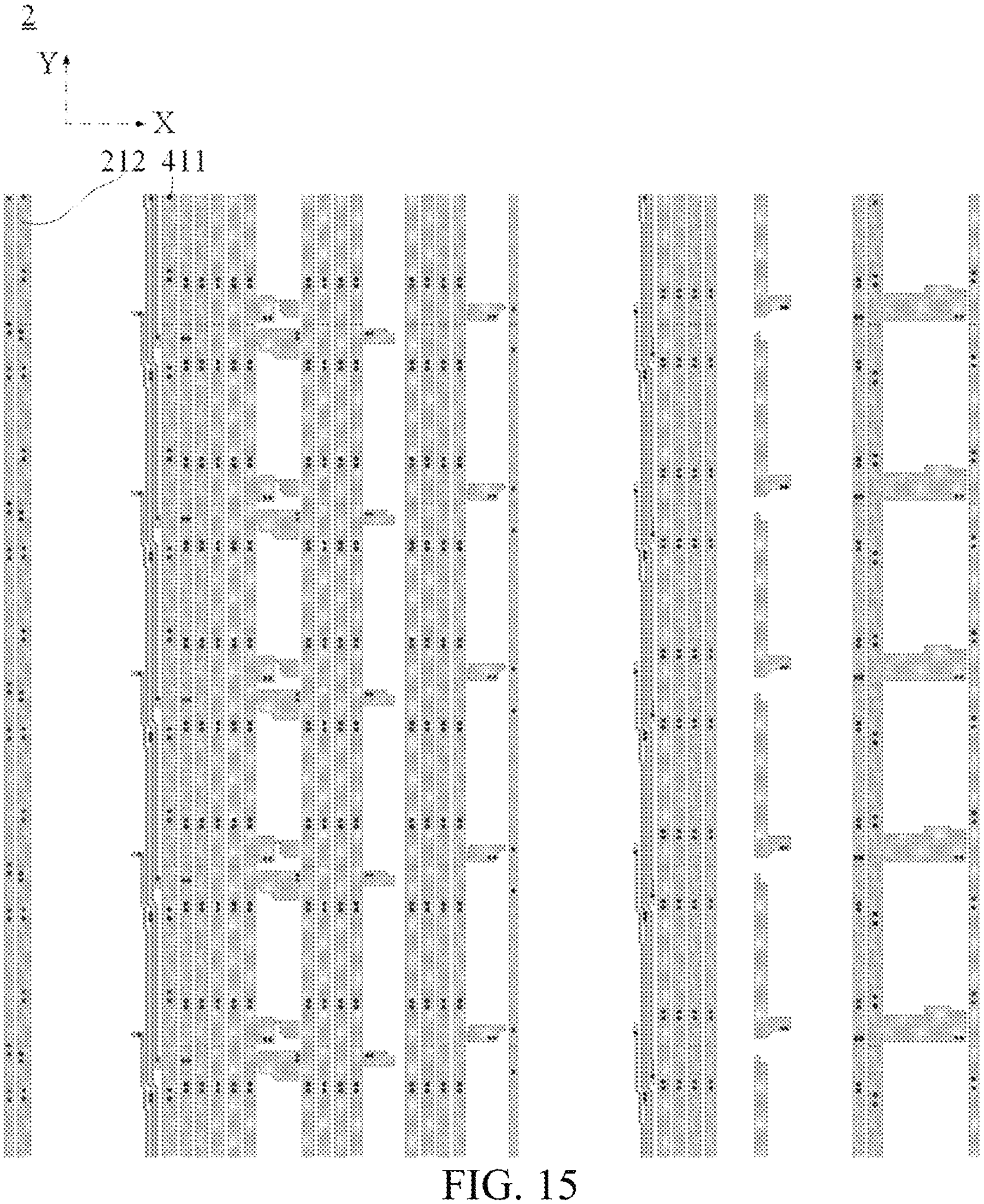
FIG. 15 is a view of a stacked layer of the light shielding layer and a first via hole of the display panel in FIG. 8.
Figure 16:
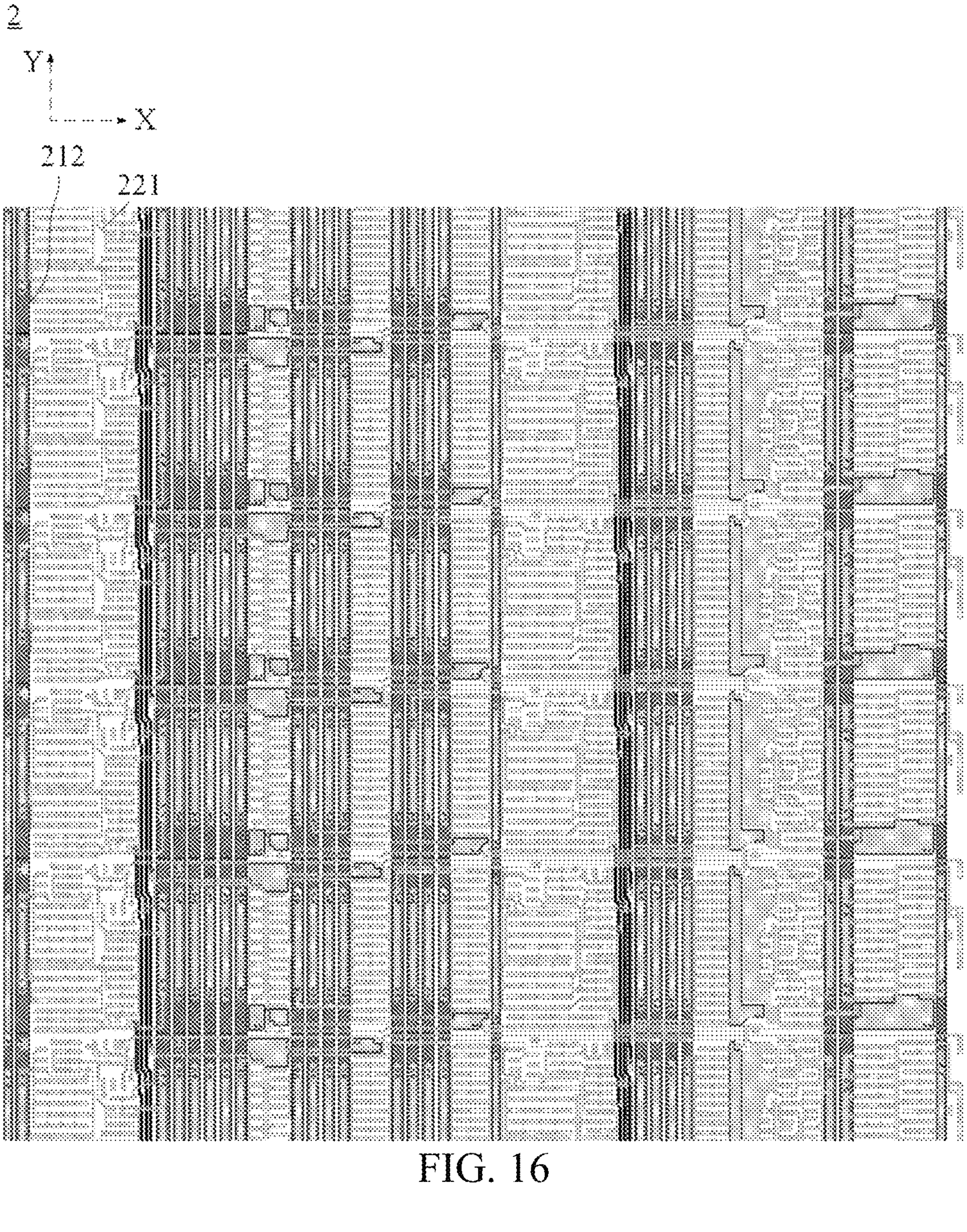
FIG. 16 is a view of a stacked layer of the light shielding layer and the first source-drain layer in FIG. 8.
Figure 17:
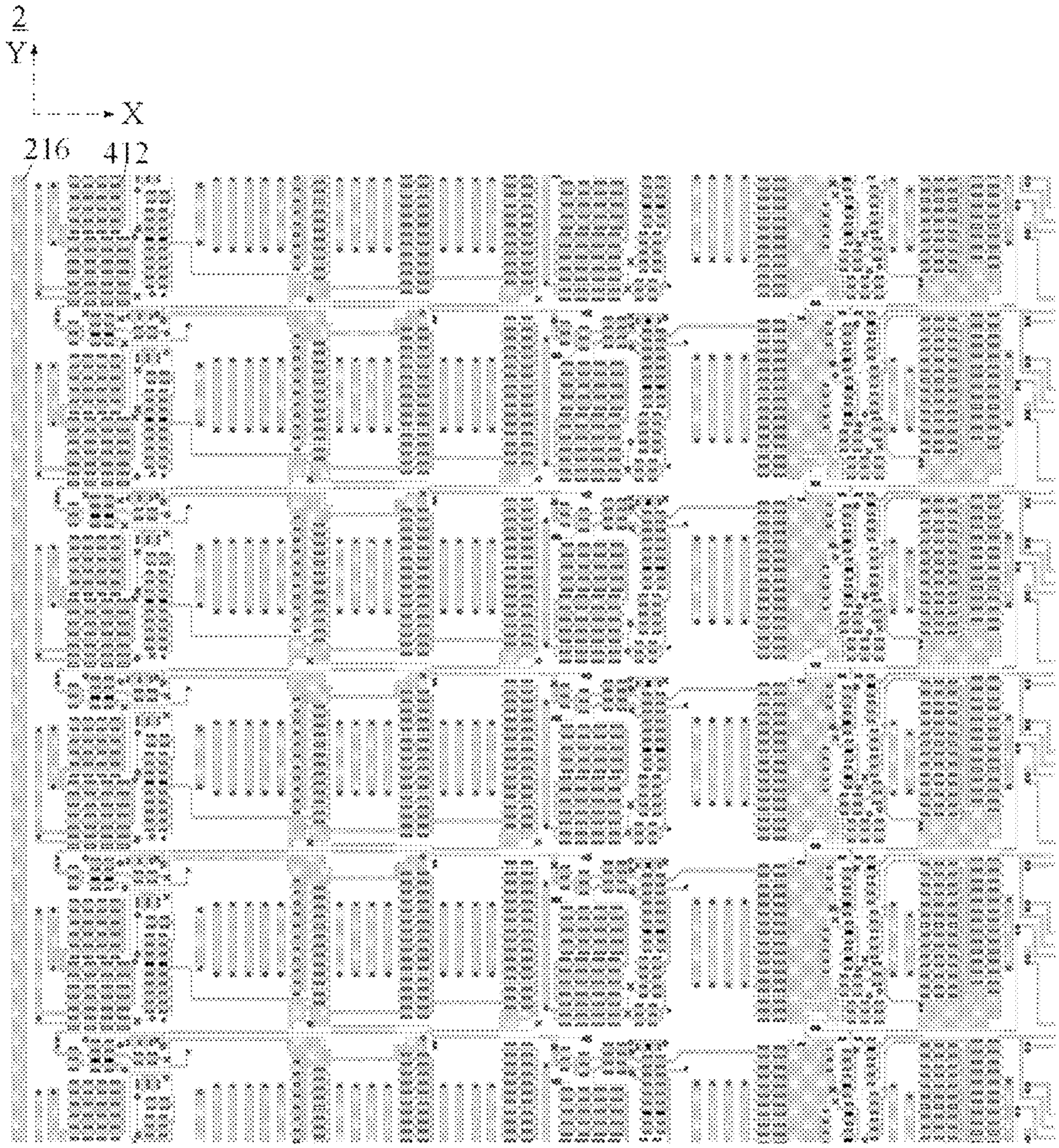
FIG. 17 is a view of a stacked layer of the gate layer and a second via hole in FIG. 8.
Figure 18:
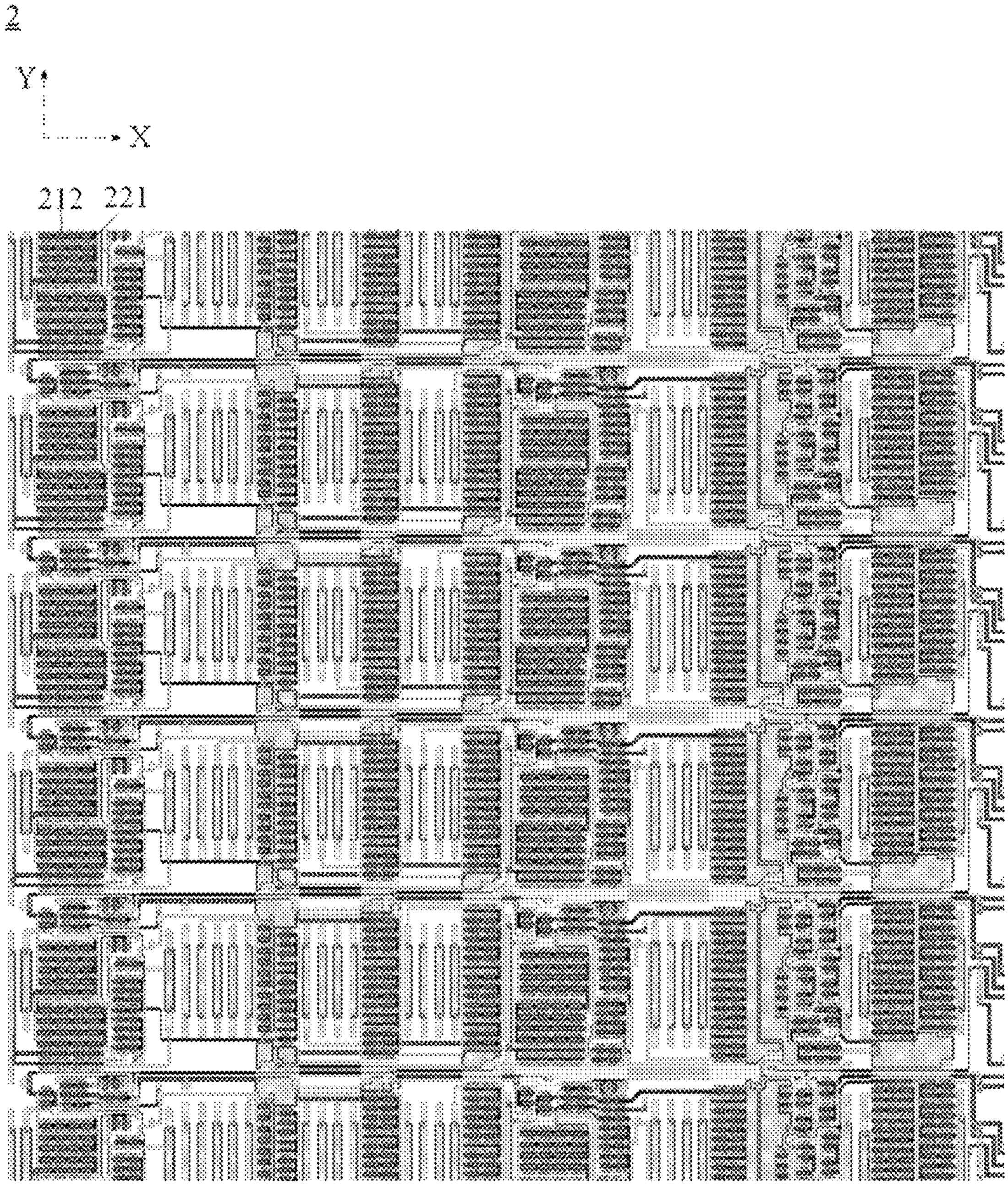
FIG. 18 is a view of a stacked layer of the gate layer and the first source-drain layer in FIG. 8.
Figure 19:
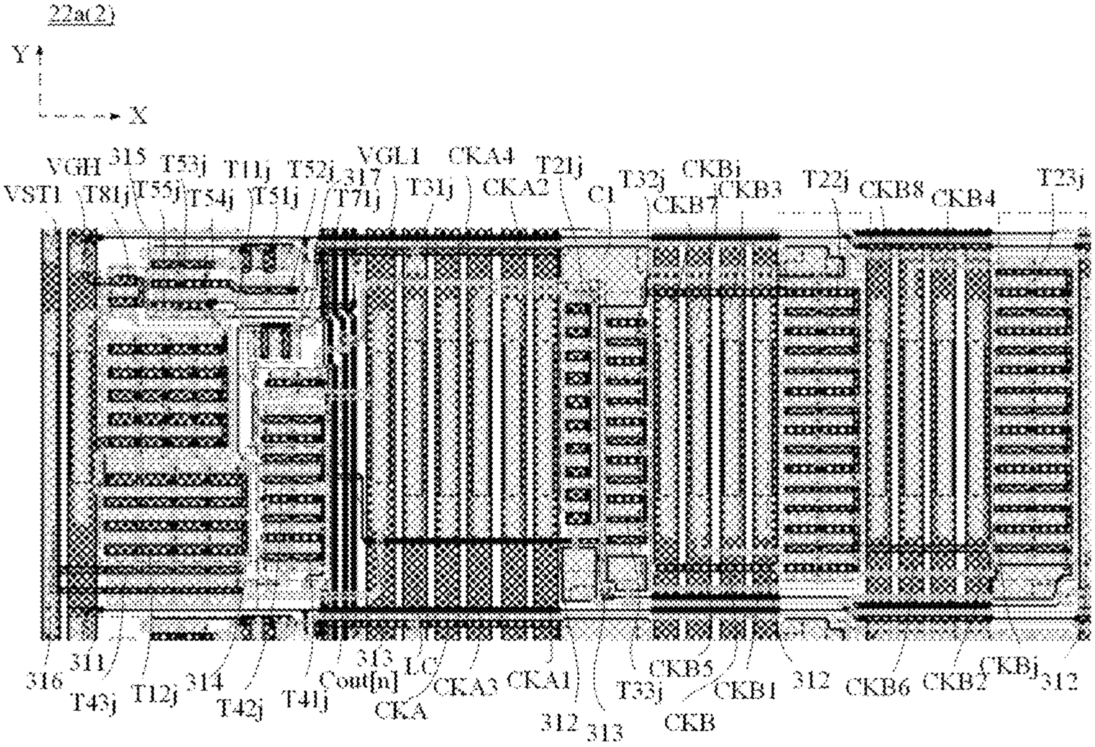
FIG. 19 is a partial enlarged view of a region of the display panel corresponding to the first-type gate circuit in FIG. 8.
Figure 20:
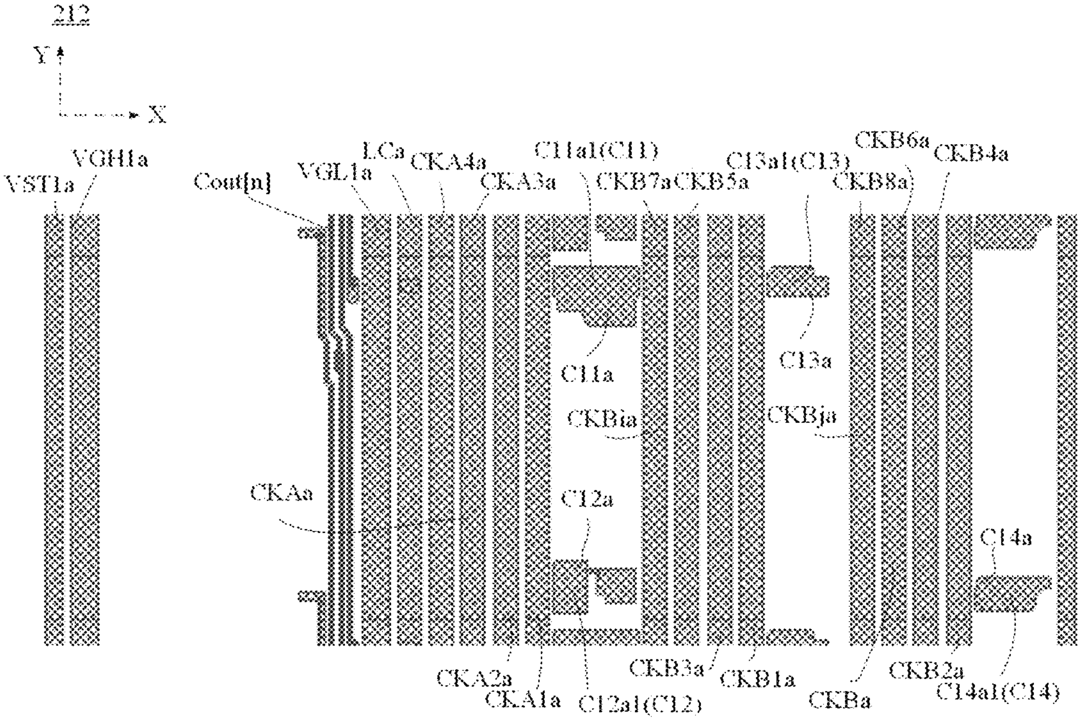
FIG. 20 is an exploded view of the light shielding layer of the display panel in FIG. 19.
Figure 21:
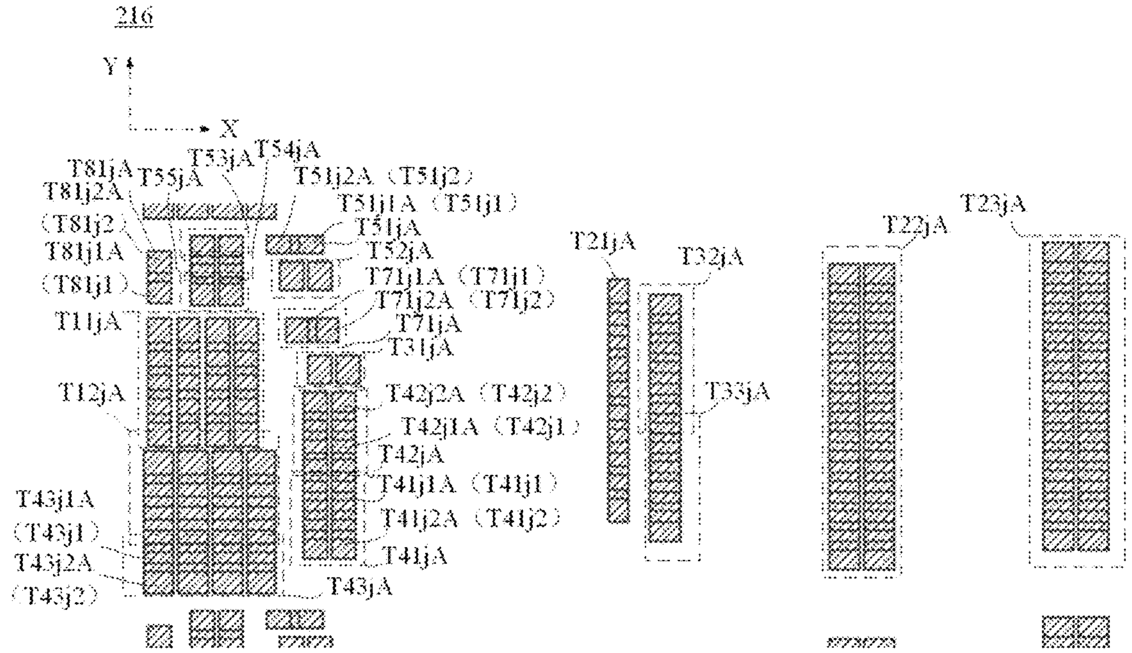
FIG. 21 is an exploded view of the active layer of the display panel in FIG. 19.
Figure 22:
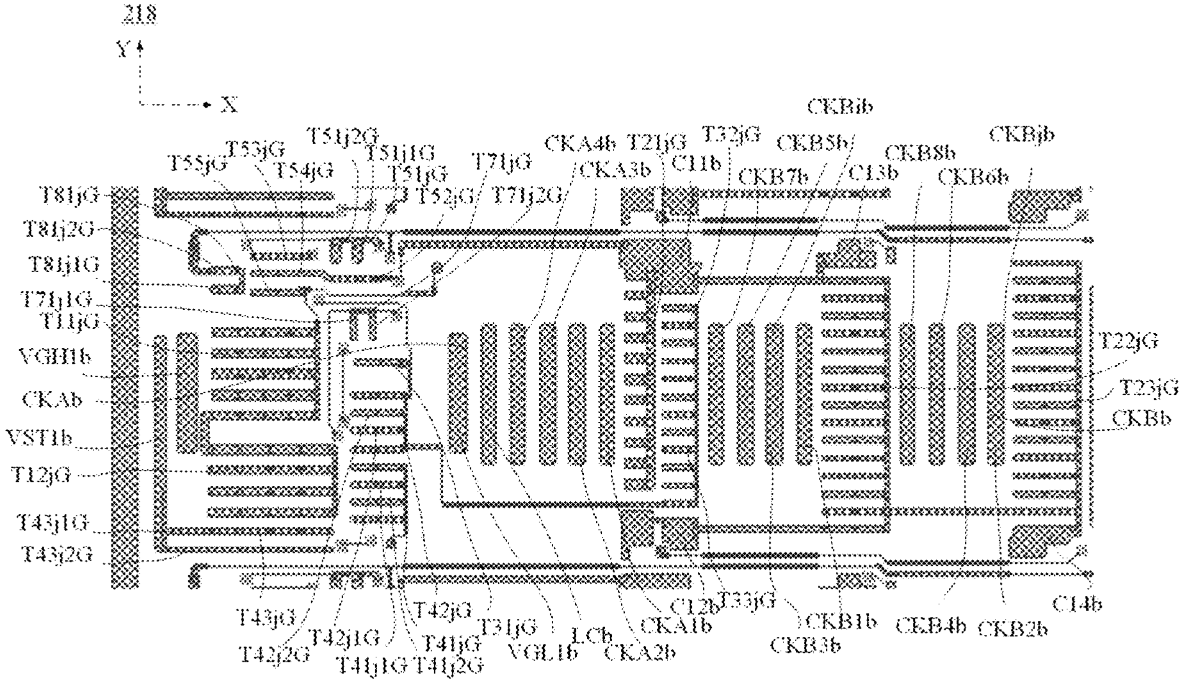
FIG. 22 is an exploded view of the gate layer of the display panel in FIG. 19.
Figure 23:
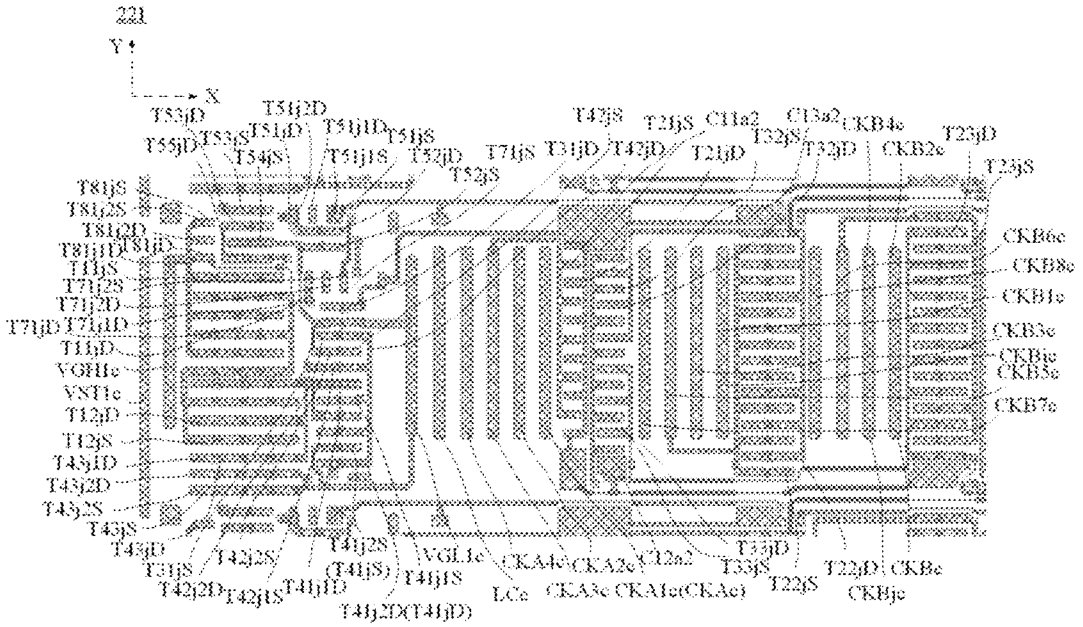
FIG. 23 is an exploded view of the first source-drain layer of the display panel in FIG. 19.
Figure 24:
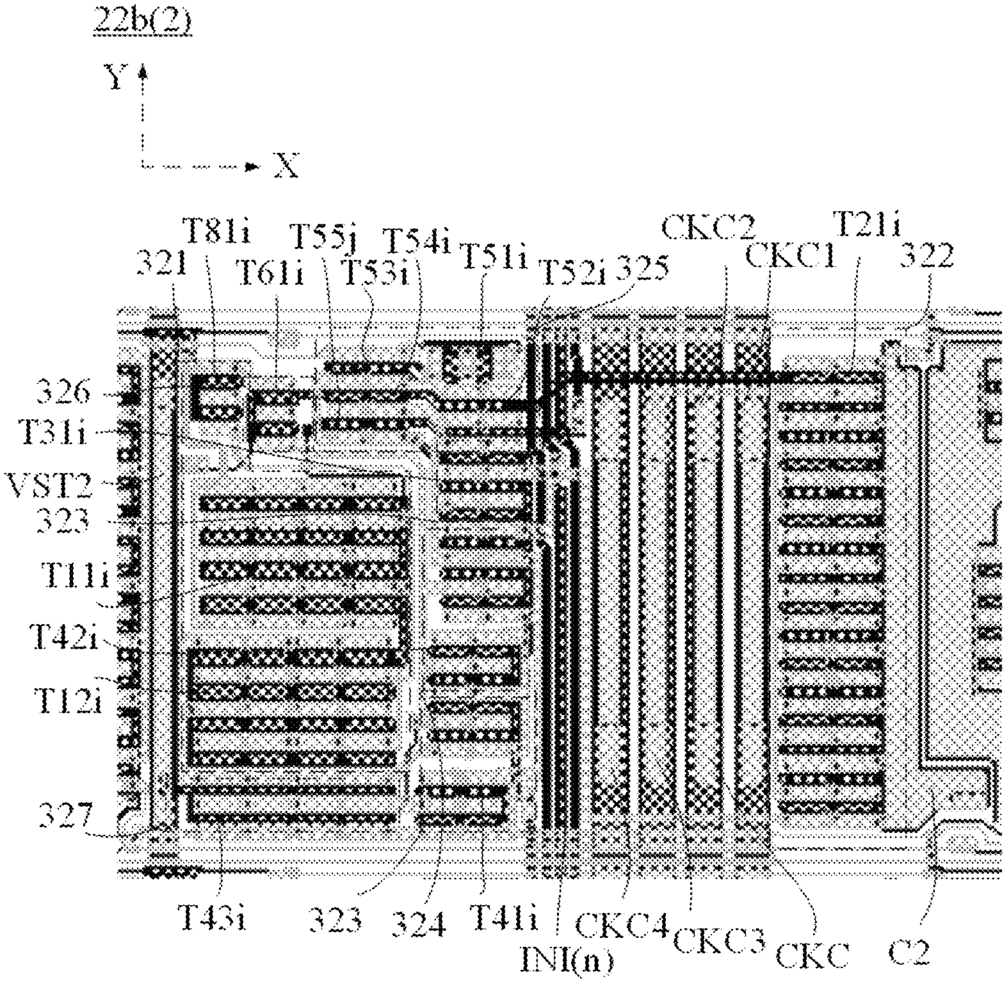
FIG. 24 is a partial enlarged view of a region of the display panel corresponding to the second-type gate circuit in FIG. 8.
Figure 25:
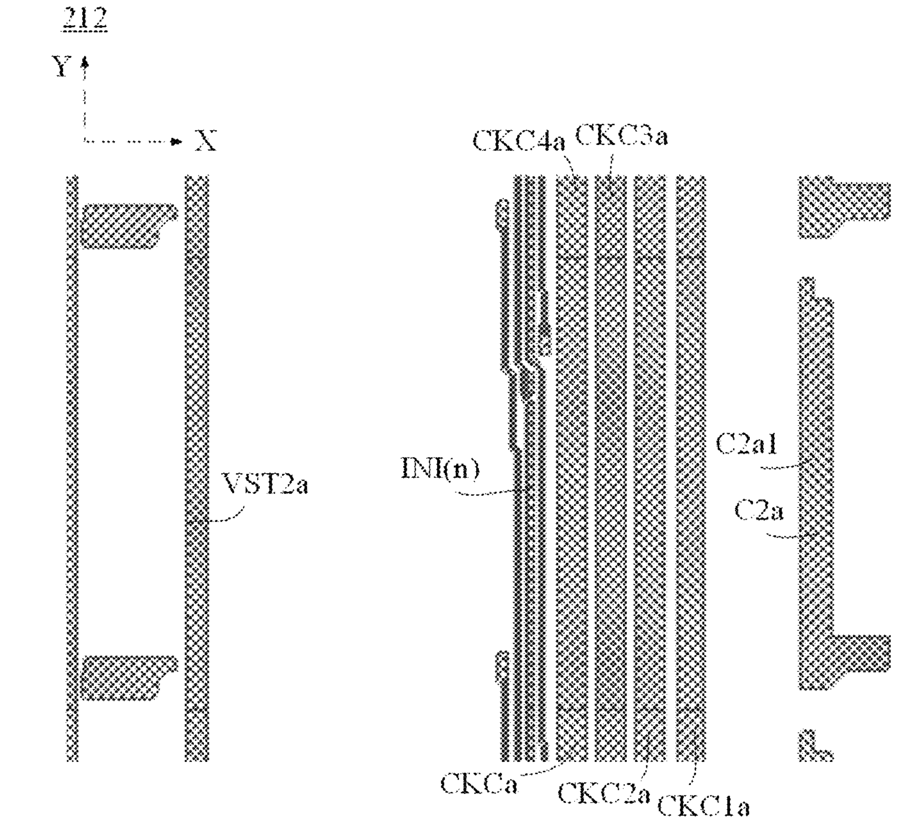
FIG. 25 is an exploded view of the light shielding layer of the display panel in FIG. 24.
Figure 26:
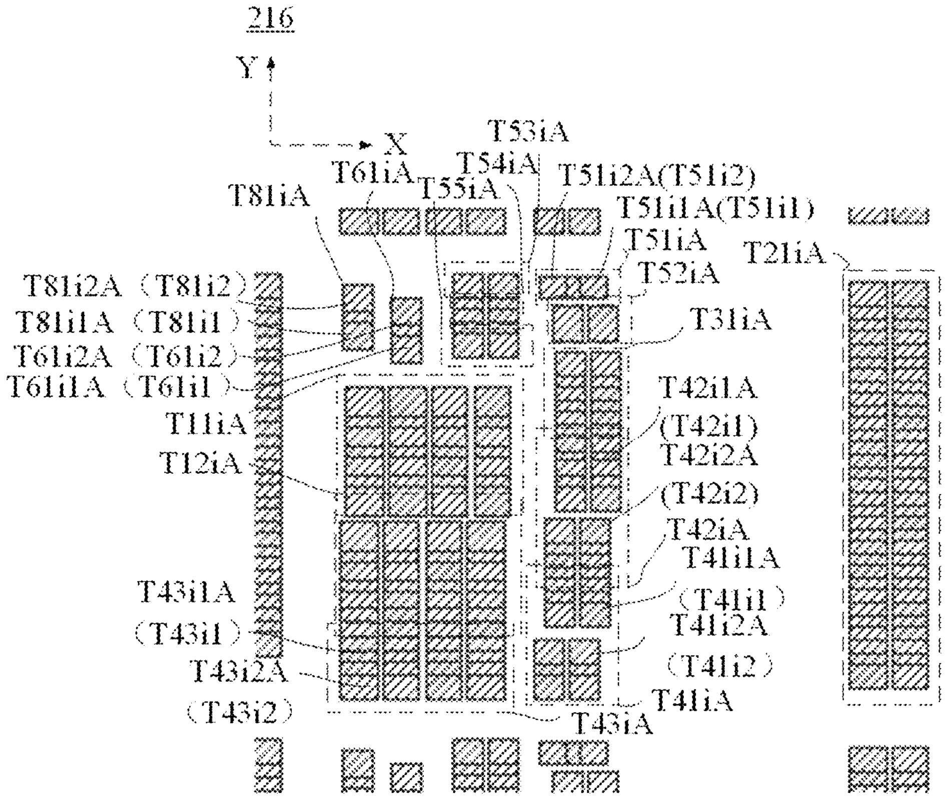
FIG. 26 is an exploded view of the active layer of the display panel in FIG. 24.
Figure 27:
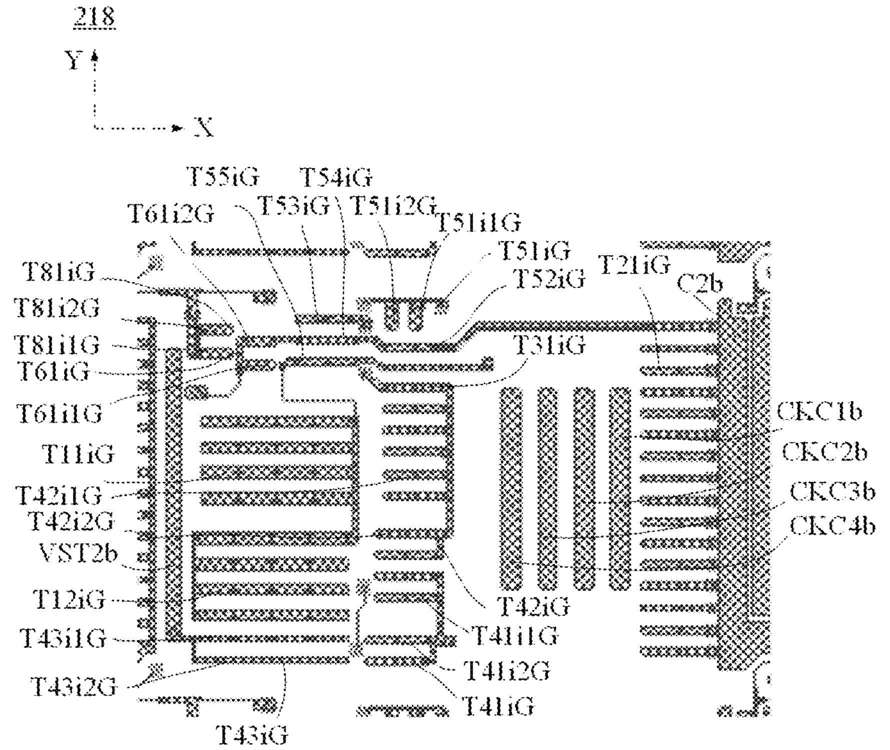
FIG. 27 is an exploded view of the gate layer of the display panel in FIG. 24.
Figure 28:
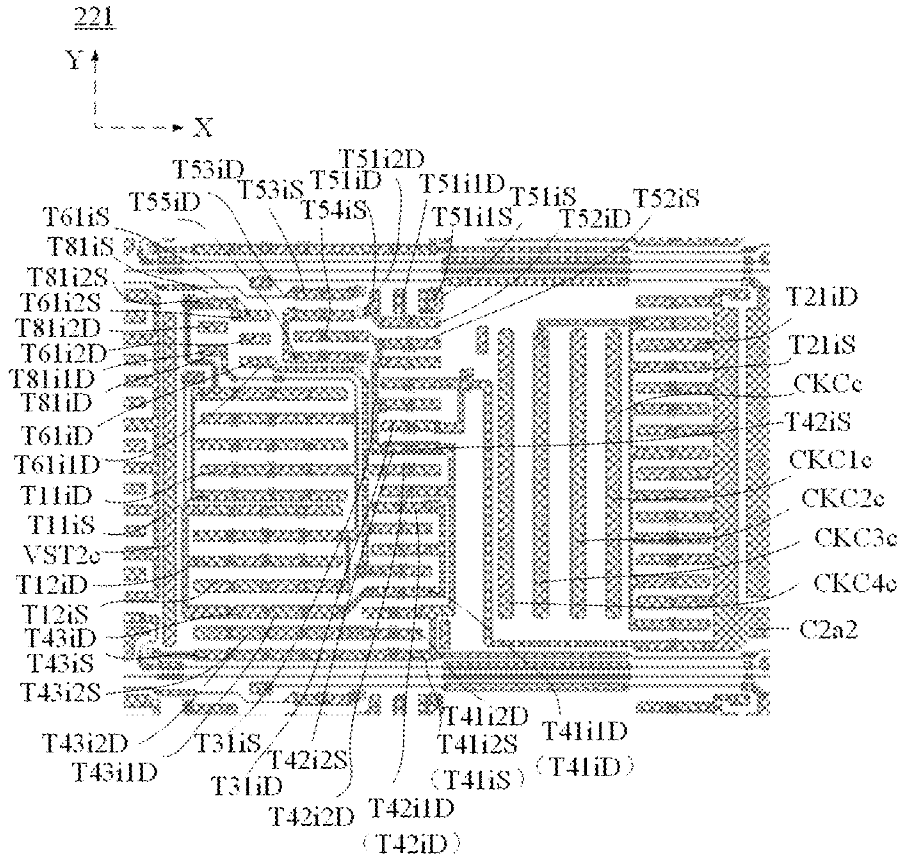
FIG. 28 is an exploded view of the first source-drain layer of the display panel in FIG. 24.
Figure 29:
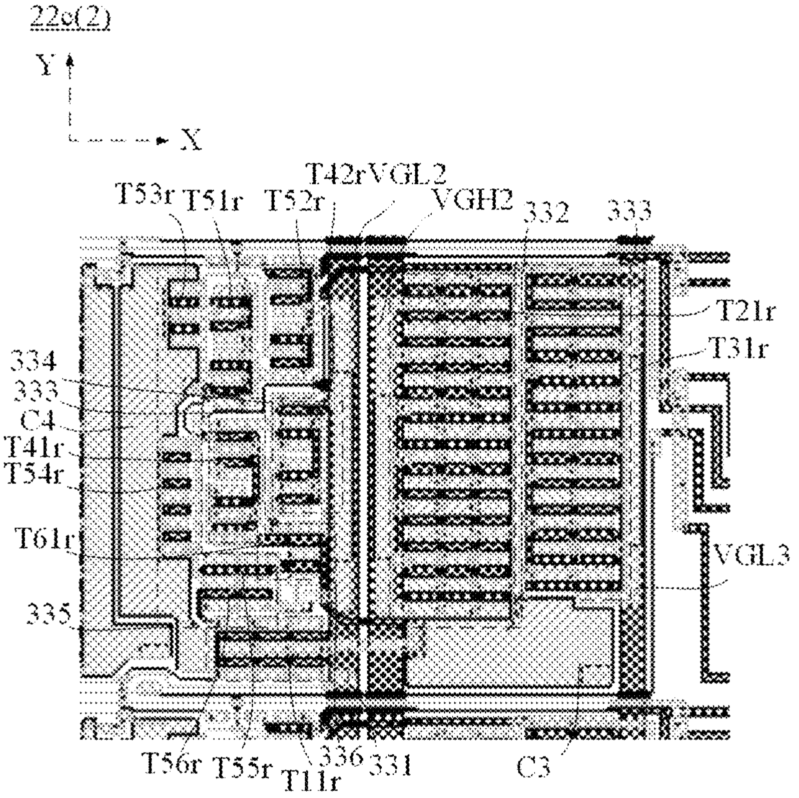
FIG. 29 is a partial enlarged view of a region of the display panel corresponding to the third-type gate circuit in FIG. 8.
Figure 30:
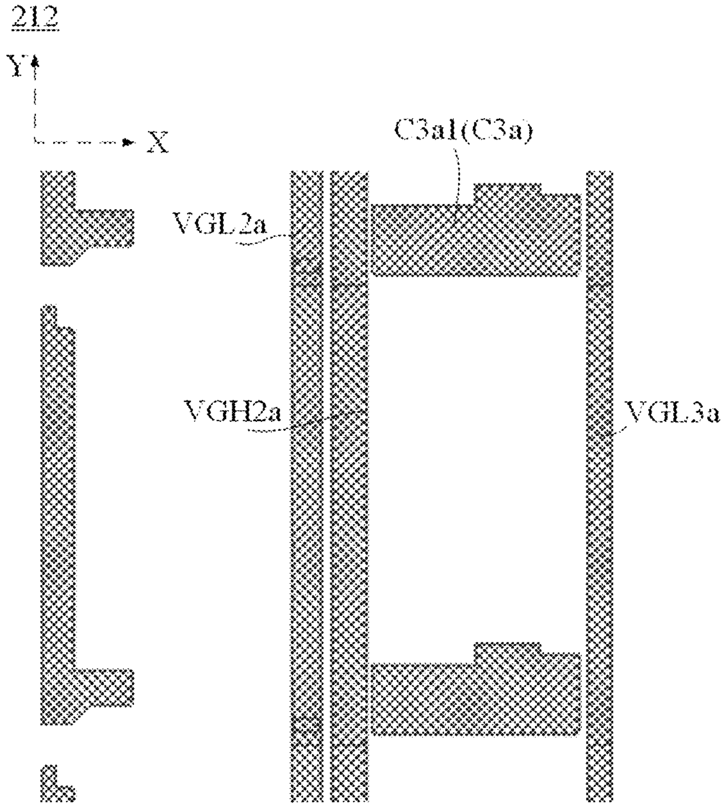
FIG. 30 is an exploded view of the light shielding layer of the display panel in FIG. 29.
Figure 31:
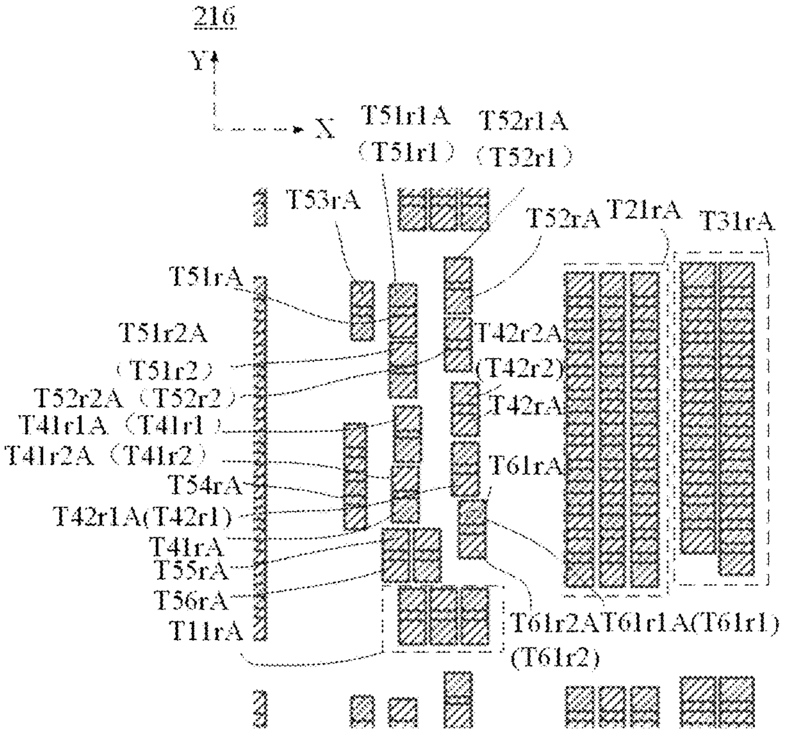
FIG. 31 is an exploded view of the active layer of the display panel in FIG. 29.
Figure 32:
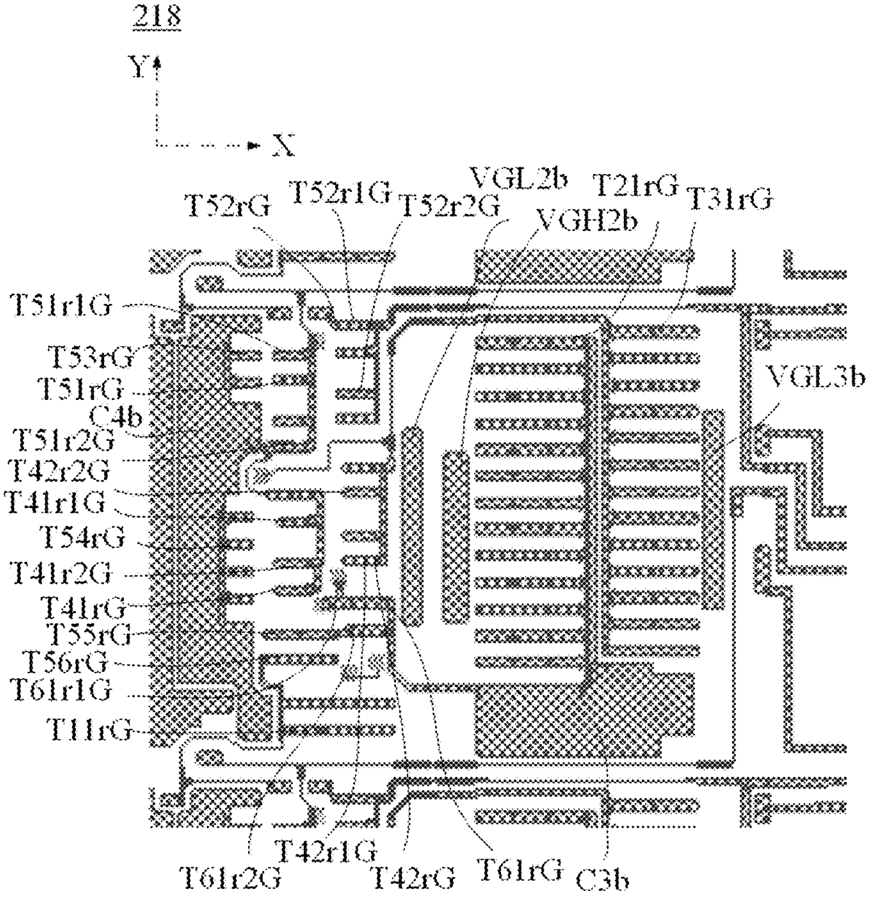
FIG. 32 is an exploded view of the gate layer of the display panel in FIG. 29.
Figure 33:
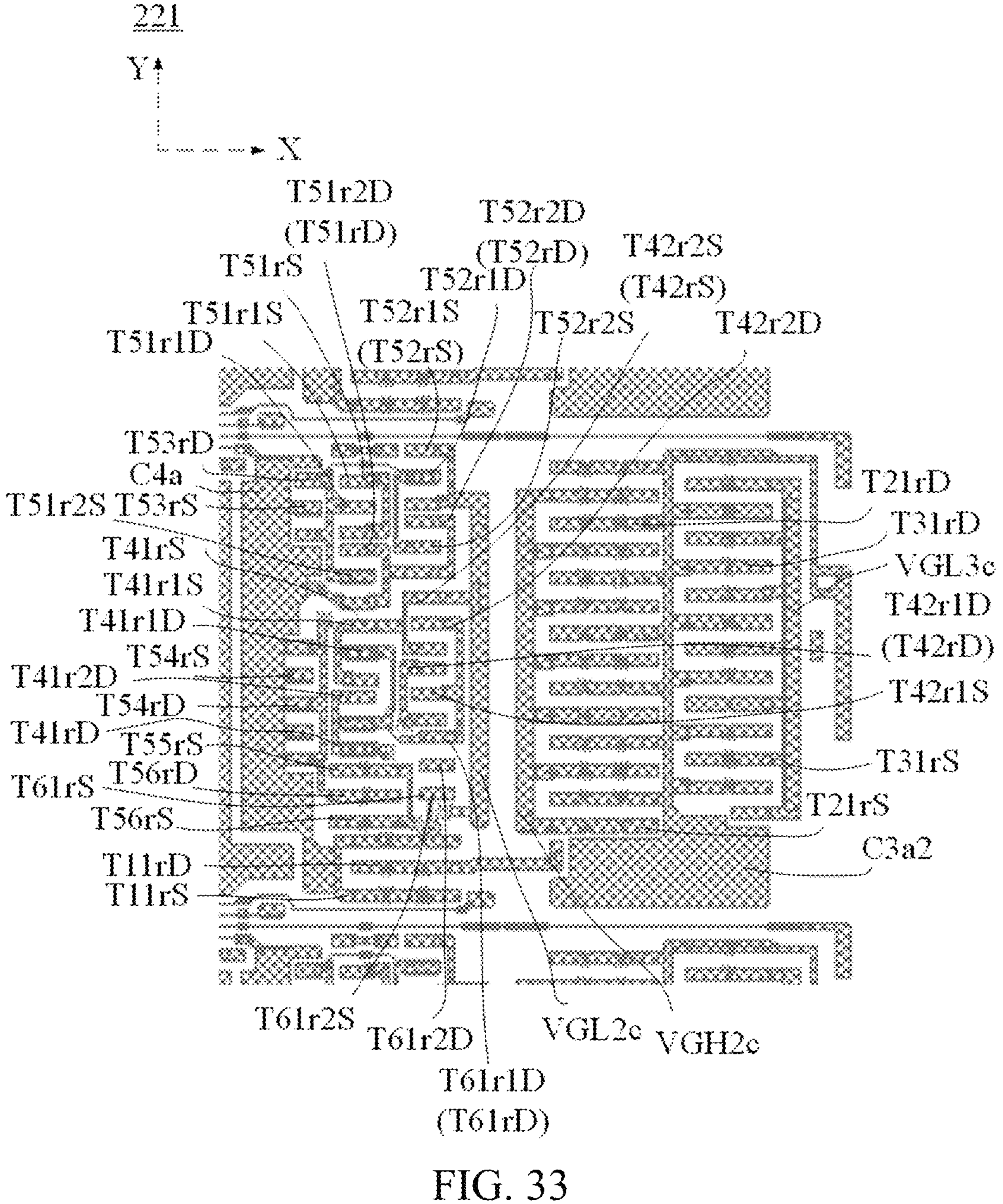
FIG. 33 is an exploded view of the first source-drain layer of the display panel in FIG. 29.

FIG. 1 is a schematic view of a comparative display device. FIG. 2 is a schematic plan view of a display panel according to some embodiments of the present disclosure. FIG. 3 is a schematic cross-sectional view of a display panel according to some embodiments of the present disclosure. FIG. 4 is a circuit diagram of a pixel driving circuit according to some embodiments of the present disclosure. FIG. 5 is a circuit diagram of a first-type gate circuit according to some embodiments of the present disclosure. FIG. 6 is a circuit diagram of a second-type gate circuit according to some embodiments of the present disclosure. FIG. 7 is a circuit diagram of a third-type gate circuit according to some embodiments of the present disclosure. FIG. 8 is a view of a stacked layer of a light shielding layer, an active layer, a gate layer, and a first source-drain layer of a display panel according to some embodiments of the present disclosure. FIG. 9 is an exploded view of the light shielding layer of the display panel in FIG. 8. FIG. 10 is an exploded view of the active layer of the display panel in FIG. 8. FIG. 11 is an exploded view of the gate layer of the display panel in FIG. 8. FIG. 12 is an exploded view of the first source-drain layer of the display panel in FIG. 8. FIG. 13 is a view of a stacked layer of the light shielding layer and the active layer of the display panel in FIG. 8. FIG. 14 is a view of a stacked layer of the light shielding layer, the active layer, and the gate layer of the display panel in FIG. 8. FIG. 15 is a view of a stacked layer of the light shielding layer and a first via hole of the display panel in FIG. 8. FIG. 16 is a view of a stacked layer of the light shielding layer and the first source-drain layer in FIG. 8. FIG. 17 is a view of a stacked layer of the gate layer and a second via hole in FIG. 8. FIG. 18 is a view of a stacked layer of the gate layer and the first source-drain layer in FIG. 8. FIG. 19 is a partial enlarged view of a region of the display panel corresponding to the first-type gate circuit in FIG. 8. FIG. 20 is an exploded view of the light shielding layer of the display panel in FIG. 19. FIG. 21 is an exploded view of the active layer of the display panel in FIG. 19. FIG. 22 is an exploded view of the gate layer of the display panel in FIG. 19. FIG. 23 is an exploded view of the first source-drain layer of the display panel in FIG. 19. FIG. 24 is a partial enlarged view of a region of the display panel corresponding to the second-type gate circuit in FIG. 8. FIG. 25 is an exploded view of the light shielding layer of the display panel in FIG. 24. FIG. 26 is an exploded view of the active layer of the display panel in FIG. 24. FIG. 27 is an exploded view of the gate layer of the display panel in FIG. 24. FIG. 28 is an exploded view of the first source-drain layer of the display panel in FIG. 24. FIG. 29 is a partial enlarged view of a region of the display panel corresponding to the third-type gate circuit in FIG. 8. FIG. 30 is an exploded view of the light shielding layer of the display panel in FIG. 29. FIG. 31 is an exploded view of the active layer of the display panel in FIG. 29. FIG. 32 is an exploded view of the gate layer of the display panel in FIG. 29. FIG. 33 is an exploded view of the first source-drain layer of the display panel in FIG. 29.

As shown in FIG. 2, the embodiments of the present disclosure provide a display panel 2. The display panel 2 includes a display region 201 and a non-display region 202. A plurality of pixels 23 are provided in the display region 201. The pixels 23 include light-emitting devices LED and pixel driving circuits 21 for driving the light-emitting devices LED. A plurality of stages of gate driving circuits 22 are provided in the non-display region 202. The plurality of stages of gate driving circuits 22 can be arranged along a second direction Y. The gate driving circuits 22 output scanning signals to the pixel driving circuits 21.

In some embodiments, as shown in FIG. 2, the non-display region 202 can be arranged around the display region 201, but the embodiments of the present disclosure are not limited thereto. The non-display region 202 can be arranged on one side, two sides, or three sides of the display region 201. The non-display region 202 can be bent to a back of the display region 201. The non-display region 202 may include an upper bezel region, a lower bezel region, a left bezel region, and a right bezel region. The gate driving circuits 22 may be arranged in the left bezel region and/or the right bezel region. The gate driving circuits 22 may be arranged on one side or two sides of the display region 201 along a first direction X.

As shown in FIG. 3, in the embodiments of the present disclosure, the display panel 2 includes a substrate 211, a light shielding layer 212, a buffer layer 213, a semiconductor layer 214, and a first gate insulating layer 215, an active layer 216, a second gate insulating layer 217, a gate layer 218, a first interlayer insulating layer 219, a first source-drain layer 221, a second interlayer insulating layer 222, a second source-drain layer 223, a passivation layer 224, a third source-drain layer 225, a first planarization layer 226, a second planarization layer 227, a pixel electrode layer 228, a first pixel definition layer 229, and a second pixel definition layer 231 arranged in sequence.

In some embodiments, a material of the semiconductor layer 214 includes an oxide semiconductor such as a metal oxide. In some embodiments, the oxide semiconductor may include indium gallium zinc oxide.

In some embodiments, a material of the active layer 216 includes silicon semiconductor material such as low-temperature polysilicon.

In some embodiments, as shown in FIG. 3, FIG. 3 shows that the display panel 2 includes the semiconductor layer 214 and the active layer 216, but the embodiments of the present disclosure are not limited thereto. In other embodiments, the display panel 2 may merely include one of the semiconductor layer 214 and the active layer 216.

In some embodiments, as shown in FIG. 3, FIG. 3 shows that the display panel 2 includes the first source-drain layer 221, the second source-drain layer 223, and the third source-drain layer 225, but the embodiments of the present disclosure are not limited thereto. In other embodiments, the display panel 2 may include one or two of the first source-drain layer 221, the second source-drain layer 223, and the third source-drain layer 225.

In some embodiments, as shown in FIG. 3, FIG. 3 shows that the light shielding layer 212 is merely disposed in the display region 201, but the embodiments of the present disclosure are not limited thereto. In other embodiments, the light shielding layer 212 may be disposed in the non-display region 202.

In some embodiments, as shown in FIG. 3, FIG. 3 shows that the transistors in the display region 201 all use the semiconductor layer 214 as an active portion, and the transistors in the non-display region 202 all use the active layer 216 as an active portion, but the embodiments of the present disclosure are not limited thereto. In other embodiments, some transistors in the display region 201 may use the semiconductor layer 214 as an active portion, and some transistors in the display region 201 may use the active layer 216 as an active portion. Similarly, some transistors in the non-display region 202 may use the semiconductor layer 214 as an active portion, and some transistors in the non-display region 202 may use the active layer 216 as an active portion.

In some embodiments, as shown in FIG. 3, the display panel 2 is an organic light-emitting diode display panel as an example for description, but the embodiments of the present disclosure are not limited thereto. In other embodiments, the display panel 2 may be a liquid crystal display panel or other types of the display panel 2.

In some embodiments, as shown in FIGS. 5 to 7, each stage of the gate driving circuits 22 includes a first-type gate circuit 22*a*, a second-type gate circuit 22*b*, and a third-type gate circuit 22*c* arranged along the first direction.

As shown in FIGS. 2 to 33, the embodiments of the present disclosure provide the display panel 2. The display panel 2 includes a plurality of rows of pixels 23 and the plurality of stages of gate driving circuits 22. The pixels 23 include the light-emitting devices LED and the pixel driving circuits 21. Each stage of gate driving circuits 22 is electrically connected to a corresponding one of the pixel driving circuits 21. Each stage of the gate driving circuits 22 includes a first-type gate circuit 22*a*, a second-type gate circuit 22*b*, and a third-type gate circuit 22*c*. The first-type gate circuit 22*a* is electrically connected to at least a first clock signal line CKA, a second clock signal line CKB, a first high potential signal line VGH1, a first low potential signal line VGL2, a first low potential signal line VGL2, a first low potential signal line VST1, and a low-frequency signal line LC. The second-type gate circuit 22*b* is electrically connected to at least the first high potential signal line VGH1, the second low potential signal line VGL2, a third clock signal line CKC of the display panel and a second reset control line VST2 of the display panel. The third-type gate circuit 22*c* is electrically connected to at least the first high potential signal line VGH1, a second high potential signal line VGH2, the second low potential signal line VGL2, and a third low potential signal line VGL3.

The first reset control line VST1, the first-type gate circuit 22*a*, the second-type gate circuit 22*b*, the third-type gate circuit 22*c*, and the third low potential signal line VGL3 are arranged along the first direction. In the first direction, at least one of the first clock signal line CKA, the second clock signal line CKB, the third clock signal line CKC, the first high potential signal line VGH1, the second high potential signal line VGH2, the first low potential signal line VGL1, the second low potential signal line VGL2, the second reset control line VST2, and the low-frequency signal line LC is arranged between the first reset control line VST1 and the third low potential signal line VGL3.

The embodiments of the present disclosure provide the display panel 2. In the display panel 2, in the first direction, at least one of the first clock signal line CKA, the second clock signal line CKB, the third clock signal line CKC, the first high potential signal line VGH1, the second high potential signal line VGH2, the first low potential signal line VGL1, the second low potential signal line VGL2, the second reset control line VST2, and the low-frequency signal line LC is arranged between the first reset control line VST1 and the third low potential signal line VGL3, so that each signal line arranged between the first reset control line VST1 and the third low potential signal line VGL3 can be directly connected to the corresponding transistor without occupying a space of the wiring regions of the gate driving circuits 22. Furthermore, a space occupied by transistor regions of the gate driving circuits 22 can be reduced, a space occupied by the gate driving circuits 22 can be reduced, and the bezel of the display panel 2 can be reduced.

In some embodiments, as shown in FIGS. 8 to 18, in the first direction, at least one of the first clock signal line CKA, the second clock signal line CKB, and the third clock signal lines CKC is arranged between the first reset control line VST1 and the third low potential signal line VGL3. At least one of the first clock signal line CKA, the second clock signal line CKB, and the third clock signal line CKC is arranged between the first reset control line VST1 and the third low potential signal line VGL3, a connection line between at least one of the first clock signal line CKA, the second clock signal line CKB, and the third clock signal line CKC and the corresponding transistor can be shortened without occupying the space outside the transistor region of the gate driving circuits 22. Thus, the lateral space occupied by at least one clock signal line is reduced, the lateral space occupied by the gate driving circuits 22 is reduced, and the bezel of the display panel 2 is reduced.

In some embodiments, it can be understood that each clock signal line in the display panel 2 includes a plurality of clock lines. The plurality of clock lines are arranged outside the transistor region and extend into the transistor region to be connected to the transistors, thereby a space occupied by the clock lines is relatively large, resulting in a relatively large lateral space occupied by the gate driving circuit 22 and a relatively large bezel of the display panel 2. In the embodiments of the present disclosure, at least one of the first clock signal line CKA, the second clock signal line CKB, and the third clock signal CKC is arranged between the first reset control line VST1 and the third low potential signal line VGL3, so that the space occupied by the clock signal line can be reduced and the bezel of the display panel 2 can be reduced.

In some embodiments, the first clock signal line CKA may be arranged between the first reset control line VST1 and the third low potential signal line VGL3.

In some embodiments, the second clock signal line CKB may be arranged between the first reset control line VST1 and the third low potential signal line VGL3.

In some embodiments, the third clock signal line CKC may be arranged between the first reset control line VST1 and the third low potential signal line VGL3.

In some embodiments, as shown in FIGS. 8 to 18, in the first direction, the first clock signal line CKA and the second clock signal line CKB are arranged between the first reset control line VST1 and between the third low potential signal line VGL3. The first clock signal line CKA and the second clock signal line CKB are arranged between the first reset control line VST1 and the third low potential signal line VGL3, so that the lateral space occupied by the first clock signal line CKA and the second clock signal line CKB can be reduced, thereby reducing the bezel of the display panel 2.

In some embodiments, each of the first clock signal line CKA and the second clock signal line CKB includes the plurality of clock lines, so that the first clock signal line CKA and the second clock signal line CKB are arranged between the first reset control line VST1 and the third low potential signal lines VGL3, so that the lateral space occupied by the gate driving circuits 22 can be reduced, and the bezel of the display panel 2 can be reduced.

In some embodiments, as shown in FIGS. 8 to 18, in the first direction, the first clock signal line CKA and the second clock signal line CKB are arranged between the first reset control line VST1 and the second-type gate circuit 22*b*. The first clock signal line CKA and the second clock signal line CKB are arranged between the first reset control line VST1 and the second-type gate circuit 22*b*, so that the first clock signal line CKA and the second clock signal line CKB are close to the transistors connected thereto, and the connecting lines of each clock line are relatively short or even no connecting lines, thereby further reducing the space occupied by the first clock signal line CKA and the second clock signal line CKB and reducing the bezel of the display panel 2.

In some embodiments, the first clock signal line CKA is connected to the transistor in the first-type gate circuit 22*a*, and the second clock signal line CKB is connected to the transistor in the second-type gate circuit 22*b*. Thus the first clock signal line CKA and the second clock signal line CKB may be arranged between the first reset control line VST1 and the second-type gate circuit 22*b*, so that the first clock signal line CKA and the second clock signal line CKB are closer to the transistors connected thereto, and the connecting lines of each clock line are relatively short, thereby further reducing the space occupied by the first clock signal line CKA and the second clock signal line CKB and reducing the bezel of the display panel 2.

In some embodiments, as shown in FIGS. 5, 8 to 18, and 19 to 23, the first-type gate circuit 22*a* includes a first pull-up control module 311 and a first pull-up module 312. The first pull-up control module 311 is electrically connected to the first pull-up module 312 at a first pull-up node Q1[*n*]. The second clock signal line CKB includes a first group of sub-lines CKBi and a second group of sub-lines CKBj. The first pull-up module 312 includes a first pull-up transistor T21*j*, a second pull-up transistor T22*j*, and a third pull-up transistor T23*j*. An electrode of the first pull-up transistor T21*j* is electrically connected to the first clock signal line CKA. An electrode of the second pull-up transistor T22*j* is electrically connected to the first group of sub-lines CKBi. An electrode of the third pull-up transistor T23*j* is electrically connected to the second group of sub-lines CKBj.

The first pull-up transistor T21*j*, the second pull-up transistor T22*j*, and the third pull-up transistor T23*j* are arranged in sequence along the first direction. In the first direction, the first clock signal line CKA is arranged between the first pull-up control module 311 and the first pull-up transistor T21*j*. The first group of sub-lines CKBi is arranged between the first pull-up transistor T21*j* and the second pull-up transistor T22*j*. The second group of sub-lines CKBj is arranged between the second pull-up transistor T22*j* and the third pull-up transistor T23*j*. The first clock signal line CKA is arranged between the first pull-up control module 311 and the first pull-up transistor T21*j*. The first group of sub-lines CKBi is arranged between the first pull-up transistor T21*j* and the second pull-up transistor T22*j*. The second group of sub-lines CKBj is arranged between the second pull-up transistor T22*j* and the third pull-up transistor T23*j*. As such, each clock signal line is close to the transistor connected thereto, and a length of a connection line between each clock signal line and the transistor connected thereto is shortened or even eliminating the connection line, thereby reducing the space occupied by each clock signal line and reducing the bezel of the display panel 2.

In some embodiments, as shown in FIGS. 8 to 18, in the first direction, the third clock signal line CKC is arranged between the first reset control line VST1 and the third low potential signal line VGL3. The third clock signal line CKC is arranged between the first reset control line VST1 and the third low potential signal line VGL3, so that the third clock signal line CKC can be closer to the transistor connected thereto, and the connection line of the third clock signal line CKC is relatively short or even no connection line is required, thereby further reducing a space occupied by the third clock signal line CKC and reducing the bezel of the display panel 2.

In some embodiments, as shown in FIGS. 8 to 18, in the first direction, the third clock signal line CKC is arranged between the first-type gate circuit 22*a* and the third-type gate circuit 22*c*. The third clock signal line CKC is arranged between the first-type gate circuit 22*a* and the third-type gate circuit 22*c*, so that the third clock signal line CKC is closer to the transistor connected thereto, and the connecting line of each clock line is relatively short or even no connecting line, thereby further reducing the space occupied by the third clock signal line CKC and reducing the bezel of the display panel 2.

In some embodiments, the third clock signal line CKC is connected to the transistor in the second-type gate circuit 22*b*, so that the third clock signal line CKC may be arranged between the first-type gate circuit 22*a* and the third-type gate circuit 22*c*. Thus, the third clock signal line CKC is closer to the transistor connected thereto, and the connecting line between each clock line is relatively short, thereby further reducing the space occupied by the third clock signal line CKC and reducing the bezel of the display panel 2.

In some embodiments, as shown in FIGS. 6, 8 to 18, and 24 to 28, the second-type gate circuit 22*b* includes a second pull-up control module 321 and a second pull-up module 322. The second pull-up control module 321 and the second pull-up module 322 are electrically connected to the second pull-up node Q2[*n*]. The second pull-up module 322 is electrically connected to the third clock signal line CKC.

In the first direction, the third clock signal line CKC is arranged between the second pull-up control module 321 and the second pull-up module 322. The third clock signal line CKC is arranged between the second pull-up control module 321 and the second pull-up module 322, so that the third clock signal line CKC is arranged adjacent to the transistor connected thereto. Thus a length of the connection line between the third clock signal line CKC and the transistor connected thereto can be shortened or even eliminated, thereby reducing the space occupied by the third clock signal line CKC and reducing the bezel of the display panel 2.

In some embodiments, the second pull-up module 322 includes a fourth pull-up transistor T21*i*. An electrode of the fourth pull-up transistor T21*i* is electrically connected to the third clock signal line CKC. The third clock signal line CKC is arranged between the fourth pull-up transistor T21*i* and the second pull-up control module 321 in the first direction.

In some embodiments, in the first direction, the first high potential signal line VGH1 is arranged between the first reset control line VST1 and the third low potential signal line VGL3. The first high potential signal line VGH1 is arranged between the first reset control line VST1 and the third low potential signal line VGL3, so that the first high potential signal line VGH1 is closer to the transistor connected thereto. Thus, the connection line of the first high potential signal line VGH1 is relatively short or even no connection line is required, thereby further reducing a space occupied by the first high potential signal line VGH1 and reducing the bezel of the display panel 2. In some embodiments, as shown in FIGS. 5, 8 to 18, and 19 to 23, the first-type gate circuit 22*a* includes a first pull-up control module 311. The first pull-up control module 311 is electrically connected to the first high potential signal line VGH1.

In the first direction, the first high potential signal line VGH1 is arranged between the first reset control line VST1 and the first pull-up control module 311. The first high potential signal line VGH1 is arranged between the first reset control line VST1 and the first pull-up control module 311, so that the first high potential signal line VGH1 is arranged adjacent to the transistor connected thereto. Thus, a length of the connection line between the first high potential signal line VGH1 and the transistor connected thereto can be shortened or even eliminated, thereby reducing the space occupied by the first high potential signal line VGH1 and reducing the bezel of the display panel 2.

In some embodiments, for a case where the first high potential signal line VGH1 is connected to the second-type gate circuit 22*b* and the third-type gate circuit 22*c*, connecting lines may be arranged above each stage of the gate driving circuits 22 or within each stage of the gate driving circuits 22, so as to realize the connection between each transistor and the first high potential signal line VGH1.

In some embodiments, the first pull-up control module 311 includes a first pull-up control transistor T11*j*. An electrode of the first pull-up control transistor T11*j* is electrically connected to the first high potential signal line VGH1. The first high potential signal line VGH1 is arranged between the first pull-up control transistor T11*j* and the first reset control line VST1 in the first direction.

In some embodiments, as shown in FIGS. 8 to 18, in the first direction, the second high potential signal line VGH2 is arranged between the first reset control line VST1 and the third low potential signal line VGL3. The second high potential signal line VGH2 is arranged between the first reset control line VST1 and the third low potential signal line VGL3, so that the second high potential signal line VGH2 is closer to the transistor connected thereto. Thus, a connection line of the second high potential signal line VGH2 is relatively short or even no connection line is required, thereby further reducing a space occupied by the second high potential signal line VGH2 and reducing the bezel of the display panel 2.

In some embodiments, as shown in FIGS. 7, 8 to 18, and 29 to 33, the third-type gate circuit 22*c* includes a third pull-up control module 331 and a third pull-up module 332. The third pull-up control module 331 is electrically connected to the third pull-up module 332 at a third pull-up node Q3[*n*]. The third pull-up module 332 is electrically connected to the second high potential signal line VGH2.

In the first direction, the second high potential signal line VGH2 is arranged between the third pull-up control module 331 and the third pull-up module 332. The second high potential signal line VGH2 is arranged between the third pull-up control module 331 and the third pull-up module 332, so that the second high potential signal line VGH2 is arranged adjacent to the transistor connected thereto. Thus, a length of the connection line between the second high potential signal line VGH2 and the transistor connected thereto can be shortened or even eliminated, thereby reducing the space occupied by the second high potential signal line VGH2 and reducing the bezel of the display panel 2.

In some embodiments, the third pull-up module 332 includes a fifth pull-up transistor T21*r*. An electrode of the fifth pull-up transistor T21*r* is electrically connected to the second high potential signal line VGH2. The second high potential signal line VGH2 is arranged between the third pull-up control module 331 and the fifth pull-up transistor T21*r* in the first direction.

In some embodiments, the second high potential signal line VGH2 is arranged between the second low potential signal line VGL2 and the fifth pull-up transistor T21*r* in the first direction.

In some embodiments, as shown in FIGS. 8 to 18, in the first direction, the first low potential signal line VGL1 is arranged between the first reset control line VST1 and the third low potential signal line between VGL3. The first low potential signal line VGL1 is arranged between the first reset control line VST1 and the third low potential signal line VGL3, so that the first low potential signal line VGL1 is closer to the transistor connected thereto. Thus, a connection line of the first low potential signal line VGL1 is relatively short or even no connection line is required, thereby further reducing a space occupied by the first low potential signal line VGL1 and reducing the bezel of the display panel 2.

In some embodiments, as shown in FIGS. 5, 8 to 18, and 19 to 23, the first-type gate circuit 22*a* includes a first pull-down maintaining module 314. The first pull-down maintaining module 314 is electrically connected to the first low potential signal line VGL1.

In the first direction, the first low potential signal line VGL1 is arranged between the first pull-down maintaining module 314 and the second-type gate circuit 22*b*. The first low potential signal line VGL1 is arranged between the first pull-down maintaining module 314 and the second-type gate circuit 22*b*, so that the first low potential signal line VGL1 is arranged adjacent to the transistor connected thereto. Thus, the length of the connection line between the first low potential signal line VGL1 and the transistor connected thereto can be shortened or even eliminated, thereby reducing the space occupied by the first low potential signal line VGL1 and reducing the bezel of the display panel 2.

In some embodiments, for a case where the first low potential signal line VGL1 is connected to other modules, connecting lines may be arranged above each stage of the gate driving circuits 22 or within each stage of the gate driving circuits 22, so as to realize the connection between each transistor and the first low potential signal line VGL1.

In some embodiments, the first pull-down maintaining module 314 includes a first pull-down maintaining transistor T42*j*. An electrode of the first pull-down maintaining transistor T42*j* is electrically connected to the first low potential signal line VGL1. The first low potential signal line VGL1 is arranged between the first pull-down maintaining transistor T42*j* and the second-type gate circuit 22*b* in the first direction.

In some embodiments, the first low potential signal line VGL1 is arranged between the first pull-down maintaining transistor T42*j* and the first clock signal line CKA in the first direction.

In some embodiments, as shown in FIGS. 8 to 18, in the first direction X, the second low potential signal line VGL2 is arranged between the first reset control line VST1 and the third low potential signal line VGL3. The second low potential signal line VGL2 is arranged between the first reset control line VST1 and the third low potential signal line VGL3, so that the second low potential signal line VGL2 is closer to the transistor connected thereto. Thus, a connection line of the second low potential signal line VGL2 is relatively short or even no connection line is required, thereby further reducing a space occupied by the second low potential signal line VGL2 and reducing the bezel of the display panel 2.

In some embodiments, as shown in FIGS. 8 to 18, in the first direction X, the second low potential signal line VGL2 is arranged between the second-type gate circuit 22*b* and the third low potential signal line VGL3. The second low potential signal line VGL2 is arranged between the second-type gate circuit 22*b* and the third low potential signal line VGL3, a distance between the second low potential signal line VGL2 and the transistor connected thereto can be further shortened. Thus, the connection line of the second low potential signal line VGL2 is relatively short or even no connection line is required, thereby further reducing the space occupied by the second low potential signal line VGL2 and reducing the bezel of the display panel 2.

In some embodiments, as shown in FIGS. 7, 8 to 18, and 29 to 33, the third-type gate circuit 22*c* includes a third pull-down maintaining module 334. The third pull-down maintaining module 334 is electrically connected to the second low potential signal line VGL2.

In the first direction, the second low potential signal line VGL2 is arranged between the third pull-down maintaining module 334 and the third low potential signal line VGL3. The second low potential signal line VGL2 is arranged between the third pull-down maintaining module 334 and the third low potential signal line VGL3, so that the second low potential signal line VGL2 is arranged adjacent to the transistor connected thereto. Thus, the length of the connection line between the second low potential signal line VGL2 and the transistor connected thereto can be shortened or even eliminated, thereby reducing the space occupied by the second low potential signal line VGL2 and reducing the bezel of the display panel 2.

In some embodiments, for a case where the second low potential signal line VGL2 is connected to the first-type gate circuit 22*a* and the second-type gate circuit 22*b*, connecting lines may be arranged above each stage of the gate driving circuits 22 or within each stage of the gate driving circuits 22, so as to realize the connection between each transistor and the second low potential signal line VGL2.

In some embodiments, the third pull-down maintaining module 334 includes a third pull-down maintaining transistor T42*r*. An electrode of the third pull-down maintaining transistor T42*r* is electrically connected to the second low potential signal line VGL2. The second low potential signal line VGL2 is arranged between the third pull-down maintaining transistor T42*r* and a third low potential signal line VGL3 in the first direction.

In some embodiments, the second low potential signal line VGL2 is arranged between the third pull-down maintaining transistor T42*r* and the second high potential signal line VGH2 in the first direction.

In some embodiments, as shown in FIGS. 8 to 18, in the first direction, the second reset control line VST2 is arranged between the first reset control line VST1 and the third low potential signal line between VGL3. The second reset control line VST2 is arranged between the first reset control line VST1 and the third low potential signal line VGL3, so that the second reset control line VST2 is closer to the transistor connected thereto. Thus, the connection line of the second reset control line VST2 is relatively short or even no connection line is required, thereby further reducing a space occupied by the second reset control line VST2 and reducing the bezel of the display panel 2.

In some embodiments, as shown in FIGS. 8 to 18, in the first direction, the second reset control line VST2 is arranged between the first-type gate circuit 22*a* and the third-type gate circuit 22*c*. The second reset control line VST2 is arranged between the first-type gate circuit 22*a* and the third-type gate circuit 22*c*, so that a distance between the second reset control line VST2 and transistor connected thereto can be further shortened. Thus, the connection line of the second the reset control line VST2 is relatively short or even no connection line is required, thereby further reducing the space occupied by the second low potential signal line VST2 and reducing the bezel of the display panel 2.

In some embodiments, as shown in FIGS. 6, 8 to 18, and 24 to 28, the second-type gate circuit 22*b* includes a second reset module 327. The second reset module 327 is electrically connected to the second reset control line VST2.

In the first direction, the second reset control line VST2 is arranged between the second reset module 327 and the first-type gate circuit 22*a*. The second reset control line VST2 is arranged between the second reset module 327 and the first-type gate circuit 22*a*, so that the second reset control line VST2 is arranged adjacent to the transistor connected thereto. Thus, a length of the connection line between the second reset control line VST2 and the transistor connected thereto can be shortened or even eliminated, thereby reducing a space occupied by the second reset control line VST2 and reducing the bezel of the display panel 2.

In some embodiments, the second reset module 327 includes a second reset transistor T43*i*. A gate T43*i*G of the second reset transistor T43*i* is electrically connected to the second reset control line VST2. The second reset control line VST2 is arranged between the second reset transistor T43*i* and the first-type gate circuit 22*a* in the first direction.

In some embodiments, the second reset control line VST2 is arranged between the second reset transistor T43*i* and the third pull-up transistor T23*j* in the first direction.

In some embodiments, as shown in FIGS. 8 to 18, in the first direction X, the low-frequency signal line LC is arranged between the first reset control line VST1 and the third low potential signal line VGL3. The low-frequency signal line LC is arranged between the first reset control line VST1 and the third low potential signal line VGL3, so that the low-frequency signal line LC is closer to the transistor connected thereto. Thus, a length of a connection line between the low-frequency signal line LC is relatively short or even no connection line is required, thereby further reducing a space occupied by the low-frequency signal line LC and reducing the bezel of the display panel 2.

In some embodiments, as shown in FIGS. 8 to 18, in the first direction, the low-frequency signal line LC is arranged between the first reset control line VST1 and the second-type gate circuit 22*b*. The low-frequency signal line LC is arranged between the first reset control line VST1 and the second-type gate circuit 22*b*, so that the distance between the low-frequency signal line LC and the transistor connected thereto can be further shortened. Thus, the connection line of the low-frequency signal line LC is relatively short or even no connection line is required, thereby further reducing the space occupied by the low-frequency signal line LC and reducing the bezel of the display panel 2.

In some embodiments, as shown in FIGS. 5, 8 to 18, and 19 to 23, the first-type gate circuit 22*a* includes a first inverter module 315. The first inverter module 315 is electrically connected to the low-frequency signal line LC.

In the first direction, the low-frequency signal line LC is arranged between the first inverter module 315 and the second-type gate circuit 22*b*. The low-frequency signal line LC is arranged between the first inverter module 315 and the second-type gate circuit 22*b*, so that the low-frequency signal line LC is arranged adjacent to the transistor connected thereto. Thus the length of the connecting line between the low-frequency signal line LC and the transistor connected thereto can be shortened or even eliminated, thereby reducing the space occupied by the low-frequency signal line LC and reducing the bezel of the display panel 2.

In some embodiments, for a case where the low-frequency signal line LC is connected to the second-type gate circuit 22*b*, connecting lines may be arranged above each stage of the gate driving circuits 22 or within each stage of the gate driving circuits 22, so as to realize the connection between each transistor and the low-frequency signal line LC.

In some embodiments, the first inverter module 315 includes a first inverter transistor T51*j*. An electrode of the first inverter transistor T51*j* is electrically connected to the low-frequency signal line LC. The low-frequency signal line LC is arranged between the first inverter transistor T51*j* and the second-type gate circuit 22*b* in the first direction.

In some embodiments, the low-frequency signal line LC is arranged between the first low potential signal line VGL1 and the first clock signal line CKA in the first direction.

In some embodiments, as shown in FIGS. 2 to 33, the first-type gate circuit 22*a* includes a first pull-up control module 311 and a first pull-up module 312 electrically connected to each other. The first pull-up module 312 includes a first pull-up transistor T21*j*, a second pull-up transistor T22*j*, and a third pull-up transistor T23*j*. The second-type gate circuit 22*b* includes a second pull-up control module 321 and a second pull-up module 322 electrically connected to each other. The third-type gate circuit 22*c* includes a third pull-up control module 331 and a third pull-up module 332 electrically connected to each other. The second clock signal line CKB includes the first group of sub-lines CKBi and the second group of sub-lines CKBj.

In the first direction, the first reset control line VST1, the first high potential signal line VGH1, the first pull-up control module 311, the first low potential signal line VGL1, the low-frequency signal line LC, the first clock signal line CKA, the first pull-up transistor T21*j*, the first group of sub-lines CKBi, the second pull-up transistor T22*j*, the second group of sub-lines CKBj, the third pull-up transistor T23*j*, the second reset control line VST2, the second pull-up control module 321, the third clock signal line CKC, the second pull-up module 322, the third pull-up module 331, the second low potential signal line VGL2, the second high potential signal line VGH2, the third pull-up module 332, and the third low potential signal line VGL3 are arranged in sequence. As such, each signal line can be close to the corresponding transistor, so that a length of the connection line of each signal line is reduced or even eliminated, thereby reducing the lateral space occupied by the gate driving circuits 22 and reducing the bezel of the display panel 2.

In some embodiments, as shown in FIGS. 2 to 33, the display panel 2 further includes the substrate 211, the light shielding layer 212, the gate layer 218, and the first source-drain layer 221. The light shielding layer 212 is disposed on a side of the substrate 211. The gate layer 218 is disposed on a side of the light shielding layer 212 away from the substrate 211. The first source-drain layer 221 is disposed on a side of the gate layer 218 away from the light shielding layer 212.

The display panel 2 includes the plurality of stages of gate driving circuits 22. At least one of the first clock signal line CKA, the second clock signal line CKB, the third clock signal line CKC, the first high potential signal line VGH1, the second high potential signal line VGH2, the first low potential signal line VGL1, the second low potential signal line VGL2, the third low potential signal line VGL3, the first reset control line VST1, the second reset control line VST2, and the low-frequency signal line LC includes a first portion, a second portion, and a third portion. The first portion is disposed in the light shielding layer 212. The second portion is disposed in the gate layer 218. The third portion is disposed in the first source-drain layer. Each of the first portion, the second portion, and the third portion extends along a second direction.

In each stage of the gate driving circuits 22, the first portion is continuous, the second portion is disconnected, and the third portion is disconnected. The first portion is connected to the third portion, and the second portion is connected to the third portion.

An angle between the first direction and the second direction is greater than 0 degrees and less than or equal to 90 degrees. The light shielding layer 212 forms the first portion, the gate layer 218 forms the second portion, and the first source-drain layer 221 forms the third portion, so that an impedance of each signal line can be relatively small. Furthermore, each signal line can be line-crossed and connected through the portions in different layers, so that each signal line can be connected to the corresponding transistor occupied a relatively small space.

In some embodiments, as shown in FIG. 9, in the first direction, a first portion VST1*a* of the first reset control line VST1, a first portion VGH1*a* of the first high potential signal line VGH1, a first portion VGL1*a* of the first low potential signal line VGL1, a first portion LCa of the low-frequency signal line LC, a first portion CKAa of the first clock signal line CKA, a first portion CKBia of the first group of sub-lines CKBi, a first portion CKBja of the second group of sub-lines CKBj, a first portion VST2*a* of the second reset control line VST2, a first portion CKCa of the third clock signal line CKC, the second low potential signal line VGL2, the second high potential signal line VGH2, and the third low potential signal line VGL3 are arranged in sequence.

In some embodiments, as shown in FIG. 10, it can be seen that in the first direction, an active portion of each transistor in the first-type gate circuit 22*a*, an active portion of each transistor in the second-type gate circuit 22*b*, and an active portion of each transistor in the third-type gate circuit 22*c* are arranged in sequence. In FIG. 10, the active portion of each transistor in the first-type gate circuit 22*a*, the active portion of each transistor in the second-type gate circuit 22*b*, and the active portion of each transistor in the third-type gate circuit 22*c* are identified by reference numerals 216*a*, 216*b*, and 216*c*, respectively.

In some embodiments, as shown in FIG. 11, in the first direction, a second portion VST1*b* of the first reset control line VST1, a second portion VGH1*b* of the first high potential signal line VGH1, a second portion VGL1*b* of the first low potential signal line VGL1, a second portion LCb of the low-frequency signal line LC, a second portion CKAb of the first clock signal line CKA, a second portion CKBib of the first group of sub-lines CKBi, a second portion CKBjb of the second group of sub-lines CKBj, a second portion VST2*b* of the second reset control line VST2, a second portion CKCb of the third clock signal line CKC, the second low potential signal line VGL2, the second high potential signal line VGH2, and the third low potential signal line VGL3 are arranged in sequence.

In some embodiments, as shown in FIG. 12, in the first direction, a third portion VST1*c* of the first reset control line VST1, a third portion VGH1*c* of the first high potential signal line VGH1, a third portion VGL1*c* of the first low potential signal line VGL1, a third portion LCc of the low-frequency signal line LC, a third portion CKAc of the first clock signal line CKA, a third portion CKBic of the first group of sub-lines CKBi, a third portion CKBjc of the second group of sub-lines CKBj, a third portion VST2*c* of the second reset control line VST2, a third portion CKCc of the third clock signal line CKC, the second low potential signal line VGL2, the second high potential signal line VGH2, and the third low potential signal line VGL3 are arranged in sequence.

In some embodiments, it can be understood that the third portion of the first group of sub-lines CKBi and the third portion of the second group of sub-lines CKBj constitute the third portion CKBc of the second clock signal line CKB. The second portion of the first group of sub-lines CKBi and the second portion of the second group of sub-lines CKBj constitute the second portion CKBb of the second clock signal line CKB. The first portion of the first group of sub-lines CKBi and the first portion of the second group of sub-lines CKBj constitute the first portion CKBa of the second clock signal line CKB.

Moreover, FIGS. 13 to 18 are provided to illustrate corresponding relationships between different film layers. As shown in FIG. 13, a relative positional relationship between the light shielding layer 212 and the active layer 216 can be seen. As shown in FIG. 14, a relative positional relationship between the light shielding layer 212, the active layer 216, and the gate layer 218 can be seen. As shown in FIG. 8, a relative positional relationship between the light shielding layer 212, the active layer 216, the gate layer 218, and the first source-drain layer 221 can be seen. As shown in FIG. 15, a relative positional relationship between the light shielding layer 212 and the first via hole 411 can be seen, and a first via hole 411 refers to a via hole connecting the first source-drain layer 221 and the light shielding layer 212 and includes a via hole of the buffer layer 213. As shown in FIG. 16, a relative positional relationship and a connection position between the light shielding layer 212 and the first source-drain layer 221 can be seen. As shown in FIG. 17, a relative positional relationship between the gate layer 218 and a second via hole 412 can be seen. The second via hole 412 refers to a via hole of the first interlayer insulating layer 219. As shown in FIG. 18, a relative positional relationship and a connection position between the gate layer 218 and the first source-drain layer 221 can be seen.

In some embodiments, as shown in FIGS. 5, 8 to 12, and 19 to 23, in the first direction, at least one of the first clock signal line CKA, the second clock signal line CKB, the first high potential signal line VGH1, the first low potential signal line VGL1, and the low-frequency signal line LC is arranged between the first reset control line VST1 and the second-type gate circuit 22*b*. At least one of the first clock signal line CKA, the second clock signal line CKB, the first high potential signal line VGH1, the first low potential signal line VGL1, and the low-frequency signal line LC is arranged between the first reset control line VST1 and the second-type gate circuit 22*b*, so that the length of the connection line that provided when connecting each signal line to the corresponding transistor can be reduced. As such, there is no need for the signal lines outside the transistor regions to extend into the transistor regions, thereby reducing a space outside the transistor regions occupied by the signal lines and a space within the transistor regions. Thus, the lateral space occupied by the signal line connected to the first-type gate circuit 22*a* is reduced, the lateral space occupied by the first-type gate circuit 22*a* is reduced, and the bezel of the display panel 2 is reduced.

In some embodiments, as shown in FIGS. 5 and 19 to 23, the first-type gate circuit 22*a* includes the first pull-up control module 311. The first pull-up control module 311 is electrically connected to the first high potential signal line VGH1. In the first direction, the first high potential signal line VGH1 is arranged between the first reset control line VST1 and the first pull-up control module 311. The first high potential signal line VGH1 is arranged between the first reset control line VST1 and the first pull-up control module 311. When the first high potential signal line VGH1 is connected to the first pull-up control module 311, the lateral space occupied by the first high potential signal line VGH1 (including the connection line that transmits the signal from the first high potential signal line VGH1. Similarly, other signal lines including their connection lines) can be reduced, the lateral space occupied by the first-type gate circuit 22*a* is reduced, and the bezel is reduced.

In some embodiments, as shown in FIGS. 5 and 19 to 23, the first-type gate circuit 22*a* includes the first pull-down maintaining module 314. The first pull-down maintaining module 314 is electrically connected to the first low potential signal line VGL1. In the first direction, the first low potential signal line VGL1 is arranged between the first pull-down maintaining module 314 and the second-type gate circuit 22*b*. The first low potential signal line VGL1 is arranged between the first pull-down maintaining module 314 and the second-type gate circuit 22*b*. When the first low potential signal line VGL1 is connected to the first pull-down maintaining module 314, the lateral space occupied by the first low potential signal line VGL1 can be reduced, the lateral space occupied by the first-type gate circuit 22*a* can be reduced, and the bezel can be reduced.

In some embodiments, as shown in FIGS. 5 and 19 to 23, the first-type gate circuit 22*a* includes the first inverter module 315. The first inverter module 315 is electrically connected to the low-frequency signal line LC. In the first direction, the low-frequency signal line LC is arranged between the first low potential signal line VGL1 and the second-type gate circuit 22*b*. The low-frequency signal line LC is arranged between the first low potential signal line VGL1 and the second-type gate circuit 22*b*, so that the lateral space occupied by the low-frequency signal line LC can be reduced, the lateral space occupied by the first-type gate circuit 22*a* can be reduced, and the bezel can be reduced.

In some embodiments, as shown in FIGS. 5 and 19 to 23, the first-type gate circuit 22*a* includes the first pull-up module 312. The second clock signal line CKB includes the first group of sub-lines CKBi and the second group of sub-lines CKBj. The first pull-up module 312 includes a first pull-up transistor T21*j*, a second pull-up transistor T22*j*, and a third pull-up transistor T23*j*.

An electrode of the first pull-up transistor T21*j* is electrically connected to the first clock signal line CKA.

An electrode of the second pull-up transistor T22*j* is electrically connected to the first group of sub-lines CKBi.

An electrode of the third pull-up transistor T23*j* is electrically connected to the second group of sub-lines CKBj.

The first pull-up transistor T21*j*, the second pull-up transistor T22*j*, and the third pull-up transistor T23*j* are arranged in sequence along a first direction. In the first direction, the first clock signal line CKA is arranged between the low-frequency signal line LC and the first pull-up transistor T21*j*, the first group of sub-lines CKBi is arranged between the first pull-up transistor T21*j* and the second pull-up transistor T22*j*, and the second group of sub-lines CKBj is arranged between the second pull-up transistor T22*j* and the third pull-up transistor T23*j*. The first clock signal line CKA is arranged between the low-frequency signal line LC and the first pull-up transistor T21*j*, the first group of sub-lines CKBi is arranged between the first pull-up transistor T21*j* and the second pull-up transistor T22*j*, and the second group of sub-lines CKBi is arranged between the second pull-up transistor T22*j* and the third pull-up transistor T23*j*, so that the lateral space occupied by each clock signal line can be reduced, the lateral space occupied by the first-type gate circuit 22*a* can be reduced, and the bezel can be reduced.

In some embodiments, as shown in FIG. 5, the first-type gate circuit 22*a* includes the first pull-up control module 311, the first pull-up module 312, the first pull-down module 313, the first pull-down maintaining module 314, the first inverter module 315, a first anti-negative bias module 316, and a first reset module 317. The first pull-up control module 311 is electrically connected to the first pull-up module 312 at the first pull-up node Q1[*n*]. The first pull-down module 313 is electrically connected to the first pull-up node Q1[*n*] and a first signal output terminal Gn[n] of the first-type gate circuit 22*a* of current stage. The first pull-down maintaining module 314 is electrically connected between the first pull-up node Q1[*n*] and the first low potential signal line VGL1. The first inverter module 315 is electrically connected to the first pull-up node Q1[*n*], the first low potential signal line VGL1 and the low-frequency signal line LC. The first anti-negative bias module 316 is electrically connected between the first high potential signal line VGH1 and the first pull-up node Q1[*n*]. The first reset module 317 is electrically connected between the first pull-up node Q1[*n*] and the first low potential signal line VGL1.

In some embodiments, as shown in FIGS. 5 and 19, at least two of the first pull-up control module 311, the first pull-up module 312, the first pull-down module 313, the first pull-down maintaining module 314, the first inverter module 315, the first anti-negative bias module 316, and the first reset module 317 are arranged along the second direction. The angle between the first direction and the second direction is greater than 0 degrees and less than or equal to 90 degrees. At least two of the first pull-up control module 311, the first pull-up module 312, the first pull-down module 313, the first pull-down maintaining module 314, the first inverter module 315, the first anti-negative bias module 316, and the first reset module 317 are arranged along the second direction, so that the lateral space occupied by the first-type gate circuit 22*a* can be shortened, thereby reducing the lateral space occupied by the gate driving circuits 22 and reducing the bezel of the display panel 2.

In some embodiments, compared with the comparative display device in which each module is arranged laterally, in the embodiments of the present disclosure, at least two modules of the first-type gate circuit 22*a* are arranged along the second direction, so that the lateral space occupied by the first-type gate circuit 22*a* can be shortened, the lateral space occupied by the gate driving circuit 22 can be reduced, and the bezel of the display panel 2 can be reduced.

In some embodiments, as shown in FIGS. 5 and 19, the first pull-up control module 311 and the first reset module 317 are arranged along the second direction. The first pull-up control module 311 and the first reset module 317 are arranged along the second direction, so that the lateral space occupied by the first pull-up control module 311 and the first reset module 317 can be reduced, and the lateral space occupied by the first-type gate circuit 22*a* can be reduced, thereby reducing the lateral space occupied by the gate driving circuits 22 and reducing the bezel of the display panel 2.

In some embodiments, as shown in FIG. 19, it can be seen that in the second direction, the first pull-up control module 311 is arranged above the first reset module 317.

In some embodiments, as shown in FIGS. 5 and 19, at least a part of the first pull-down module 313, the first pull-down maintaining module 314, and the first inverter module 315 are arranged along the second direction. At least a part of the first pull-down module 313, the first pull-down maintaining module 314, and the first inverter module 315 are arranged along the second direction, so that the lateral space occupied by the first-type gate circuit 22*a* can be reduced, thereby reducing the lateral space occupied by the gate driving circuits 22 and reducing the bezel of the display panel 2.

In some embodiments, as shown in FIG. 19, it can be seen that in the second direction, the first inverter module 315 and the first pull-down maintaining module 314 are arranged in sequence, a part of the first pull-down module 313 is arranged between the first inverter module 315 and the first pull-down maintaining module 314, and another part of the first pull-down module 313 is arranged on a side of the first pull-down maintaining module 314 away from the first inverter module 315.

In some embodiments, as shown in FIGS. 5 and 19, a part of the first inverter module 315 and a part of the first pull-up control module 311 are arranged along the first direction. A part of the phase module 315 and another part of the first pull-up control module 311 are arranged along the second direction. A part of the first inverter module 315 and a part of the first pull-up control module 311 are arranged along the second direction, so that the lateral space occupied by the gate driving circuit 22 can be further reduced, thereby reducing the bezel of the display panel 2.

In some embodiments, as shown in FIG. 19, it can be seen that widths of each part in the first pull-up control module 311 are different. A part of the first inverter module 315 and a part of the first pull-up control module 311 are arranged along the first direction. A part of the first inverter module 315 and another part of the first pull-up control module 311 are arranged along the second direction.

In some embodiments, as shown in FIGS. 5 and 19 to 23, the first pull-up control module 311 includes a first pull-up control transistor T11*j*, a second pull-up control transistor T12*j*, and a third pull-up control transistor T81*j*. A gate T11*j*G of the first pull-up control transistor T11*j* is electrically connected to a stage transmission output terminal Cout[n−2] of the first-type gate circuits 22*a* of upper two stages. A first electrode T11*j*S of the first pull-up control transistor T11*j* is electrically connected to the first high potential signal line VGH1. A second electrode T11*j*D of the first pull-up control transistor T11*j* is electrically connected to a first electrode T12*j*S of the second pull-up control transistor T12*j*. A gate T12*j*G of the second pull-up control transistor T12*j* is electrically connected to the stage transmission output terminal Cout[n−2] of the first-type gate circuits 22*a* of the upper two stages. A second electrode T12*j*D of the second pull-up control transistor T12*j* is electrically connected to the first pill-up node Q1[*n*]. A gate T81*j*G of the third pull-up control transistor T81*j* is electrically connected to the first high potential signal line VGH1. A first electrode T81*j*S of the third pull-up control transistor T81*j* is electrically connected to the first high potential signal line VGH1. A second electrode T81*j*D of the third pull-up control transistor T81*j* is electrically connected to the second electrode T11*j*D of the first pull-up control transistor T11*j*.

In each stage of the gate driving circuits 22, the third pull-up control transistor T81*j*, the first pull-up control transistor T11*j*, and the second pull-up control transistor T12*j* are arranged in sequence along the second direction. The third pull-up control transistor T81*j*, the first pull-up control transistor T11*j*, and the second pull-up control transistor T12*j* are arranged in sequence along the second direction, so that the space occupied by the first pull-up module 312 can be reduced, thereby reducing the bezel of the display panel 2.

In some embodiments, as shown in FIGS. 5 and 19 to 23, the third pull-up control transistor T81*j* includes a first pull-up control sub-transistor T81*j*1 and a second pull-up control sub-transistor T81*j*2. A gate T81*j*2G of the second pull-up control sub-transistor T81*j*2 and a first electrode T81*j*2S of the second pull-up control sub-transistor T81*j*2 are electrically connected to the first high potential signal line VGH1. A second electrode T81*j*2D of the second pull-up control sub-transistor T81*j*2 is electrically connected to a first electrode of the first pull-up control sub-transistor T81*j*1. A gate T81*j*1G of the first pull-up control sub-transistor T81*j*1 is electrically connected to the first high potential signal line VGH1. A second electrode T81*j*1D of the first pull-up control sub-transistor T81*j*1 is electrically connected to a second electrode T11*j*D of the first pull-up control transistor T11*j*.

The first pull-up control sub-transistor T81*j*1 and the second pull-up control sub-transistor T81*j*2 are arranged along the second direction. The third pull-up control transistor T81*j* includes the first pull-up control sub-transistor T81*j*1 and the second pull-up control sub-transistor T81*j*2, so that the performance of the third pull-up control transistor T81*j* can be improved. Furthermore, the first pull-up control sub-transistor T81*j*1 and the second pull-up control sub-transistor T81*j*2 are arranged along the first direction, so that a lateral space occupied by the third pull-up control transistor T81*j* can be reduced, thereby reducing the bezel of the display panel 2.

In some embodiments, the first pull-up control sub-transistor T81*j*1 and the second pull-up control sub-transistor T81*j*2 can be regarded as two independent transistors, or two sub-transistors in the third pull-up control transistor T81*j*. Similarly, for other sub-transistors, please refer to the above description and will not be described again in the following embodiments.

In some embodiments, when one transistor has a plurality of sub-transistors, the first electrode of the transistor is an electrode connected to the signal line. For example, the third pull-up control transistor T81*j* includes the first pull-up control sub-transistor T81*j*1 and the second pull-up control sub-transistor T81*j*2. Since the first electrode T81*j*2S of the second pull-up control sub-transistor T81*j*2 is electrically connected to the first high potential signal line VGH1, the first electrode T81*j*S of the third pull-up control transistor T81*j* serves as the first electrode T81*j*2S of the second pull-up control sub-transistor T81*j*2. Similarly, the first electrodes of other transistors can be determined.

In some embodiments, the plurality of stages of the gate driving circuits 22 include a plurality of stages of first-type gate circuits 22*a*. In the first-type gate circuit 22*a* of a first stage, the gate T11*j*G of the first pull-up control transistor T11*j* can be connected to a start signal line. In the first type gate circuits 22*a* of other stages, the gate T11*j*G of the first pull-up control transistor T11*j* and the gate T12*j*G of the second pull-up control transistor T12*j* are connected to the first signal output terminal of the first-type gate circuit 22*a* of upper two stages. The first electrode T11*j*S of the first pull-up control transistor T11*j* and the first electrode T12*j*S of the second pull-up control transistor T12*j* are electrically connected to the first high potential signal line VGH1.

In some embodiments, as shown in FIGS. 5 and 19 to 23, the first pull-down module 313 includes a first pull-down transistor T31*j*, a second pull-down transistor T32*j*, a third pull-down transistor T33*j*, and a fourth pull-down transistor T41*j*. A gate T31*j*G of the first pull-down transistor T31*j* is electrically connected to a first pull-down node QB1[*n*]. A first electrode T31*j*S of the first pull-down transistor T31*j* is electrically connected to the first low potential signal line VGL1. A second electrode T31*j*D of the first pull-down transistor T31*j* is electrically connected to a transmission output terminal Cout[n] of the first-type gate circuit 22*a* of the current stage. A gate T32*j*G of the second pull-down transistor T32*j* is electrically connected to a first pull-down node QB1[*n*]. A first electrode T32*j*S of the second pull-down transistor T32*j* is electrically connected to the second low potential signal line VGL2. A second electrode T32*j*D of the second pull-down transistor T32*j* is electrically connected to the first signal output terminal Gn[m] of the first-type gate circuit 22*a* of another stage. A gate T33*j*G of the third pull-down transistor T33*j* is electrically connected to the first pull-down node QB1[*n*]. A first electrode T33*j*S of the third pull-down transistor T33*j* is electrically connected to the second low potential signal line VGL2. A second electrode T33*j*D of the third pull-down transistor T33*j* is electrically connected to a first signal output terminal Gn[n] of the first type gate circuit 22*a* of the current stage. A gate T41*j*G of the fourth pull-down transistor T41*j* is electrically connected to a stage transmission output terminal Cout[n+2] of the first type gate circuit 22*a* of next two stages. A first electrode T41*j*S of the fourth pull-down transistor T41*j* is electrically connected to the first low potential signal line VGL1. A second electrode T41*j*D of the fourth pull-down transistor T41*j* is electrically connected to the first pull-up node Q1[*n*].

The first pull-down transistor T31*j* and the fourth pull-down transistor T41*j* are arranged along the second direction. The second pull-down transistor T32*j* and the third pull-down transistor T33*j* are arranged along the second direction. The first pull-down transistor T31*j* and the fourth pull-down transistor T41*j* are arranged along the second direction, and the second pull-down transistor T32*j* and the third pull-down transistor T33*j* are arranged along the second direction, so that the space occupied by the first pull-down module 313 can be reduced and the bezel of display panel 2 can be reduced.

In some embodiments, as shown in FIGS. 5 and 19 to 23, the fourth pull-down transistor T41*j* includes a first pull-down sub-transistor T41*j*1 and a second pull-down sub-transistor T41*j*2. A gate T41*j*2G of the second pull-down sub-transistor T41*j*2 is electrically connected to the stage transmission output terminal Cout[n+2] of the first-type gate circuits 22*a* of the next two stages. A first electrode T41*j*2S of the second pull-down sub-transistor T41*j*2 is electrically connected to the first low potential signal line VGL1. A second electrode T41*j*2D of the second pull-down sub-transistor T41*j*2 is electrically connected to the first electrode T41*j*2S of the second pull-down sub-transistor T41*j*2 at a first internal node N1[*n*]. A gate T41*j*1G of the first pull-down sub-transistor T41*j*1 is electrically connected to the stage transmission output terminal Cout[n+2] of the first-type gate circuits 22*a* of the next two stages. A second electrode T41*j*1D of the first pull-down sub-transistor T41*j*1 is electrically connected to the first pull-up node Q1[*n*].

The first pull-down sub-transistor T41*j*1 and the second pull-down sub-transistor T41*j*2 are arranged along the second direction. The fourth pull-down transistor T41*j* includes the first pull-down sub-transistor T41*j*1 and the second pull-down sub-transistor T41*j*2, so that the performance of the fourth pull-down transistor T41*j* can be improved. Furthermore, the first pull-down sub-transistor T41*j*1 and the second pull-down sub-transistor T41*j*2 are arranged along the second direction, so that a lateral space occupied by the fourth pull-down transistor T41*j* can be reduced, and the bezel of the display panel 2 can be reduced.

In some embodiments, as shown in FIGS. 5 and 19 to 23, the first inverter module 315 includes a first inverter transistor T51*j*, a second inverter transistor T52*j*, a third inverter transistor T53*j*, a fourth inverter transistor T54*j*, and a fifth inverter transistor T55*j*. A gate T51*j*G of the first inverter transistor T51*j* and a first electrode T51*j*S of the first inverter transistor T51*j* are electrically connected to the low-frequency signal line LC. A second electrode T51*j*D of the first inverter transistor T51*j* is electrically connected to a second electrode T52*j*D of the second inverter transistor T52*j*. A gate T52*j*G of the second inverter transistor T52*j* is electrically connected to the first pull-up node Q1[*n*]. A first electrode T53*j*S of the second inverter transistor T52*j* is electrically connected to the first low potential signal line VGL1. A gate T53*j*G of the third inverter transistor T53*j* is electrically connected to the second electrode T51*j*D of the first inverter transistor T51*j*. A first electrode T53*j*S of the third inverter transistor T53*j* is electrically connected to the low-frequency signal line LC. A second electrode T53*j*D of the third inverter transistor T53*j* is electrically connected to the first pull-down node QB1[*n*]. A gate T54*j*G of the fourth inverter transistor T54*j* is electrically connected to the first pull-up node Q1[*n*]. A first electrode T54*j*S of the fourth inverter transistor T54*j* is electrically connected to the first low potential signal line VGL1. A second electrode T54*j*D of the fourth inverter transistor T54*j* is electrically connected to the first pull-down node QB1[*n*]. A gate T55*j*G of the fifth inverter transistor T55*j* is electrically connected to a stage transfer output terminal Cout[n−2] of the first-type gate circuits 22*a* of the upper two stages. A first electrode T55*j*S of the fifth inverter transistor T55*j* is electrically connected to the first low potential signal line VGL1. A second electrode T55*j*D of the fifth inverter transistor T55*j* is electrically connected to the first pull-down node QB1[*n*].

The first inverter transistor T51*j* and the second inverter transistor T52*j* are arranged along the second direction. The third inverter transistor T53*j*, the fourth inverter transistor T54*j*, and the fifth inverter transistor T55*j* are arranged along the second direction. The first inverter transistor T51*j* and the third inverter transistor T53*j* are arranged along the first direction. The first inverter transistor T51*j* and the second inverter transistor T52*j* are arranged along the second direction, and the third inverter transistor T53*j*, the fourth inverter transistor T54*j*, and the fifth inverter transistor T55*j* are arranged along the second direction, so that a lateral space occupied by the first inverter module 315 can be reduced, thereby reducing the bezel of the display panel 2.

In some embodiments, as shown in FIGS. 5 and 19 to 23, the first inverter transistor T51*j* includes a first inverter sub-transistor T51*j*1 and a second inverter sub-transistor T51*j*2. A gate T51*j*1G of the first inverter sub-transistor T51*j*1 and a first electrode T51*j*1S of the first inverter sub-transistor T51*j*1 are electrically connected to the low-frequency signal line LC. A second electrode T51*j*1D of the first inverter sub-transistor T51*j*1 is electrically connected to a first electrode of the second inverter sub-transistor T51*j*2. A gate T51*j*2G of the second inverter sub-transistor T51*j*2 is electrically connected to the low-frequency signal line LC. A second electrode T51*j*2D of the second inverter sub-transistor T51*j*2 is electrically connected to the second electrode T52*j*D of the second inverter transistor T51*j*.

The first inverter sub-transistor T51*j*1 and the second inverter sub-transistor T51*j*2 are arranged along the first direction. The first inverter transistor T51*j* includes the first inverter sub-transistor T51*j*1 and the second inverter sub-transistor T51*j*2, so that the performance of the first inverter transistor T51*j* can be improved.

In some embodiments, as shown in FIGS. 5 and 19 to 23, the third inverter transistor T53*j* and the third pull-up control transistor T81*j* are arranged along the first direction, and the third inverter transistor T53*j* and the first pull-up control transistor T11*j* are arranged along the second direction, so that a lateral space occupied by the first inverter module 315 and the first pull-up control module 311 can be reduced, thereby reducing the bezel of the display panel 2.

In some embodiments, as shown in FIGS. 5 and 19 to 23, the first pull-down maintaining module 314 includes a first pull-down maintaining transistor T42*j*. A gate T42*j*G of the first pull-down maintaining transistor T42*j* is electrically connected to a first pull-down node QB1[*n*]. A first electrode T42*j*S of the first pull-down maintaining transistor T42*j* is electrically connected to the first low potential signal line VGL1. A second electrode T42*j*D of the first pull-down maintaining transistor T42*j* is electrically connected to the first pull-up node Q1[*n*].

In the second direction, the first pull-down maintaining transistor T42*j* is disposed between the first pull-down transistor T31*j* and the fourth pull-down transistor T41*j*. As such, the lateral space occupied by the first pull-down maintaining transistor T42*j*, the first pull-down transistor T31*j*, and the fourth pull-down transistor T41*j* can be reduced, thereby reducing the bezel of the display panel 2.

In some embodiments, as shown in FIGS. 5 and 19 to 23, the first pull-down maintaining transistor T42*j* includes a first pull-down maintaining sub-transistor T42j1 and a second pull-down maintaining sub-transistor T42j2. A gate T42j2G of the second pull-down maintaining sub-transistor T42j2 is electrically connected to the first pull-down node QB1[n]. A first electrode T42j2S of the second pull-down maintaining sub-transistor T42j2 is electrically connected to the first low potential signal line VGL1. A second electrode T42j2D of the second pull-down maintaining sub-transistor T42j2 is electrically connected to the first internal node N1[n]. A gate T42j1G of the first pull-down maintaining sub-transistor T42j1 is electrically connected to the first pull-down node QB1[n]. A second electrode of the first pull-down maintaining sub-transistor T42j 1 is electrically connected to the first pull-down node QB1[n].

The first pull-down maintaining sub-transistor T42j1 and the second pull-down maintaining sub-transistor T42j2 are arranged along the second direction. The first pull-down maintaining transistor T42j include the first pull-down maintaining sub-transistor T42j1 and the second pull-down maintaining sub-transistor T42j2, so that the performance of the first pull-down maintaining transistor T42j can be improved. Furthermore, the first pull-down maintaining sub-transistor T42j 1 and the second pull-down maintaining sub-transistor T42j2 are arranged along the second direction, so that the lateral space occupied by the first pull-down maintaining transistor T42j is reduced, thereby reducing the bezel of the display panel 2.

In some embodiments, as shown in FIGS. 5 and 19 to 23, the first reset module 317 includes a first reset transistor T43j. A gate T43jG of the first reset transistor T43j is electrically connected to the first reset control line VST1. A first electrode T43jS of the first reset transistor T43j is electrically connected to the first low potential signal line VGL1. A second electrode T43jD of the first reset transistor T43j is electrically connected to the first pull-up node Q1[n].

The first reset transistor T43j is ARRANGED on a side of the second pull-up control transistor T12j away from the first pull-up control transistor T11j. The first reset transistor T43j is arranged on the side of the second pull-up control transistor T12j away from the first pull-up control transistor T11j, so that a lateral space occupied by the first reset transistor T43j and the first pull-up control module 311 is reduced, the bezel of the display panel 2 is reduced, and the first reset transistor T43j is easily connected to the first low potential signal line VGL1.

In some embodiments, as shown in FIGS. 5 and 19 to 23, the first reset transistor T43j includes a first reset sub-transistor T43j1 and a second reset sub-transistor T43j2. A gate T43j1G of the second reset sub-transistor T43j2 is electrically connected to the first reset control line VST1. A first electrode of the second reset sub-transistor T43j2 is electrically connected to the first low potential signal line VGL1. A second electrode T43j1D of the first reset sub-transistor T43j1 is electrically connected to a first electrode T43j1S of the first reset sub-transistor T43j1 at the first internal node N1[n]. A gate T43j1G of the first reset sub-transistor T43j1 is electrically connected to the first reset control line VST1. A second electrode T43j1D of the first reset sub-transistor T43j1 is electrically connected to the first pull-up node Q1[n].

The first reset sub-transistor T43j1 and the second reset sub-transistor T43j2 are arranged along the second direction. The first reset transistor T43j includes the first reset sub-transistor T43j1 and the second reset sub-transistor T43j2, so that the performance of the first reset transistor T43j can be improved. Furthermore, the first reset sub-transistor T43j1 and the second reset sub-transistor T43j2 are arranged along the second direction, so that a lateral space occupied by the first reset transistor T43j is reduced, thereby reducing the bezel of the display panel 2.

In some embodiments, as shown in FIGS. 5 and 19 to 23, the first anti-negative bias module 316 includes a first anti-negative bias transistor T71j. A gate T71jG of the first anti-negative bias transistor T71j is electrically connected to the first pull-up node Q1[n]. A first electrode T71jS of the first anti-negative bias transistor T71j is electrically connected to the first high potential signal line VGH1. A second electrode T71jD of the first anti-negative bias transistor T71j is electrically connected to the first internal node N1[n].

The first anti-negative bias transistor T71j is arranged between the second inverter transistor T52j and the first pull-down transistor T31j along the second direction. The first anti-negative bias transistor T71j is arranged between the second inverter transistor T52j and the first pull-down transistor T31j along the second direction, so that a lateral space occupied by the first anti-negative bias module 316 can be reduced, thereby reducing the bezel of display panel 2.

In some embodiments, the first anti-negative bias transistor T71j includes a first anti-negative bias sub-transistor T71j1 and a second anti-negative bias sub-transistor T71j2. A gate T71j2G of the second anti-negative bias sub-transistor T71j2 is electrically connected to the first pull-up node Q1[n]. A first electrode T71j2S of the second anti-negative bias sub-transistor T71j2 is electrically connected to the first high potential signal line. A second electrode T71j2D of the second anti-negative bias sub-transistor T71j2 is electrically connected to a first electrode of the first anti-negative bias sub-transistor T71j1. A gate T71j1G of the first anti-negative bias sub-transistor T71j1 is electrically connected to the first pull-up node Q1[n]. A second electrode T71j1D of the first anti-negative bias sub-transistor T71j1 is electrically connected to the first internal node N1[n].

The first anti-negative bias sub-transistor T71j1 and the second anti-negative bias sub-transistor T71j2 are arranged along the second direction. The first anti-negative bias transistor T71j includes the first anti-negative bias sub-transistor T71j1 and the second anti-negative bias sub-transistor T71j2, so that the performance of the first anti-negative bias transistor T71j can be improved. Furthermore, the first anti-negative bias sub-transistor T71j1 and the second anti-negative bias sub-transistor T71j2 are arranged along the second direction, so that the lateral space occupied by the first anti-negative bias transistor T71j is reduced, thereby reducing the bezel of the display panel 2.

In some embodiments, the second clock signal line CKB includes the first group of sub-lines CKBi and the second group of sub-lines CKBj. The first pull-up module 312 includes the first pull-up transistor T21j, the second pull-up transistor T22j, and the third pull-up transistor T23j. A gate T21jG of the first pull-up transistor T21j is electrically connected to the first pull-up node Q1[n]. A first electrode T21jS of the first pull-up transistor T21j is electrically connected to the first clock signal line CKA. A second electrode T22jD of the first pull-up transistor T21j is electrically connected to the stage transmission output terminal Cout[n] of the first type gate circuit 22a of the current stage. A gate T22jG of the second pull-up transistor T22j is electrically connected to the first pull-up node Q1[n]. A first electrode T22jS of the second pull-up transistor T22j is electrically connected to the first group of sub-lines CKBi. A second electrode T22jD of the second pull-up transistor T22j is electrically connected to the first signal output terminal Gn[m] of the first type gate circuit 22a of another stage. A gate T23*j*G of the third pull-up transistor T23*j* is electrically connected to the first pull-up node Q1[*n*]. A first electrode T23*j*S of the third pull-up transistor T23*j* is electrically connected to the second group of sub-lines CKBj. A second electrode T23*j*D of the third pull-up transistor T23*j* is electrically connected to the first signal output terminal Gn[n] of the first type gate circuit 22*a* of the current stage.

In the first direction, the first clock signal line CKA is arranged adjacent to the first pull-up transistor T21*j*, the first group of sub-lines CKBi is arranged adjacent to the second pull-up transistor T22*j*, and the second group of sub-lines CKBj is arranged adjacent to the third pull-up transistor T23*j*. As such, the first clock signal line CKA and the second clock signal line CKB do not need to route from outside the transistor region and extend into the transistor region, so that each clock signal line is arranged adjacent to the transistor connected thereto, with fewer crosses, thereby reducing the space occupied by each clock signal line and reducing the bezel of the display panel 2.

In some embodiments, the first clock signal line CKA may include a first clock first line CKA1, a first clock second line CKA2, a first clock third line CKA3, and a first clock fourth line CKA4. The first-type gate circuits 22*a* of every four stages are cyclically connected to these four first clock signal lines CKA. For example, the first-type gate circuit 22*a* of a first stage is connected to the first clock first line CKA1, the first-type gate circuit 22*a* of a second stage is connected to the first clock second line CKA2, the first-type gate circuit 22*a* of a third stage is connected to the first clock third line CKA3, and the first-type gate circuit 22*a* of a fourth stage is connected to the first clock fourth line CKA4. The first-type gate circuit 22*a* of a fifth stage is connected to the first clock first line CKA1, the first-type gate circuit 22*a* of a sixth stage is connected to the first clock second line CKA2, the first-type gate circuit 22*a* of a seventh stage is connected to the first clock third line CKA3, and the first-type gate circuit 22*a* of a eighth stage is connected to the first clock fourth line CKA4. Similarly, the clock signal lines connected to the first-type gate circuits 22*a* of other stages can be determined.

In some embodiments, the above embodiments take the first clock signal line CKA including four clock lines as an example for explanation, but the embodiments of the present disclosure are not limited thereto. The first clock signal line CKA may include other numbers of clock lines, e.g., the first clock signal line CKA may include 8 clock lines.

In some embodiments, the second clock signal line CKB may include a second clock first line CKB1, a second clock second line CKB2, a second clock third line CKB3, a second clock fourth line CKB4, a second clock fifth line CKB5, a second clock sixth line CKB6, a second clock seventh line CKB7, and a second clock eighth line CKB8. In the second clock signal line CKB, the second clock first line CKB1, the second clock third line CKB3, the second clock fifth line CKB5, and the second clock seventh line CKB7 serve as the first group of sub-lines CKBi, and the second clock second line CKB2, the second clock fourth line CKB4, the second clock sixth line CKB6, and the second clock eighth line CKB8 serve as the second group of sub-lines CKBj. As such, the second pull-up transistor T22*j* of the first-type gate circuit 22*a* of every four stages are cyclically connected to the first group of sub-lines CKBi, and the third pull-up transistor T23*j* of the first-type gate circuit 22*a* of every four stages are cyclically connected to the second group of sub-lines CKBj. For example, the second pull-up transistors T22*j* of the first-type gate circuits 22*a* of first to fourth stages are connected to the second clock first line CKB1, the second clock third line CKB3, the second clock fifth line CKB5, and the second clock seventh line CKB7, respectively. The third pull-up transistors T23*j* of the first type of circuits 22*a* of first to fourth stages are connected to the second clock second line CKB2, the second clock fourth line CKB4, the second clock sixth line CKB6, and the second clock eighth line CKB8, respectively. The second pull-up transistors T22*j* of the first-type gate circuits 22*a* of fifth to eighth stages are connected to the second clock first line CKB1, the second clock third line CKB3, the second clock fifth line CKB5, and the second clock seventh line CKB7, respectively. The third pull-up transistors T23*j* of the first-type gate circuits 22*a* of fifth to eighth stages are connected to the second clock second line CKB2, the second clock fourth line CKB4, the second clock sixth line CKB6, and the second clock eighth line CKB8, respectively. Similarly, the clock signal lines connected to the gate circuits 22*a* of the first type of other stages are connected can be determined.

In some embodiments, the above embodiments take the second clock signal line CKB including eight clock lines as an example. However, the embodiments of the present disclosure are not limited thereto. The second clock signal line CKB may include other numbers of clock lines, for example, it may include 4 clock lines or 16 clock lines.

In some embodiments, as shown in FIG. 5, the first-type gate circuit 22*a* further includes a first capacitor C1. One electrode plate of the first capacitor C1 is electrically connected to the first pull-up node Q1[*n*], and the other electrode plate of the first capacitor C1 is electrically connected to the stage transmission output terminal Cout[n] of the first-type gate circuit 22*a* of the current stage.

In some embodiments, as shown in FIGS. 5 and 19 to 23, the first capacitor C1 includes a first sub-capacitor C11, a second sub-capacitor C12, a third sub-capacitor C13, and a fourth sub-capacitor C14. In the second direction, the first sub-capacitor C11 and the second sub-capacitor C12 are arranged on two sides of the first pull-up transistor T21*j*. The third sub-capacitor C13 is arranged on one side of the second pull-up transistor T22*j*. The fourth sub-capacitor C14 is arranged on one side of the third pull-up transistor T23*j*. As such, a capacitance of the first capacitor C1 can be relatively large, and the first capacitor C1 does not occupy lateral space.

In some embodiments, a first electrode plate C11*a* of the first sub-capacitor C11, a first electrode plate C12*a* of the second sub-capacitor C12, a first electrode plate C13*a* of the third sub-capacitor C13, and a first electrode plate C14*a* of the fourth sub-capacitor C14 can be connected together. A second electrode plate C11*b* of the first sub-capacitor C11, a second electrode plate C12*b* of the second sub-capacitor C12, a second electrode plate of the third sub-capacitor C13, and a second electrode plate C13*b*C14*b* of the fourth sub-capacitor C14 can be connected together.

In some embodiments, as shown in FIGS. 19 and 20, the display panel 2 includes the light shielding layer 212. In the first direction, the light shielding layer 212 includes the first portion VST1*a* of the first reset control line VST1, a first portion VGH1*a* of the high potential signal line VGH1, the stage transmission output terminal Cout[n] of the first-type gate circuit 22*a* of the current stage, a first portion VGL1*a* of the first low potential signal line VGL1, a first portion LCa of the low-frequency signal line LC, a first portion CKAa of the first clock signal line CKA, a first portion C11*a*1 of the first electrode plate C11*a* of the first sub-capacitor C11, a first portion CKBia of the first group of sub-lines CKBi, a first portion C13*a*1 of the first electrode plate C13*a* of the third sub-capacitor C13, a first portion CKBja of the second group of sub-lines CKBj, and a first portion C14*a*1 of the first electrode plate C14*a* of the fourth sub-capacitor C14 arranged in sequence. The light shielding layer 212 further includes a first portion C12*a*1 of the first electrode plate C12*a* of the second sub-capacitor C12, a first portion C12*a*1 of the first electrode plate C12*a* of the second sub-capacitor C12, and a first portion C11*a*1 of the first electrode plate C11*a* of the first sub-capacitor C11 arranged along the second direction.

In some embodiments, the stage transmission terminal of the first-type gate circuit 22*a* of each stage passes through the plurality of stages of the first-type gate circuit 22*a* to be connected to a corresponding one of the transistors.

In some embodiments, as shown in FIG. 20, the first portion CKAa of the first clock signal line CKA includes a first portion CKA4*a* of the first clock fourth line CKA4, a first portion CKA3*a* of the first clock third line CKA3, and a first portion CKA3*a* of the first clock third line CKA3, a first portion CKA2*a* of the second clock line CKA2, and a first portion CKA1*a* of the first clock first line CKA1 arranged in sequence along the first direction.

In some embodiments, as shown in FIG. 20, the first portion CKBia of the first group of sub-lines CKBi includes a first portion CKB7*a* of the second clock seventh line CKB7, a first portion CKB5*a* of the second clock fifth line CKB5, and a first portion CKB3*a* of the second clock third line CKB3, and a first portion CKB1*a* of the second clock first line CKB1.

In some embodiments, as shown in FIG. 20, the first portion CKBja of the second group of sub-lines CKBj includes a first portion CKB8*a* of the second clock eighth line CKB8, a first portion CKB6*a* of the second clock sixth line CKB6, and a first portion CKB4*a* of the second clock fourth line CKB4, and a first portion CKB2*a* of the second clock second line CKB2 arranged in sequence along the first direction.

In some embodiments, as shown in FIGS. 19 and 21, the display panel 2 includes the active layer 216. The active layer 216 includes an active portion T11*j*A of the first pull-up control transistor T11*j*, an active portion T12*j*A of the second pull-up control transistor T12*j*, an active portion T81*j*A of the third pull-up control transistor T81*j*, an active portion T21*j*A of the first pull-up transistor T21*j*, an active portion T22*j*A of the second pull-up transistor T22*j*, an active portion T23*j*A of the third pull-up transistor T23*j*, an active portion T31*j*A of the first pull-down transistor T31*j*, an active portion T32*j*A of the second pull-down transistor T32*j*, an active portion T33*j*A of the third pull-down transistor T33*j*, an active portion T41*j*A of the fourth pull-down transistor T41*j*, an active portion T42*j*A of the first pull-down maintaining transistor T42*j*, an active portion T51*j*A of the first inverter transistor T51*j*, an active portion T52*j*A of the second inverter transistor T52*j*, an active portion T53*j*A of the third inverter transistor T53*j*, an active portion T54*j*A of the fourth inverter transistor T54*j*, an active portion T55*j*A of the fifth inverter transistor T55*j*, an active portion T43*j*A of the first reset transistor T43*j*, and an active portion T71*j*A of the first anti-negative bias transistor T71*j*.

The active portion T81*j*A of the third pull-up control transistor T81*j*, the active portion T11*j*A of the first pull-up control transistor T11*j*, the active portion T12*j*A of the second pull-up control transistor T12*j*, and the active portion T43*j*A of the first reset transistor T43*j* are arranged in sequence along the second direction. The active portion T51*j*A of the first inverter transistor T51*j*, the active portion T52*j*A of the second inverter transistor T52*j*, the active portion T71*j*A of the first anti-negative bias transistor T71*j*, the active portion T31*j*A of the first pull-down transistor T31*j*, the active portion T42*j*A of the first pull-down maintaining transistor T42*j*, and the active portion T41*j*A of the fourth pull-down transistor T41*j* are arranged in sequence along the second direction. The active portion T53*j*A of the third inverter transistor T53*j*, the active portion T54*j*A of the fourth inverter transistor T54*j*, and the active portion T55*j*A of the fifth inverter transistor T55*j* are arranged in sequence along the second direction. The active portion T32*j*A of the second pull-down transistor T32*j* and the active portion T33*j*A of the third pull-down transistor T33*j* are arranged in sequence along the second direction. The active portion T81*j*A of the third pull-up control transistor T81*j*, the active portion T53*j*A of the third inverter transistor T53*j*, the active portion T52*j*A of the second inverter transistor T52*j*, the active portion T21*j*A of the first pull-up transistor T21*j*, the active portion T32*j*A of the second pull-down transistor T32*j*, the active portion T22*j*A of the second pull-up transistor T22*j*, and the active portion T23*j*A of the third pull-up transistor T23*j* are arranged in sequence along the first direction.

In some embodiments, as shown in FIG. 21, the active portion T81*j*A of the third pull-up control transistor T81*j* includes the active portion T81*j*1A of the first pull-up control sub-transistor T81*j*1 and the active portion T81*j*2A of the second pull-up control sub-transistor T81*j*2. The active portion T81*j*1A of the first pull-up control sub-transistor T81*j*1 and the active portion T81*j*2A of the second pull-up control sub-transistor T81*j*2 are arranged in sequence along the second direction.

In some embodiments, as shown in FIG. 21, the active portion T41*j*A of the fourth pull-down transistor T41*j* includes an active portion T41*j*1A of the first pull-down sub-transistor T41*j*1 and an active portion T41*j*2A of the second pull-down sub-transistor T41*j*2. The active portion T41*j*1A of the first pull-down sub-transistor T41*j*1 and the active portion T41*j*2A of the second pull-down sub-transistor T41*j*2 are arranged along the second direction.

In some embodiments, as shown in FIG. 21, the active portion T42*j*A of the first pull-down maintaining transistor T42*j* includes an active portion T42*j*1A of the first pull-down maintaining sub-transistor T42*j*1 and an active portion T42*j*2A of the second pull-down maintaining sub-transistor T42*j*2. The active portion T42*j*1A of the first pull-down maintaining sub-transistor T42*j*1 and the active portion T42*j*2A of the second pull-down maintaining sub-transistor T42*j*2 are arranged along the second direction.

In some embodiments, as shown in FIG. 21, the active portion T43*j*A of the first reset transistor T43*j* includes an active portion T43*j*1A of the first reset sub-transistor T43*j*1 and an active portion T43*j*1A of the second reset sub-transistor T43*j*2. The active portion T43*j*1A of the first reset sub-transistor T43*j*1 and the active portion T43*j*1A of the second reset sub-transistor T43*j*2 are arranged along the second direction.

In some embodiments, as shown in FIG. 21, the active portion T51*j*A of the first inverter transistor T51*j* includes an active portion T51*j*1A of the first inverter sub-transistor T51*j*1 and an active portion T51*j*2A of the second inverter sub-transistor T51*j*2. The active portion T51*j*1A of the first inverter sub-transistor T51*j*1 and the active portion T51*j*2A of the second inverter sub-transistor T51*j*2 are arranged along the first direction.

In some embodiments, as shown in FIG. 21, the active portion T71*j*A of the first anti-negative bias transistor T71*j* includes an active portion T71*j*1A of the first anti-negative bias sub-transistor T71*j*1 and an active portion T71*j*2A of the second anti-negative bias sub-transistor T71*j*2. The active portion T71*j*1A of the first anti-negative bias sub-transistor T71*j*1 and the active portion T71*j*2A of the second anti-negative bias sub-transistor T71*j*2 are arranged along the first direction.

In some embodiments, each sub-transistor is identified in the active layer of the display panel to facilitate identification of each sub-transistor. It can be understood that other electrodes of each sub-transistor can be determined according to the position of the active portion of each sub-transistor.

In some embodiments, as shown in FIGS. 19 and 22, the display panel 2 includes the gate layer 218. The gate layer 218 includes the second portion VST1*b* of the first reset control line VST1, the second portion VGH1*b* of the first high potential signal line VGH1, the second portion VGL1*b* of the first low potential signal line VGL1, the second portion LCb of the low-frequency signal line LC, the second portion CKAb of the first clock signal line CKA, the second electrode plate C11*b* of the first sub-capacitor C11, the second electrode plate C12*b* of the second sub-capacitor C12, the second portion CKBib of the first group of sub-lines CKBi, the second electrode plate of the third sub-capacitor C13, the second portion CKBjb of the second group of sub-lines CKBj, the second electrode plate C14*b* of the fourth sub-capacitor C14, the gate T11*j*G of the first pull-up control transistor T11*j*, the gate T12*j*G of the second pull-up control transistor T12*j*, the gate T81*j*G of the third pull-up control transistor T81*j*, the gate T21*j*G of the first pull-up transistor T21*j*, the gate T22*j*G of the second pull-up transistor T22*j*, the gate T23*j*G of the third pull-up transistor T23*j*, the gate T31*j*G of the first pull-down transistor T31*j*, the gate T32*j*G of the second pull-down transistor T32*j*, the gate T33*j*G of the third pull-down transistor T33*j*, the gate T41*j*G of the fourth pull-down transistor T41*j*, the gate T42*j*G of the first pull-down maintaining transistor T42*j*, the gate T51*j*G of the first inverter transistor T51*j*, the gate T52*j*G of the second inverter transistor T52*j*, the gate T53*j*G of the third inverter transistor T53*j*, the gate T54*j*G of the fourth inverter transistor T54*j*, the gate T55*j*G of the fifth inverter transistor T55*j*, the gate T43*j*G of the first reset transistor T43*j*, and the gate T71*j*G of the first anti-negative bias transistor T71*j*.

The second electrode plate C11*b* of the first sub-capacitor C11 and the second electrode plate C12*b* of the second sub-capacitor C12 are arranged on two sides of the gate T21*j*G of the first pull-up transistor T21*j* along the second direction. The second electrode plate of the third sub-capacitor C13 and the gate T22*j*G of the second pull-up transistor T22*j* are arranged along the second direction. The second electrode plate C13*b*C14*b* of the fourth sub-capacitor C14 and the gate T23*j*G of the third pull-up transistor T23*j* are arranged along the second direction. The gate T81*j*G of the third pull-up control transistor T81*j*, the gate T11*j*G of the first pull-up control transistor T11*j*, the gate T12*j*G of the second pull-up control transistor T12*j*, the gate T43*j*G of the first reset transistor T43*j* are arranged in sequence along the second direction. The gate T51*j*G of the first inverter transistor T51*j*, the gate T52*j*G of the second inverter transistor T52*j*, the gate T71*j*G of the first anti-negative bias transistor T71*j*, the gate T31*j*G of the first pull-down transistor T31*j*, the gate T42*j*G of the first pull-down maintaining transistor T42*j*, and the gate T41*j*G of the fourth pull-down transistor T41*j* are arranged in sequence along the second direction. The gate T53*j*G of the third inverter transistor T53*j*, the gate T54*j*G of the fourth inverter transistor T54*j*, and the gate T55*j*G of the fifth inverter transistor T55*j* are arranged in sequence along the second direction. The gate T32*j*G of the second pull-down transistor T32*j* and the gate T33*j*G of the third pull-down transistor T33*j* are arranged in sequence along the second direction. The second portion VST1*b* of the first reset control line VST1, the second portion VGH1*b* of the first high potential signal line VGH1, the gate T81*j*G of the third pull-up control transistor T81*j*, the gate T53*j*G of the third inverter transistor T53*j*, the gate T52*j*G of the second inverter transistor T52*j*, the second portion VGL1*b* of the first low potential signal line VGL1, the second portion LCb of the low-frequency signal line LC, the second portion CKAb of the first clock signal line CKA, the gate T21*j*G of the first pull-up transistor T21*j*, the gate T32*j*G of the second pull-down transistor T32*j*, the second portion CKBib of the first group of sub-lines CKBi, the gate T22*j*G of the second pull-up transistor T22*j*, the second portion CKBjb of the second group of sub-lines CKBj, and the gate T23*j*G of the third pull-up transistor T23*j* are arranged in sequence along the first direction.

In some embodiments, as shown in FIG. 22, the second portion CKAb of the first clock signal line CKA includes a second portion of the first clock fourth line CKA4, a second portion CKA3*b* of the first clock third line CKA3, a second portion CKA2*b* of the first clock second line CKA2, and a second portion CKA1*b* of the first clock first line CKA1 arranged in sequence along the first direction.

In some embodiments, as shown in FIG. 22, the second portion CKBib of the first group of sub-lines CKBi includes a second portion CKB7*b* of the second clock seventh line CKB7, a second portion CKB5*b* of the second clock fifth line CKB5, a second portion CKB3*b* of the second clock third line CKB3, and a second portion CKB1*b* of the second clock first line CKB1 arranged in sequence along the first direction.

In some embodiments, as shown in FIG. 22, the second portion CKBjb of the second group of sub-lines CKBj includes a second portion CKB8*b* of the second clock eighth line CKB8, a second portion CKB6*b* of the second clock sixth line CKB6, a second portion CKB4*b* of the second clock fourth line CKB4, and a second portion CKB2*b* of the second clock second line CKB2 arranged in sequence along the first direction.

In some embodiments, as shown in FIG. 22, the gate T81*j*G of the third pull-up control transistor T81*j* includes the gate T81*j*1G of the first pull-up control sub-transistor T81*j*1, the gate T81*j*2G of the second pull-up control sub-transistor T81*j*2, and the gate T81*j*1G of the first pull-up control sub-transistor T81*j*1, and the gate T81*j*2G of the second pull-up control sub-transistor T81*j*2 arranged in sequence along the second direction.

In some embodiments, as shown in FIG. 22, the gate T41*j*G of the fourth pull-down transistor T41*j* includes the gate T41*j*1G of the first pull-down sub-transistor T41*j*1 and the gate T41*j*2G of the second pull-down sub-transistor T41*j*2. The gate T41*j*1G of the first pull-down sub-transistor T41*j*1 and the gate T41*j*2G of the second pull-down sub-transistor T41*j*2 are arranged along the second direction.

In some embodiments, as shown in FIG. 22, the gate T42*j*G of the first pull-down maintaining transistor T42*j* includes the gate T42*j*1G of the first pull-down maintaining sub-transistor T42*j*1 and the gate T42*j*2G of the second pull-down maintaining sub-transistor T42*j*2. The gate T42*j*1G of the first pull-down maintaining sub-transistor T42*j*1 and the gate T42*j*2G of the second pull-down maintaining sub-transistor T42*j*2 are arranged along the second direction.

In some embodiments, as shown in FIG. 22, the gate T43jG of the first reset transistor T43j includes the gate T43j1G of the first reset sub-transistor T43j1 and the gate T43j1G of the second reset sub-transistor T43j2. The gate T43j1G of the first reset sub-transistor T43j1 and the gate T43j1G of the second reset sub-transistor T43j2 are arranged along the second direction.

In some embodiments, as shown in FIG. 22, the gate T51jG of the first inverter transistor T51j includes the gate T51j1G of the first inverter sub-transistor T51j1 and the gate T51j2G of the second inverter sub-transistor T51j2. The gate T51j1G of the first inverter sub-transistor T51j 1 and the gate T51j2G of the second inverter sub-transistor T51j2 are arranged along the first direction.

In some embodiments, as shown in FIG. 22, the gate T71jG of the first anti-negative bias transistor T71j includes the gate T71j1G of the first anti-negative bias sub-transistor T71j1 and the gate T71j2G of the second anti-negative bias sub-transistor T71j2. The gate T71j 1G of the first anti-negative bias sub-transistor T71j1 and the gate T71j2G of the second anti-negative bias sub-transistor T71j2 are arranged along the first direction.

In some embodiments, as shown in FIGS. 19 and 23, the display panel 2 includes the first source-drain layer 221. The first source-drain layer 221 includes the third portion VST1c of the first reset control line VST1, the third portion VGH1c of the first high potential signal line VGH1, the third portion VGL1c of the first low potential signal line VGL1, the third portion LCc of the low-frequency signal line LC, the third portion CKAc of the first clock signal line CKA, a second portion C11a2 of the first electrode plate C11a of the first sub-capacitor C11, a second portion C12a2 of the first electrode plate C12a of the second sub-capacitor C12, the third portion CKBic of the first group of sub-lines CKBi, a second portion C13a2 of the first electrode plate C13a of the third sub-capacitor C13, the third portion CKBjc of the second group of sub-lines CKBj, a second portion C14a2 of the first electrode plate C14a of the fourth sub-capacitor C14, the first electrode T11jS of the first pull-up control transistor T11j, the first electrode T12jS of the second pull-up control transistor T12j, the first electrode T81jS of the third pull-up control transistor T81j, the first electrode T21jS of the first pull-up transistor T21j, the first electrode T22jS of the second pull-up transistor T22j, the first electrode T23jS of the third pull-up transistor T23j, the first electrode T31jS of the first pull-down transistor T31j, the first electrode T32jS of the second pull-down transistor T32j, the first electrode T33jS of the third pull-down transistor T33j, the first electrode T41jS of the fourth pull-down transistor T41j, the first electrode T42jS of the first pull-down sustain transistor T42j, the first electrode T51jS of the first inverter transistor T51j, the first electrode T52jS of the second inverter transistor T52j, the first electrode T53jS of the third inverter transistor T53j, the first electrode T54jS of the fourth inverter transistor T54j, the first electrode T55jS of the fifth inverter transistor T55j, the first electrode T43jS of the first reset transistor T43j, the first electrode T71jS of the first anti-negative bias transistor T71j, the second electrode T11jD of the first pull-up control transistor T11j, the second electrode T12jD of the second pull-up control transistor T12j, the second electrode T81jD of the third pull-up control transistor T81j, the second electrode T21jD of the first pull-up transistor T21j, the second electrode T22jD of the second pull-up transistor T22j, the second electrode T23jD of the third pull-up transistor T23j, the second electrode T31jD of the first pull-down transistor T31j, the second electrode T32jD of the second pull-down transistor T32j, the second electrode T33jD of the third pull-down transistor T33j, the second electrode T41jD of the fourth pull-down transistor T41j, the second electrode T42jD of the first pull-down maintaining transistor T42j, the second electrode T51jD of the first inverter transistor T51j, the second electrode T52jD of the second inverter transistor T52j, the second electrode T53jD of the third inverter transistor T53j, the second electrode T54jD of the fourth inverter transistor T54j, the second electrode T55jD of the fifth inverter transistor T55j, the second electrode T43jD of the first reset transistor T43j, and the second electrode T71jD of the first anti-negative bias transistor T71j.

The second portion C11a2 of the first electrode plate C11a of the first sub-capacitor C11 and the second portion C12a2 of the first electrode plate C12a of the second sub-capacitor C12 are arranged on two sides of the first electrode T21jS of the first pull-up transistor T21j along the second direction. The second portion C13a2 of the first electrode plate C13a of the third sub-capacitor C13 and the first electrode T22jS of the second pull-up transistor T22j are arranged along the second direction. The second portion C14a2 of the first electrode plate C14a of the fourth sub-capacitor C14 and the first electrode T23jS of the third pull-up transistor T23j are arranged along the second direction. The first electrode T81jS of the third pull-up control transistor T81j, the first electrode T11jS of the first pull-up control transistor T11j, the first electrode T12jS of the second pull-up control transistor T12j, the first electrode T43jS of the first reset transistor T43j are arranged in sequence along the second direction. The first electrode T51jS of the first inverter transistor T51j, the first electrode T52jS of the second inverter transistor T52j, the first electrode T71jS of the first anti-negative bias transistor T71j, the first electrode T31jS of the first pull-down transistor T31j, the first electrode T42jS of the first pull-down maintaining transistor T42j, and the first electrode T41jS of the fourth pull-down transistor T41j are arranged in sequence along the second direction. The first electrode T53jS of the third inverter transistor T53j and the first electrode T54jS of the fourth inverter transistor T54j are arranged in sequence along the second direction. The first electrode T32jS of the second pull-down transistor T32j and the first electrode T33jS of the third pull-down transistor T33j are arranged in sequence along the second direction. The third portion VST1c of the first reset control line VST1, the third portion VGH1c of the first high potential signal line VGH1, the first electrode T81jS of the third pull-up control transistor T81j, the first electrode T53jS of the third inverter transistor T53j, the first electrode T52jS of the second inverter transistor T52j, the third portion VGL1c of the first low potential signal line VGL1, the third portion LCc of the low-frequency signal line LC, the third portion CKAc of the first clock signal line CKA, the first electrode T21jS of the first pull-up transistor T21j, the first electrode T32jS of the second pull-down transistor T32j, the third portion CKBic of the first group of sub-lines CKBi, the first electrode T22jS of the second pull-up transistor T22j, the third portion CKBjc of the second group of sub-lines CKBj, and the first electrode T23jS of the third pull-up transistor T23j are arranged in sequence along the first direction.

In some embodiments, in the circuit diagram of the present disclosure, to illustrate the connection relationships of each transistor, each transistor has a gate, a first electrode, and a second electrode. However, in actual design processes, electrodes of some transistors are formed using a same structure to reduce the space occupied by the transistors. For example, the first electrode of the first pull-up control sub-transistor T81j1 and the second electrode T81j2D of the second pull-up control sub-transistor T81j2 can be formed using the same structure. Therefore, in the diagram, only the second electrode T81j2D of the second pull-up control sub-transistor T81j2 is identified. It can be understood that this structure also serves as the first electrode of the first pull-up control sub-transistor T81j1. In another example, the first electrode T54jS of the fourth inverter transistor T54j shares a same structure as the first electrode T55jS of the fifth inverter transistor T55j. Therefore, in the diagram, only the first electrode T54jS of the fourth inverter transistor T54j is identified. It can be understood that this structure also serves as the first electrode T55jS of the fifth inverter transistor T55j. Similarly, the structure of the electrodes of other transistors can be determined.

In some embodiments, as shown in FIGS. 19 to 23, the first portion of the first electrode plate of the first capacitor C1 is connected to the second portion of the first electrode plate of the first capacitor C1. The second portion C11a2 of the first electrode plate C11a of the first sub-capacitor C11 is connected to the first portion C11a1 of the first electrode plate C11a of the first sub-capacitor C11. The second portion C12a2 of the first electrode plate C12a of the second sub-capacitor C12 is connected to the first portion C12a1 of the first electrode plate C12a of the second sub-capacitor C12. The second portion C13a2 of the first electrode plate C13a of the third sub-capacitor C13 is connected to the first portion C13a1 of the first electrode plate C13a of the third sub-capacitor C13. The second portion C14a2 of the first electrode plate C14a of the fourth sub-capacitor C14 is connected to the first portion C14a1 of the first electrode plate C14a of the fourth sub-capacitor C14.

In some embodiments, as shown in FIGS. 19 to 23, the third portion VST1c of the first reset control line VST1 is connected to the second portion VST1b of the first reset control line VST1 and the first portion VST1a of the first reset control line VST1. The third portion VGH1c of the first high potential signal line VGH1 is connected to the second portion VGH1b of the first high potential signal line VGH1 and the first portion VGH1a of the first high potential signal line VGH1. The third portion VGL1c of the first low potential signal line VGL1 is connected to the second portion VGL1b of the first low potential signal line VGL1 and the first portion VGL1a of the first low potential signal line VGL1. The third portion LCc of the low frequency signal line LC is connected to the second portion LCb of the low frequency signal line LC and the first portion LCa of the low-frequency signal line LC. The third portion CKAc of the first clock signal line CKA is connected to the second portion CKAb of the first clock signal line CKA and the first portion CKAa of the first clock signal line CKA. The third portion CKBic of the first group of sub-lines CKBi is connected to the second portion CKBib of the first group of sub-lines CKBi and the first portion CKBia of the first group of sub-lines CKBi. The third portion CKBjc of the second group of sub-lines CKBj is connected to the second portion CKBjb of the second group of sub-lines CKBj and the first portion CKBja of the second group of sub-lines CKBj.

In some embodiments, as shown in FIG. 23, the third portion CKAc of the first clock signal line CKA includes the third portion CKA4c of the first clock fourth line CKA4, the third portion CKA3c of the first clock third line CKA3, the third portion CKA2c of the first clock second line CKA2, and the third portion CKA1c of the first clock first line CKA1 arranged in sequence along the first direction.

In some embodiments, as shown in FIGS. 19 to 23, the third portion CKA1c of the first clock first line CKA1 is connected to the second portion CKA1b of the first clock first line CKA1 and the first portion CKA1a of the first clock first line CKA1. The third portion CKA2c of the first clock second line CKA2 is connected to the second portion CKA2b of the first clock second line CKA2 and the first portion CKA2a of the first clock second line CKA2. The third portion CKA3c of the first clock third line CKA3 is connected to the second portion CKA3b of the first clock third line CKA3 and the first portion CKA3a of the first clock third line CKA3. The third portion CKA4c of the first clock fourth line CKA4 is connected to the second portion of the first clock fourth line CKA4 and the first portion CKA4a of the first clock fourth line CKA4.

In some embodiments, as shown in FIG. 23, the third portion CKBic of the first group of sub-lines CKBi includes the third portion CKB7c of the second clock seventh line CKB7, the second portion CKB5c of the second clock fifth line CKB5, the second portion CKB3c of the second clock third line CKB3, and the second portion CKB1c of the second clock first line CKB1 arranged in sequence along the first direction.

In some embodiments, as shown in FIGS. 19 to 23, the third portion CKB1c of the second clock first line CKB1 is connected to the second portion CKB1b of the second clock first line CKB1 and the first portion CKB1a of the second clock first line CKB1. The third portion CKB3c of the second clock third line CKB3 is connected to the second portion CKB3b of the second clock third line CKB3 and the first portion CKB3a of the second clock third line CKB3. The third portion CKB5c of the second clock fifth line CKB5 is connected to the second portion CKB5b of the second clock fifth line CKB5 and the first portion CKB5a of the second clock fifth line CKB5. The third portion CKB7c of the second clock seventh line CKB7 is connected to the second portion CKB7b of the second clock seventh line CKB7 and the first portion CKB7a of the second clock seventh line CKB7.

In some embodiments, as shown in FIG. 23, the third portion CKBjc of the second group of sub-lines CKBj includes a third portion CKB8c of the second clock eighth line CKB8, a third portion CKB6c of the second clock sixth line CKB6, a third portion CKB4c of the second clock fourth line CKB4, and a third portion of the second clock second line CKB2 arranged in sequence along the first direction.

In some embodiments, as shown in FIGS. 19 to 23, the third portion of the second clock second line CKB2 is connected to the second portion CKB2b of the second clock second line CKB2 and the first portion CKB2a of the second clock second line CKB2. The third portion CKB4c of the second clock fourth line CKB4 is connected to the second portion CKB4b of the second clock fourth line CKB4 and the first portion CKB4a of the second clock fourth line CKB4. The third portion CKB6c of the second clock sixth line CKB6 is connected to the second portion CKB6b of the second clock sixth line CKB6 and the first portion CKB6a of the second clock seventh line CKB6. The third portion CKB8c of the second clock eighth line CKB8 is connected to the second portion CKB8b of the second clock eighth line CKB8 and the first portion CKB8a of the second clock eighth line CKB8.

In some embodiments, as shown in FIG. 23, the first source-drain layer 221 includes the first electrode of the first pull-up control sub-transistor T81j1, the second electrode T81j1D of the first pull-up control sub-transistor T81j1, the first electrode T81j2S of the second pull-up control sub-transistor T81j2, and the second electrode T81j2D of the second pull-up control sub-transistor T81j2. The first electrode T81j2S of the second pull-up control sub-transistor T81*j*2, the second electrode T81*j*2D of the second pull-up control sub-transistor T81*j*2, and the second electrode T81*j*1D of the first pull-up control sub-transistor T81*j*1 are arranged in sequence along the second direction.

In some embodiments, as shown in FIG. 23, the first source-drain layer 221 includes the first electrode T41*j*1S of the first pull-down sub-transistor T41*j*1, the second electrode T41*j*1D of the first pull-down sub-transistor T41*j*1, and the second electrode of the second pull-down sub-transistor T41*j*2. The second electrode T41*j*2D of the second pull-down sub-transistor T41*j*2, the first electrode T41*j*2S of the second pull-down sub-transistor T41*j*2, and the second electrode T41*j*1D of the first pull-down sub-transistor T41*j*1 are arranged in sequence along the second direction.

In some embodiments, as shown in FIG. 23, the first source-drain layer 221 includes the first electrode T42*j*1S of the first pull-down maintaining sub-transistor T42*j*1, the second electrode of the first pull-down maintaining sub-transistor T42*j* 1, the first electrode T42*j*2S of the second pull-down maintaining sub-transistor T42*j*2, and the second electrode T42*j*2D of the second pull-down maintaining sub-transistor T42*j*2. The second electrode T42*j*2D of the second pull-down maintaining sub-transistor T42*j*2, the first electrode T42*j*2S of the second pull-down maintaining sub-transistor T42*j*2, and the second electrode T42*j*1S of the first pull-down maintaining sub-transistor T42*j*1 are arranged in sequence along the second direction.

In some embodiments, as shown in FIG. 23, the first source-drain layer 221 includes the first electrode T43*j*1S of the first reset sub-transistor T43*j*1, the second electrode T43*j*1D of the first reset sub-transistor T43*j*1, the first electrode of the second reset sub-transistor T43*j*2, and the second electrode T43*j*1D of the second reset sub-transistor T43*j*2. The second electrode T43*j*1D of the second reset sub-transistor T43*j*2, the first electrode of the second reset sub-transistor T43*j*2, and the second electrode T43*j*1D of the first reset sub-transistor T43*j*1 are arranged in sequence along the second direction.

In some embodiments, as shown in FIG. 23, the first source-drain layer 221 includes the first electrode T51*j*1S of the first inverter sub-transistor T51*j*1, the second electrode T51*j*1D of the first inverter sub-transistor T51*j*1, the first electrode of the second inverter sub-transistor T51*j*2, and the second electrode T51*j*2D of the second inverter sub-transistor T51*j*2. The first electrode T51*j*1S of the first inverter sub-transistor T51*j*1, the second electrode T51*j*1D of the first inverter sub-transistor T51*j*1, and the second electrode T51*j*2D of the second inverter sub-transistor T51*j*2 are arranged in sequence along the first direction.

In some embodiments, as shown in FIG. 23, the first source-drain layer 221 includes the first electrode of the first anti-negative bias sub-transistor T71*j*1, the second electrode T71*j* 1D of the first anti-negative bias sub-transistor T71*j*1, the first electrode T71*j*2S of the second anti-negative bias sub-transistor T71*j*2, and the second electrode T71*j*2D of the second anti-negative bias sub-transistor T71*j*2. The first electrode T71*j*2S of the first anti-negative bias sub-transistor T71*j*2, the second electrode T71*j*2D of the first anti-negative bias sub-transistor T71*j*2, and the second electrode T71*j*1D of the first anti-negative bias sub-transistor T71*j*1 are arranged in sequence along the first direction.

In some embodiments, the first electrode plate of the first capacitor C1 includes the first portion of the first electrode plate of the first capacitor C1 and the second portion of the first electrode plate of the first capacitor C1. The first electrode plate C11*a* of the first sub-capacitor C11 includes the first portion C11*a*1 of the first electrode plate C11*a* of the first sub-capacitor C11 and the second portion C11*a*2 of the first electrode plate C11*a* of the first sub-capacitor C11. The first electrode plate C12*a* of the second sub-capacitor C12 includes the first portion C12*a*1 of the first electrode plate C12*a* of the second sub-capacitor C12 and the second portion C12*a*2 of the first electrode plate C12*a* of the second sub-capacitor C12. The first electrode plate C13*a* of the third sub-capacitor C13 includes the first portion C13*a*1 of the first electrode plate C13*a* of the third sub-capacitor C13 and the second portion C13*a*2 of the first electrode plate C13*a* of the third sub-capacitor C13. The first electrode plate C14*a* of the fourth sub-capacitor C14 includes the first portion C14*a*1 of the first electrode plate C14*a* of the fourth sub-capacitor C14 and the second portion C14*a*2 of the first electrode plate C14*a* of the fourth sub-capacitor C14.

In some embodiments, as shown in FIGS. 6, 8 to 12, and 24 to 28, in the first direction, at least one of the second reset control line VST2 and the third clock signal line CKC is arranged between the first-type gate circuit 22*a* and the third-type gate circuit 22*c*. At least one of the second reset control line VST2 and the third clock signal line CKC is arranged between the first-type gate circuit 22*a* and the third-type gate circuit 22*c*, the length of the connection line that needs to be provided when connecting each signal line to the corresponding transistor can be reduced. As such, there is no need for the signal line outside the transistor region to extend into the transistor region, thereby reducing a space outside the transistor region occupied by the signal line and a space within the transistor region. Thus, the lateral space occupied by the signal line connected to the second-type gate circuit 22*b* is reduced, the lateral space occupied by the second-type gate circuit 22*b* is reduced, and the bezel of the display panel 2 is reduced.

In some embodiments, as shown in FIGS. 6, 8 to 12, and 24 to 28, the second-type gate circuit 22*b* includes the second reset module 327. The second reset module 327 is connected to the second reset control line VST2. The second reset control line VST2 is arranged between the first-type gate circuit 22*a* and the second reset module 327. The second reset control line VST2 is arranged between the first-type gate circuit 22*a* and the second reset module 327, so that the lateral space occupied by the second reset control line VST2 can be reduced, thereby reducing the lateral space occupied by the second-type gate circuit 22*b* and reducing the bezel of the display panel 2.

In some embodiments, as shown in FIGS. 6 and 24 to 28, the second-type gate circuit 22*b* includes the second pull-up module 322. The second pull-up module 322 includes a fourth pull-up transistor T21*i*. The fourth pull-up transistor T21*i* is electrically connected to the third clock signal line CKC.

In the first direction, the third clock signal line CKC is arranged between the second reset module 327 and the fourth pull-up transistor T21*i*. The third clock signal line CKC is arranged between the second reset module 327 and the fourth pull-up transistor T21*i*, so that the lateral space occupied by the third clock signal line CKC can be reduced, thereby reducing the lateral space occupied by the third clock signal line CKC and reducing the bezel.

In some embodiments, as shown in FIGS. 6, 8 to 12, and 24 to 28, in the first direction, at least one of the second reset control line VST2 and the third clock signal line CKC is arranged between the first-type gate circuit 22*a* and the third-type gate circuit 22*c*. At least one of the second reset control line VST2 and the third clock signal line CKC is arranged between the first-type gate circuit 22*a* and the third-type gate circuit 22*c*, the length of the connection line that needs to be provided when connecting each signal line to the corresponding transistor can be reduced. As such, there is no need for the signal line outside the transistor region to extend into the transistor region, thereby reducing a space outside the transistor region occupied by the signal line and a space within the transistor region. Thus, the lateral space occupied by the signal line connected to the second-type gate circuit 22*b* is reduced, the lateral space occupied by the second-type gate circuit 22*b* is reduced, and the bezel of the display panel 2 is reduced.

In some embodiments, as shown in FIGS. 6, 8 to 12, and 24 to 28, the second-type gate circuit 22*b* includes the second reset module 327. The second reset module 327 is connected to the second reset control line VST2. The second reset control line VST2 is arranged between the first-type gate circuit 22*a* and the second reset module 327. The second reset control line VST2 is arranged between the first-type gate circuit 22*a* and the second reset module 327, so that the lateral space occupied by the second reset control line VST2 can be reduced, thereby reducing the lateral space occupied by the second-type gate circuit 22*b* and reducing the bezel of the display panel 2.

In some embodiments, as shown in FIGS. 6 and 24 to 28, the second-type gate circuit 22*b* includes the second pull-up module 322. The second pull-up module 322 includes a fourth pull-up transistor T21*i*. The fourth pull-up transistor T21*i* is electrically connected to the third clock signal line CKC.

In the first direction, the third clock signal line CKC is arranged between the second reset module 327 and the fourth pull-up transistor T21*i*. The third clock signal line CKC is arranged between the second reset module 327 and the fourth pull-up transistor T21*i*, so that the lateral space occupied by the third clock signal line CKC can be reduced, thereby reducing the lateral space occupied by the third clock signal line CKC and reducing the bezel.

In some embodiments, as shown in FIG. 6, the second-type gate circuit 22*b* includes the second pull-up control module 321, the second pull-up module 322, a second pull-down module 323, a second pull-down maintaining module 324, a second inverter module 325, a second anti-negative bias module 326, and the second reset module 327. The second pull-up control module 321 is electrically connected to the second pull-up module 322 at the second pull-up node Q2[*n*]. The second pull-down module 323 is electrically connected to the second pull-up node Q2[*n*] and a second signal output terminal INI[n] of the second-type gate circuit 22*b* of the current stage. The second pull-down maintaining module 324 is electrically connected between the second pull-up node Q2[*n*] and the second low potential signal line VGL2. The second inverter module 325 is electrically connected to the second pull-up node Q2[*n*], the second low potential signal line VGL2, and the low-frequency signal line LC. The second anti-negative bias module 326 is electrically connected between the first high potential signal line VGH1 and the second pull-up node Q2[*n*]. The second reset module 327 is electrically connected between the second pull-up node Q2[*n*] and the second low potential signal line VGL2.

In some embodiments, as shown in FIGS. 6 and 24, at least two of the second pull-up control module 321, the second pull-up module 322, the second pull-down module 323, the second pull-down maintaining module 324, the second inverter module 325, the second anti-negative bias module 326, and the second reset module 327 are arranged along the second direction. The angle between the first direction and the second direction is greater than 0 degrees and less than or equal to 90 degrees. At least two of the second pull-up control module 321, the second pull-up module 322, the v pull-down module 323, the second pull-down maintaining module 324, the second inverter module 325, the second anti-negative bias module 326, and the second reset module 327 are arranged along the second direction, so that the lateral space occupied by the second-type gate circuit 22*b* can be shortened, thereby reducing the lateral space occupied by the gate driving circuits 22 and reducing the bezel of the display panel 2.

In some embodiments, compared with the comparative display device in which each module is arranged laterally, in the embodiments of the present disclosure, at least two modules of the second-type gate circuit 22*b* are arranged along the second direction, so that the lateral space occupied by the second-type gate circuit 22*b* can be shortened, the lateral space occupied by the gate driving circuit 22 can be reduced, and the bezel of the display panel 2 can be reduced.

In some embodiments, as shown in FIGS. 6 and 24, the second pull-up control module 321 and the second reset module 327 are arranged along the second direction. The second pull-up control module 321 and the second reset module 327 are arranged along the second direction, the lateral space occupied by the second pull-up control module 321 and the second reset module 327 can be reduced, and the lateral space occupied by the second-type gate circuit 22*b* can be reduced, thereby reducing the lateral space occupied by the gate driving circuits 22 and reducing the bezel of the display panel 2.

In some embodiments, as shown in FIG. 24, it can be seen that in the second direction, the second pull-up control module 321 is arranged above the second reset module 327.

In some embodiments, as shown in FIGS. 6 and 24, the second pull-down module 323, the second pull-down maintaining module 324, and the second inverter module 325 are arranged along the second direction. The second pull-down module 323, the second pull-down maintaining module 324, and the second inverter module 325 are arranged along the second direction, so that the lateral space occupied by the second-type gate circuit 22*b* can be reduced, thereby reducing the lateral space occupied by the gate driving circuits 22 and reducing the bezel of the display panel 2.

In some embodiments, as shown in FIG. 24, it can be seen that in the second direction, the second inverter module 325 and the second pull-down maintaining module 324 are arranged in sequence. A part of the first pull-down module 323 is arranged between the second inverter module 325 and the second pull-down maintaining module 324, and another part of the second pull-down module 323 is arranged on a side of the first pull-down maintaining module 324 away from the first inverter module 315.

In some embodiments, as shown in FIGS. 6 and 24, a part of the second inverter module 325, the second anti-negative bias module 326, and a part of the second pull-up control module 321 are arranged along the first direction. A part of the second inverter module 325 and another part of the second pull-up control module 321 are arranged along the second direction. The second anti-negative bias module 326 and another part of the second pull-up control module 321 are arranged along the second direction. A part of the second inverter module 325, the second anti-negative bias module 326, and a part of the second pull-up control module 321 are arranged along the second direction, so that the lateral space occupied by the gate driving circuits 22 can be further reduced, thereby reducing the bezel of the display panel 2.

In some embodiments, as shown in FIG. 24, it can be seen that widths of each part in the second pull-up control module 321 are different. A part of the second inverter module 325, the second anti-negative bias module 326, and a part of the second pull-up control module 321 are arranged along the first direction. A part of the second inverter module 325, the second anti-negative bias module 326, and another part of the second pull-up control module 321 are arranged along the second direction.

In some embodiments, as shown in FIGS. 6 and 24 to 28, the second pull-up control module 321 includes a fourth pull-up control transistor T11*i*, a fifth pull-up control transistor T12*i*, and a sixth pull-up control transistor T81*i*. A gate T11*i*G of the fourth pull-up control transistor T11*i* is electrically connected to a second signal output terminal INI[n−2] of the second-type gate circuit 22*b* of the upper two stages. A first electrode T11*i*S of the fourth pull-up control transistor T11*i* is electrically connected to the first high potential signal line VGH1. A second electrode T11*i*D of the fourth pull-up control transistor T11*i* is electrically connected to a first electrode T12*i*S of the fifth pull-up control transistor T12*i*. A gate T12*i*G of the fifth pull-up control transistor T12*i* is electrically connected to the second signal output terminal INI[n−2] of the second-type gate circuit 22*b* of the upper two stages. A second electrode T12*i*D of the fifth pull-up control transistor T12*i* is electrically connected to the second pull-up node Q2[*n*]. A gate T81*i*G of the sixth pull-up control transistor T81*i* is electrically connected to the first high potential signal line VGH1. A first electrode T81*i*S of the sixth pull-up control transistor T81*i* is electrically connected to the first high potential signal line VGH1. A second electrode T81*i*D of the sixth pull-up control transistor T81*i* is electrically connected to the second electrode T11*i*D of the fourth pull-up control transistor T11*i*.

In each stage of the gate driving circuits 22, the sixth pull-up control transistor T81*i*, the fourth-up control transistor T11*i*, and the fifth pull-up control transistor T12*i* are arranged in sequence along the second direction. The sixth pull-up control transistor T81*i*, the fourth pull-up control transistor T11*i*, and the fifth pull-up control transistor T12*i* are arranged in sequence along the second direction, so that the space occupied by the second pull-up control module 321 can be reduced, thereby reducing the bezel of the display panel 2.

In some embodiments, the sixth pull-up control transistor T81*i* includes a third pull-up control sub-transistor T81*i*1 and a fourth pull-up control sub-transistor T81*i*2. A gate T81*i*2G of the fourth pull-up control sub-transistor T81*i*2 and a first electrode T81*i*2S of the fourth pull-up control sub-transistor T81*i*2 are electrically connected to the first high potential signal line VGH1. A second electrode T81*i*2D of the fourth pull-up control sub-transistor T81*i*2 is electrically connected to a first electrode of the third pull-up control sub-transistor T81*i*1. A gate T81*i*1G of the third pull-up control sub-transistor T81*i*1 is electrically connected to the first high potential signal line VGH1. A second electrode T81*i*1D of the third pull-up control sub-transistor T81*i*1 is electrically connected to a second electrode T11*i*D of the fourth pull-up control transistor T11*i*.

The third pull-up control sub-transistor T81*i*1 and the fourth pull-up control sub-transistor T81*i*2 are arranged along the second direction. The sixth pull-up control transistor T81*i* includes the third pull-up control sub-transistor T81*i*1 and the fourth pull-up control sub-transistor T81*i*2, so that the performance of the sixth pull-up control transistor T81*i* can be improved. Furthermore, the third pull-up control sub-transistor T81*i*1 and the fourth pull-up control sub-transistor T81*i*2 are arranged along the first direction, so that a lateral space occupied by the sixth pull-up control transistor T81*i* can be reduced, thereby reducing the bezel of the display panel 2.

In some embodiments, the third pull-up control sub-transistor T81*i*1 and the fourth pull-up control sub-transistor T81*i*2 can be regarded as two independent transistors, or two sub-transistors in the sixth pull-up control transistor T81*i*. Similarly, for other sub-transistors, please refer to the above description and will not be described again in the following embodiments.

In some embodiments, when one transistor has the plurality of sub-transistors, the first electrode of the transistor is the electrode connected to the signal line. For example, the sixth pull-up control transistor T81*i* includes the third pull-up control sub-transistor T81*i*1 and the fourth pull-up control sub-transistor T81*i*2. Since the first electrode T81*i*2S of the fourth pull-up control sub-transistor T81*i*2 is electrically connected to the first high potential signal line VGH1, the first electrode T81*i*S of the sixth pull-up control transistor T81*i* serves as the first electrode T81*i*2S of the fourth pull-up control sub-transistor T81*i*2. In the same way, the first electrodes of other transistors can be determined.

Similarly, the plurality of stages of the gate driving circuits 22 include a plurality of stages of the second-type gate circuit 22*b*. In the second-type gate circuit 22*b* of a first stage, the gate T11*i*G of the fourth pull-up control transistor T11*i* can be connected to the start signal line. In the second-type gate circuit 22*b* of other stages, the gate T11*i*G of the fourth pull-up control transistor T11*i* and the gate T12*i*G of the fifth pull-up control transistor T12*i* are connected to the second signal output terminal INI[n−2] of the second-type gate circuit 22*b* of upper two stages. The first electrode T11*i*S of the fourth pull-up control transistor T11*i* and the first electrode T12*i*S of the fifth pull-up control transistor T12*i* are electrically connected to the first high potential signal line VGH1.

In some embodiments, as shown in FIGS. 6 and 24 to 28, the second pull-down module 323 includes a fifth pull-down transistor T31*i* and a sixth pull-down transistor T41*i*. A gate T31*i*G of the fifth pull-down transistor T31*i* is electrically connected to the second pull-down node QB2[*n*]. A first electrode T31*i*S of the fifth pull-down transistor T31*i* is electrically connected to the second low potential signal line VGL2. A second electrode T31*i*D of the fifth pull-down transistor T31*i* is electrically connected to the second signal output terminal INI[n] of the second-type gate circuit 22*b* of the current stage. A gate T41*i*G of the sixth pull-down transistor T41*i* is electrically connected to a second signal output terminal INI[n+2] of the second-type gate circuit 22*b* of the next two stages. A first electrode T41*i*S of the sixth pull-down transistor T41*i* is connected to the second low potential signal line VGL2. A second electrode T41*i*D of the sixth pull-down transistor T41*i* is electrically connected to the second pull-up node Q2[*n*].

The fifth pull-down transistor T31*i* and the sixth pull-down transistor T41*i* are arranged along the second direction. The fifth pull-down transistor T31*i* and the sixth pull-down transistor T41*i* are arranged along the second direction, so that a space occupied by the second pull-down module 323 can be reduced, and the bezel of the display panel 2 can be reduced.

In some embodiments, as shown in FIGS. 6 and 24 to 28, the sixth pull-down transistor T41*i* includes a third pull-down sub-transistor T41*i*1 and a fourth pull-down sub-transistor T41*i*2. A gate T41*i*2G of the fourth pull-down sub-transistor T41*i*2 is electrically connected to the second signal output terminal INI[n+2] of the second-type gate circuit 22*b* of the next two stages. A first electrode T41*i*2S of the fourth pull-down sub-transistor T41*i*2 is electrically connected to the second low-potential signal line VGL2. A second electrode T41*i*2D of the fourth pull-down sub-transistor T41*i*2 is electrically connected to a first electrode T41*i*1S of the third pull-down sub-transistor T41*i*1 at a second internal node N2[*n*]. A gate T41*i*1G of the third pull-down sub-transistor T41*i*1 is electrically connected to the second signal output terminal INI[n+2] of the second-type gate circuit 22*b* of the next two stages. A second electrode T41*i*1D of the third pull-down sub-transistor T41*i*1 is electrically connected to the second pull-up node Q2[*n*].

The third pull-down sub-transistor T41*i*1 and the fourth pull-down sub-transistor T41*i*2 are arranged along the second direction. The sixth pull-down transistor T41*i* includes the third pull-down sub-transistor T41*i*1 and the fourth pull-down sub-transistor T41*i*2, so that the performance of the sixth pull-down transistor T41*i* can be improved. Furthermore, the third pull-down sub-transistor T41*i*1 and the fourth pull-down sub-transistor T41*i*2 are arranged along the second direction, so that a lateral space occupied by the sixth pull-down transistor T41*i* can be reduced, and the bezel of the display panel 2 can be reduced.

In some embodiments, as shown in FIGS. 6 and 24 to 28, the second inverter module 325 includes a sixth inverter transistor T51*i*, a seventh inverter transistor T52*i*, an eighth inverter transistor T53*i*, a ninth inverter transistor T54*i*, and a tenth inverter transistor T55*i*. A gate T51*i*G of the sixth inverter transistor T51*i* and a first electrode T51*i*S of the sixth inverter transistor T51*i* are electrically connected to the low-frequency signal line LC. A second electrode T51*i*D of the sixth inverter transistor T51*i* is electrically connected to a second electrode T52*i*D of the seventh inverter transistor T52*i*. A gate T52*i*G of the seventh inverter transistor T52*i* is electrically connected to the second pull-up node Q2[*n*]. A first electrode T53*j*S of the seventh inverter transistor T52*i* is electrically connected to the second low potential signal line VGL2. A gate T53*i*G of the eighth inverter transistor T53*i* is electrically connected to the second electrode T51*i*D of the sixth inverter transistor T51*i*. A first electrode T53*i*S of the eighth inverter transistor T53*i* is electrically connected to the low-frequency signal line LC. A second electrode T53*i*D of the eighth inverter transistor T53*i* is electrically connected to the second pull-down node QB2 [*n*]. A gate T54*i*G of the ninth inverter transistor T54*i* is electrically connected to the second pull-up node Q2[*n*]. A first electrode T54*i*S of the ninth inverter transistor T54*i* is electrically connected to the second low potential signal line VGL2. A second electrode T54*i*D of the ninth inverter transistor T54*i* is electrically connected to the second pull-down node QB2[*n*]. A gate T55*i*G of the tenth pull-down transistor T55*i* is electrically connected to a second signal output terminal INI[n−2] of the second-type gate circuit 22*b* of the upper two stages. A first electrode T55*i*S of the tenth pull-down transistor T55*i* is connected to the second low potential signal line VGL2. A second electrode T55*i*D of the tenth pull-down transistor T55*i* is electrically connected to the second pull-down under node QB2[*n*].

The sixth inverter transistor T51*i* and the seventh inverter transistor T52*i* are arranged along the second direction. The eighth inverter transistor T53*i*, the ninth inverter transistor T54*i*, and the tenth inverter transistor T55*i* are arranged along the second direction. The sixth inverter transistor T51*i* and the eighth inverter transistor T53*i* are arranged along the first direction. The sixth inverter transistor T51*i* and the seventh inverter transistor T52*i* are arranged along the second direction, and the eighth inverter transistor T53*i*, the ninth inverter transistor T54*i*, and the tenth inverter transistor T55*i* are arranged along the second direction, so that the lateral space occupied by the second inverter module 325 can be reduced, thereby reducing the bezel of the display panel 2.

In some embodiments, as shown in FIGS. 6 and 24 to 28, the sixth inverter transistor T51*i* includes a third inverter sub-transistor T51*i*1 and a fourth inverter sub-transistor T51*i*2. A gate T51*i*1G of the third inverter sub-transistor T51*i*1 and a first electrode T51*i*1S of the third inverter sub-transistor T51*i*1 are electrically connected to the low-frequency signal line LC. A second electrode T51*i*1D of the third inverter sub-transistor T51*i*1 is electrically connected to a first electrode of the fourth inverter sub-transistor T51*i*2. A gate T51*i*2G of the fourth inverter sub-transistor T51*i*2 is electrically connected to the low-frequency signal line LC. A second electrode T51*i*2D of the fourth inverter sub-transistor T51*i*2 is electrically connected to the second electrode T52*i*D of the seventh inverter transistor T51*j*.

The third inverter sub-transistor T51*i*1 and the fourth inverter sub-transistor T51*i*2 are arranged along the first direction. The sixth inverter transistor T51*i* includes the third inverter sub-transistor T51*i*1 and the fourth inverter sub-transistor T51*i*2, so that the performance of the sixth inverter transistor T51*i* can be improved.

In some embodiments, as shown in FIGS. 6 and 24 to 28, the eighth inverter transistor T53*i* and the sixth pull-up control transistor T81*i* are arranged along the first direction, and the eighth inverter transistor T53*i* and the fourth pull-up control transistor T11*i* are arranged along the second direction, so that a lateral space occupied by the second inverter module 325 and the second pull-up control module 321 can be reduced, thereby reducing the bezel of the display panel 2.

In some embodiments, as shown in FIGS. 6 and 24 to 28, the second pull-down maintaining module 324 includes a second pull-down maintaining transistor T42*i*. A gate T42*i*G of the second pull-down maintaining transistor T42*i* is electrically connected to a second pull-down node QB2[*n*]. A first electrode T42*i*S of the second pull-down maintaining transistor T42*i* is electrically connected to the second low potential signal line VGL2. A second electrode T42*i*D of the second pull-down maintaining transistor T42*i* is electrically connected to the second pull-up node Q2[*n*].

In the second direction, the second pull-down maintaining transistor T42*i* is arranged between the fifth pull-down transistor T31*i* and the sixth pull-down transistor T41*i*. Therefore, the lateral space occupied by the second pull-down maintaining transistor T42*i*, the fifth pull-down transistor T31*i*, and the sixth pull-down transistor T41*i* can be reduced, and the bezel of the display panel 2 can be reduced.

In some embodiments, as shown in FIGS. 6 and 24 to 28, the second pull-down maintaining transistor T42*i* includes a third pull-down maintaining sub-transistor T42*i*1 and a fourth pull-down maintaining sub-transistor T42*i*2. A gate T42*i*2G of the fourth pull-down maintaining sub-transistor T42*i*2 is electrically connected to the second pull-down node QB2[*n*]. A first electrode T42*i*2S of the fourth pull-down maintaining sub-transistor T42*i*2 is electrically connected to the second low potential signal line VGL2. A second electrode T42*i*2D of the fourth pull-down maintaining sub-transistor T42*i*2 is electrically connected to the second internal node N2[*n*]. A gate of the third pull-down maintaining sub-transistor T42*i*1 is electrically connected to the second pull-down node QB2[*n*]. A second electrode of the third pull-down maintaining sub-transistor T42i1 is electrically connected to the second pull-up node Q2[n].

The third pull-down maintaining sub-transistor T42i1 and the fourth pull-down maintaining sub-transistor T42i2 are arranged along the second direction. The second pull-down maintaining transistor T42i includes the third pull-down maintaining sub-transistor T42i1 and the fourth pull-down maintaining sub-transistor T42i2, so that the performance of the second pull-down maintaining transistor T42i can be improved. Furthermore, the third pull-down maintaining sub-transistor T42i1 and the fourth pull-down maintaining sub-transistor T42i2 are arranged along the second direction, so that the lateral space occupied by the second pull-down maintaining transistor T42i is reduced, thereby reducing the bezel of the display panel 2.

In some embodiments, as shown in FIGS. 6 and 24 to 28, the second reset module 327 includes a second reset transistor T43i. A gate T43iG of the second reset transistor T43i is electrically connected to the second reset control line VST2. A first electrode T43iS of the second reset transistor T43i is electrically connected to the second low potential signal line VGL2. A second electrode T43iD of the second reset transistor T43i is electrically connected to the second pull-up node Q2[n].

The second reset transistor T43i is arranged on a side of the fifth pull-up control transistor T12i away from the fourth pull-up control transistor T11i. The second reset transistor T43i is arranged on the side of the fifth pull-up control transistor T12i away from the fourth pull-up control transistor T11i, so that a lateral space occupied by the second reset transistor T43i and the second pull-up control module 321 is reduced, the bezel of the display panel 2 is reduced, and the second reset transistor T43i is easily connected to the second low potential signal line VGL2.

In some embodiments, as shown in FIGS. 6 and 24 to 28, the second reset transistor T43i includes a third inverter sub-transistor T43i1 and a fourth inverter sub-transistor T4312. A gate T43i1G of the fourth reset sub-transistor T4312 is electrically connected to the second reset control line VST2. A first electrode of the fourth reset sub-transistor T4312 is electrically connected to the second low potential signal line VGL2. A second electrode T431iD of the third reset sub-transistor T43i1 and a first electrode T43i1S of the third reset sub-transistor T43i1 are electrically connected to the second internal node N2[n]. A gate T43i1G of the third reset sub-transistor T43i1 is electrically connected to the second reset control line VST2. A second electrode T431iD of the third reset sub-transistor T43i1 is electrically connected to the second pull-up node Q2[n].

The third reset sub-transistor T43i1 and the fourth reset sub-transistor T4312 are arranged along the second direction. The second reset transistor T43i includes the third reset sub-transistor T43i1 and the fourth reset sub-transistor T4312, so that the performance of the second reset transistor T43i can be improved. Furthermore, the third reset sub-transistor T43i1 and the fourth reset sub-transistor T4312 are arranged along the second direction, so that a lateral space occupied by the second reset transistor T43i is reduced, thereby reducing the bezel of the display panel 2.

In some embodiments, as shown in FIGS. 6 and 24 to 28, the second anti-negative bias module 326 includes a second anti-negative bias transistor T61i. A gate T61iG of the second anti-negative bias transistor T61i is electrically connected to the second pull-up node Q2[n]. A first electrode T61iS of the second anti-negative bias transistor T61i is electrically connected to the first high potential signal line VGH1. A second electrode T61iD of the second anti-negative bias transistor T61i is electrically connected to the first internal node N2[n].

The second anti-negative bias transistor T61i is arranged between the sixth pull-up control transistor T81i and the eighth inverter transistor T53i along the first direction. The second anti-negative bias transistor T61i is arranged on a side of the fourth pull-up control transistor T11i away from the fifth pull-up control transistor T12i along the second direction. The second anti-negative bias transistor T61i is arranged on the side of the fourth pull-up control transistor T11i away from the fifth pull-up control transistor T12i along the second direction, so that a lateral space occupied by the second anti-negative bias module 326 can be reduced, thereby reducing the bezel of display panel 2.

In some embodiments, as shown in FIGS. 6 and 24 to 28, the second anti-negative bias transistor T61i includes a third anti-negative bias sub-transistor T61i1 and a fourth anti-negative bias sub-transistor T61i2. A gate T61i2G of the fourth anti-negative bias sub-transistor T61i2 is electrically connected to the second pull-up node Q2[n]. A first electrode T61i2S of the fourth anti-negative bias sub-transistor T61i2 is connected to the first high potential signal line. A second electrode T61i2D of the fourth anti-negative bias sub-transistor T61i2 is electrically connected to a first electrode of the third anti-negative bias sub-transistor T61i1. A gate T61i1G of the third anti-negative bias sub-transistor T61i1 is electrically connected to the second pull-up node Q2[n]. A second electrode T61i1D of the third anti-negative bias sub-transistor T61i1 is electrically connected to the second internal node N2[n].

The third anti-negative bias sub-transistor T61i1 and the fourth anti-negative bias sub-transistor T61i2 are arranged along the second direction. The second anti-negative bias transistor T61i includes the third anti-negative bias sub-transistor T61i1 and the fourth anti-negative bias sub-transistor T61i2, so that the performance of the second anti-negative bias transistor T61i can be improved. Furthermore, the third anti-negative bias sub-transistor T61i1 and the fourth anti-negative bias sub-transistor T61i2 are arranged along the second direction, so that a lateral space occupied by the second anti-negative bias transistor T61i is reduced, thereby reducing the bezel of the display panel 2.

In some embodiments, as shown in FIGS. 6 and 24 to 28, the second pull-up module 322 includes a fourth pull-up transistor T21i. A gate T21iG of the fourth pull-up transistor T21i is electrically connected to the second pull-up node Q2[n]. A first electrode T21iS of the fourth pull-up transistor T21i is electrically connected to the third clock signal line CKC. A second electrode T21iD of the fourth pull-up transistor T21i is electrically connected to the second signal output terminal INI[n] of the second-type gate circuit 22b of the current stage.

The third clock signal line CKC is arranged adjacent to the fourth pull-up transistor T21i in the first direction. As such, the third clock signal line CKC does not need to route from outside the transistor region and extend into the transistor region, so that the third clock signal line CKC is arranged adjacent to the transistor connected thereto with fewer crosses, thereby reducing the space occupied by the third clock signal line CKC and reducing the bezel of the display panel 2.

In some embodiments, the third clock signal line CKC may include a third clock first line CKC1, a third clock second line CKC2, a third clock third line CKC3, and a third clock fourth line CKC4. The first-type gate circuits 22b of every four stages are cyclically connected to these four third clock signal lines CKC. For example, the second-type gate circuit 22*b* of a first stage is connected to the third clock first line CKC1, the second-type gate circuit 22*b* of a second stage is connected to the third clock second line CKC2, the second-type gate circuit 22*b* of a third stage is connected to the third clock third line CKC3, and the second-type gate circuit 22*b* of a fourth stage is connected to the third clock fourth line CKC4. The second-type gate circuit 22*b* of a fifth stage is connected to the third clock first line CKC1, the second-type gate circuit 22*b* of a sixth stage is connected to the third clock second line CKC2, the second-type gate circuit 22*b* of a seventh stage is connected to the third clock third line CKC3, and the second-type gate circuits 22*b* of other stages is connected to the third clock fourth line CKC4.

In some embodiments, the above embodiments take the third clock signal line CKC including four clock lines as an example for explanation, but the embodiments of the present disclosure are not limited thereto. The third clock signal line CKC may include other numbers of clock lines, e.g., the third clock signal line CKA may include 8 clock lines.

In some embodiments, as shown in FIG. 6, the second-type gate circuit 22*b* further includes a second capacitor C2. One electrode plate of the second capacitor C2 is electrically connected to the second pull-up node Q2[*n*], and the other electrode plate of the second capacitor C2 is electrically connected to the second stage transmission output terminal INI[n] of the second-type gate circuit 22*b* of the current stage.

In some embodiments, the second capacitor C2 includes a first electrode plate C2*a* of the second capacitor C2 and a second electrode plate C2*b* of the second capacitor C2. The first electrode plate C2*a* of the second capacitor C2 includes a first portion C2*a*1 of the first electrode plate C2*a* of the second capacitor C2 and a second portion C2*a*2 of the first electrode plate C2*a* of the second capacitor C2.

In some embodiments, as shown in FIGS. 24 and 25, the display panel 2 includes the light shielding layer 212. The light shielding layer 212 includes the first portion VST2*a* of the second reset control line VST2, the second signal output terminal INI[n] of the second-type gate circuit 22*b* of the current stage, the first portion CKCa of the third clock signal line CKC, and the first portion C2*a*1 of the first electrode plate C2*a* of the second capacitor C2 arranged in sequence along the first direction.

In some embodiments, as shown in FIG. 25, the first portion CKAa of the third clock signal line CKC includes a first portion CKC4*a* of the third clock fourth line CKC4, a first portion CKC3*a* of the third clock third line CKC3, a first portion CKC2*a* of the third clock second line CKC2, and a first portion CKC1*a* of the third clock first line CKC1 arranged in sequence along the first direction.

In some embodiments, as shown in FIGS. 24 and 26, the display panel 2 includes the active layer 216. The active layer 216 includes an active portion T11*i*A of the fourth pull-up control transistor T11*i*, an active portion T12*i*A of the fifth pull-up control transistor T12*i*, an active portion T81*i*A of the sixth pull-up control transistor T81*i*, an active portion T21*i*A of the fourth pull-up transistor T21*i*, an active portion T31*i*A of the fifth pull-down transistor T31*i*, an active portion T41*i*A of the sixth pull-down transistor T41*i*, an active portion T42*i*A of the second pull-down maintaining transistor T42*i*, an active portion T51*i*A of the sixth inverter transistor T51*i*, an active portion T52*i*A of the seventh inverter transistor T52*i*, an active portion T53*i*A of the eighth inverter transistor T53*i*, an active portion T54*i*A of the ninth inverter transistor T54*i*, an active portion T55*i*A of the tenth inverter transistor T55*i*, an active portion T43*i*A of the second reset transistor T43*i*, and an active portion T61*i*A of the second anti-negative bias transistor T61*i*.

The active portion T81*i*A of the sixth pull-up control transistor T81*i*, the active portion T11*i*A of the fourth pull-up control transistor T11*i*, the active portion T12*i*A of the fifth pull-up control transistor T12*i*, and the active portion T43*i*A of the second reset transistor T43*i* are arranged in sequence along the second direction. The active portion T51*i*A of the sixth inverter transistor T51*i*, the active portion T52*j*A of the seventh inverter transistor T52*i*, the active portion T31*i*A of the fifth pull-down transistor T31*i*, the active portion T42*i*A of the second pull-down maintaining transistor T42*i*, and the active portion T41*i*A of the sixth pull-down transistor T41*i* are arranged in sequence along the second direction. The active portion T53*i*A of the eighth inverter transistor T53*i*, the active portion T54*i*A of the ninth inverter transistor T54*i*, and the active portion T55*i*A of the tenth inverter transistor T55*i* are arranged in sequence along the second direction, The active portion T81*i*A of the sixth pull-up control transistor T81*i*, the active portion T61*i*A of the second anti-negative bias transistor T61*i*, the active portion T53*i*A of the eighth inverter transistor T53*i*, the active portion T52*i*A of the seventh inverter transistor T52*i*, and the active portion T21*i*A of the fourth pull-up transistor T21*i* are arranged in sequence along the first direction.

In some embodiments, as shown in FIG. 26, the active portion T81*i*A of the sixth pull-up control transistor T81*i* includes the active portion T81*i*1A of the third pull-up control sub-transistor T81*i*1 and the active portion T81*i*2A of the fourth pull-up control sub-transistor T81*i*2. The active portion T81*i*1A of the third pull-up control sub-transistor T81*i*1 and the active portion T81*i*2A of the fourth pull-up control sub-transistor T81*i*2 arranged in sequence along the second direction.

In some embodiments, as shown in FIG. 26, the active portion T41*i*A of the sixth pull-down transistor T41*i* includes an active portion T41*i*1A of the third pull-down sub-transistor T41*i*1 and an active portion T41*i*2A of the fourth pull-down sub-transistor T41*i*2. The active portion T41*i*1A of the first pull-down sub-transistor T41*i*1 and the active portion T41*i*2A of the fourth pull-down sub-transistor T41*i*2 arranged along the second direction.

In some embodiments, as shown in FIG. 26, the active portion T42*i*A of the second pull-down maintaining transistor T42*i* includes an active portion of the third pull-down maintaining sub-transistor T42*i*1 and an active portion T42*i*2A of the fourth pull-down maintaining sub-transistor T42*i*2. The active portion of the third pull-down maintaining sub-transistor T42*i*1 and the active portion T42*i*2A of the fourth pull-down maintaining sub-transistor T42*i*2 are arranged along the second direction.

In some embodiments, as shown in FIG. 26, the active portion T43*i*A of the second reset transistor T43*i* includes an active portion T43*i*1A of the third reset sub-transistor T43*i*1 and an active portion T43*i*1A of the fourth reset sub-transistor T4312. The active portion T43*i*1A of the third reset sub-transistor T43*i*1 and the active portion T43*i*1A of the fourth reset sub-transistor T4312 are arranged along the fourth direction.

In some embodiments, as shown in FIG. 26, the active portion T51*i*A of the sixth inverter transistor T51*i* includes an active portion T51*i*1A of the third inverter sub-transistor T51*i*1 and an active portion T51*i*2A of the fourth inverter sub-transistor T51*i*2. The active portion T51*i*1A of the third inverter sub-transistor T51$i$1 and the active portion T51$i$2A of the fourth inverter sub-transistor T51$i$2 are arranged along the first direction.

In some embodiments, as shown in FIG. 26, the active portion T61$i$A of the second anti-negative bias transistor T61$i$ includes an active portion T61$i$1A of the third anti-negative bias sub-transistor T61$i$1 and an active portion T61$i$2A of the fourth anti-negative bias sub-transistor T61$i$2. The active portion T61$i$1A of the third anti-negative bias sub-transistor T61$i$1 and the active portion T61$i$2A of the fourth anti-negative bias sub-transistor T61$i$2 are arranged along the second direction.

In some embodiments, as shown in FIGS. 24 and 27, the display panel 2 includes the active layer 218. The active layer 218 includes the second portion VST2$b$ of the second reset control line VST2, the second portion CKCb of the third clock signal line CKC, the second electrode plate C2$b$ of the second capacitor C2, the gate T11$i$G of the fourth pull-up control transistor T11$i$, the gate T12$i$G of the fifth pull-up control transistor T12$i$, the gate T81$i$G of the sixth pull-up control transistor T81$i$, the gate T21$i$G of the fourth pull-up transistor T21$i$, the gate T31$i$G of the fifth pull-down transistor T31$i$, the gate T41$i$G of the sixth pull-down transistor T41$i$, the gate T42$i$G of the second pull-down maintaining transistor T42$i$, the gate T51$i$G of the sixth inverter transistor T51$i$, the gate T52$i$G of the seventh inverter transistor T52$i$, the gate T53$i$G of the eighth inverter transistor T53$i$, the gate T54$i$G of the ninth inverter transistor T54$i$, the gate T55$i$G of the tenth inverter transistor T55$i$, the gate T43$i$G of the second reset transistor T43$i$, and the gate T61$i$G of the second anti-negative bias transistor T61$i$.

The gate T81$i$G of the sixth pull-up control transistor T81$i$, the gate T11$i$G of the fourth pull-up control transistor T11$i$, the gate T12$i$G of the fifth pull-up control transistor T12$i$, and the gate T43$i$G of the second reset transistor T43$i$ are arranged in sequence along the second direction. The gate T51$i$G of the sixth inverter transistor T51$i$, the gate T52$i$G of the seventh inverter transistor T52$i$, the gate T31$i$G of the fifth pull-down transistor T31$i$, the gate T42$i$G of the second pull-down maintaining transistor T42$i$, and the gate T41$i$G of the sixth pull-down transistor T41$i$ are arranged in sequence along the second direction. The gate T53$i$G of the eighth inverter transistor T53$i$, the gate T54$i$G of the ninth inverter transistor T54$i$, and the gate T55$i$G of the tenth inverter transistor T55$i$ are arranged in sequence along the second direction. The gate T61$i$G of the second anti-negative bias transistor T61$i$ is arranged on a side of the gate T11$i$G of the fourth pull-up control transistor T11$i$ away from the gate T12$i$G of the fifth pull-up control transistor T12$i$. The second portion VST2$b$ of the second reset control line VST2, the gate T81$i$G of the sixth pull-up control transistor T81$i$, the gate T61$i$G of the second anti-negative bias transistor T61$i$, the gate T53$i$G of the eighth inverter transistor T53$i$, the gate T52$i$G of the seventh inverter transistor T52$i$, the second portion CKCb of the third clock signal line CKC, the gate T21$i$G of the fourth pull-up transistor T21$i$, and the second electrode plate C2$b$ of the second capacitor C2 are arranged in sequence along the first direction.

In some embodiments, as shown in FIG. 27, the second portion CKAb of the third clock signal line CKC includes a second portion CKC4$b$ of the third clock fourth line CKC4, a second portion CKC3$b$ of the third clock third line CKC3, a second portion CKC2$b$ of the third clock second line CKC2, and a second portion CKC1$b$ of the third clock first line CKC1 arranged in sequence along the first direction.

In some embodiments, as shown in FIG. 27, the gate T81$i$G of the sixth pull-up control transistor T81$i$ includes the gate T81$i$1G of the third pull-up control sub-transistor T81$i$1 and the gate T81$i$2G of the fourth pull-up control sub-transistor T81$i$2. The gate T81$i$1G of the third pull-up control sub-transistor T81$i$1 and the gate T81$i$2G of the fourth pull-up control sub-transistor T81$i$2 are arranged in sequence along the second direction.

In some embodiments, as shown in FIG. 27, the gate T41$i$G of the sixth pull-down transistor T41$i$ includes the gate T41$i$1G of the third pull-down sub-transistor T41$i$1 and the gate T41$i$2G of the fourth pull-down sub-transistor T41$i$2. T41$i$1G and the gate T41$i$2G of the fourth pull-down sub-transistor T41$i$2 are arranged along the second direction.

In some embodiments, as shown in FIG. 27, the gate T42$i$G of the second pull-down maintaining transistor T42$i$ includes the gate of the third pull-down maintaining sub-transistor T42$i$1 and the gate T42$i$2G of the fourth pull-down maintaining sub-transistor T42$i$2. The gate of the third pull-down maintaining sub-transistor T42$i$1 and the gate T42$i$2G of the fourth pull-down maintaining sub-transistor T42$i$2 are arranged along the second direction.

In some embodiments, as shown in FIG. 27, the gate T43$i$G of the second reset transistor T43$i$ includes the gate T43$i$1G of the third reset sub-transistor T43$i$1 and the gate T43$i$1G of the fourth reset sub-transistor T4312. The gate T43$i$1G of the third reset sub-transistor T43$i$1 and the gate T43$i$1G of the fourth reset sub-transistor T4312 are arranged along the second direction.

In some embodiments, as shown in FIG. 27, the gate T51$i$G of the sixth inverter transistor T51$i$ includes the gate T51$i$1G of the third inverter sub-transistor T51$i$1 and the gate T51$i$2G of the fourth inverter sub-transistor T51$i$2. The gate T51$i$1G of the third inverter sub-transistor T51$i$1 and the gate T51$i$2G of the fourth inverter sub-transistor T51$i$2 are arranged along the first direction.

In some embodiments, as shown in FIG. 27, the gate T61$i$G of the second anti-negative bias transistor T61$i$ includes the gate T61$i$1G of the third anti-negative bias sub-transistor T61$i$1 and the gate T61$i$2G of the fourth anti-negative bias sub-transistor T61$i$2. The gate T61$i$1G of the third anti-negative bias sub-transistor T61$i$1 and the gate T61$i$2G of the fourth anti-negative bias sub-transistor T61$i$2 are arranged along the first direction.

In some embodiments, as shown in FIGS. 24 and 28, the display panel 2 includes the first source-drain layer 221. The first source-drain layer 221 includes the third portion VST2$c$ of the second reset control line VST2, the third portion CKCc of the third clock signal line CKC, the second portion C2$a$2 of the first electrode plate C2$a$ of the second capacitor C2, the first electrode T11$i$S of the fourth pull-up control transistor T11$i$, the first electrode T12$i$S of the fifth pull-up control transistor T12$i$, the first electrode T81$i$S of the sixth pull-up control transistor T81$i$, the first electrode T21$i$S of the fourth pull-up transistor T21$i$, the first electrode T31$i$S of the fifth pull-down transistor T31$i$, the first electrode T41$i$S of the sixth pull-down transistor T41$i$, the first electrode T42$i$S of the second pull-down maintaining transistor T42$i$, the first electrode T51$i$S of the sixth inverter transistor T51$i$, the first electrode T52$i$S of the seventh inverter transistor T52$i$, the first electrode T53$i$S of the eighth inverter transistor T53$i$, the first electrode T54$i$S of the ninth inverter transistor T54$i$, the first electrode T55$i$S of the tenth inverter transistor T55$i$, the first electrode T43$i$S of the second reset transistor T43$i$, the first electrode T61$i$S of the second anti-negative bias transistor T61$i$, the second electrode T11$i$D of the fourth pull-up control transistor T11$i$, the second electrode T12*i*D of the fifth pull-up control transistor T12*i*, the second electrode T81*i*D of the sixth pull-up control transistor T81*i*, the second electrode T21*i*D of the fourth pull-up transistor T21*i*, the second electrode T31*i*D of the fifth pull-down transistor T31*i*, the second electrode T41*i*D of the sixth pull-down transistor T41*i*, the second electrode T42*i*D of the second pull-down maintenance transistor T42*i*, the second electrode T51*i*D of the sixth inverter transistor T51*i*, the second electrode T52*i*D of the seventh inverter transistor T52*i*, the second electrode T53*i*D of the eighth inverter transistor T53*i*, the second electrode T54*i*D of the ninth inverter transistor T54*i*, the second electrode T55*i*D of the tenth inverter transistor T55*i*, the second electrode T43*i*D of the second reset transistor T43*i*, and the second electrode T61*i*D of the second anti-negative bias transistor T61*i*.

The first electrode T81*i*S of the sixth pull-up control transistor T81*i*, the first electrode T11*i*S of the fourth pull-up control transistor T11*i*, the first electrode T12*i*S of the fifth pull-up control transistor T12*i*, and the first electrode T43*i*S of the second reset transistor T43*i* are arranged in sequence along the second direction. The first electrode T51*i*S of the sixth inverter transistor T51*i*, the first electrode T52*i*S of the seventh inverter transistor T52*i*, the first electrode T31*i*S of the fifth pull-down transistor T31*i*, the first electrode T42*i*S of the second pull-down maintaining transistor T42*i*, and the first electrode T41*i*S of the sixth pull-down transistor T41*i* are arranged in sequence along the second direction. The first electrode T53*i*S of the eighth inverter transistor T53*i* and the first electrode T54*i*S of the ninth inverter transistor T54*i* are arranged in sequence along the second direction. The first electrode T61*i*S of the second anti-negative bias transistor T61*i* is arranged on a side of the first electrode T11*i*S of the fourth pull-up control transistor T11*i* away from the first electrode T12*i*S of the fifth pull-up control transistor T12*i*. The third portion VST2*c* of the second reset control line VST2, the first electrode T81*i*S of the sixth pull-up control transistor T81*i*, the first electrode T61*i*S of the second anti-negative bias transistor T61*i*, the first electrode T53*i*S of the eighth inverter transistor T53*i*, the first electrode T52*i*S of the seventh inverter transistor T52*i*, the third portion CKCb of the third clock signal line CKC, the first electrode T21*i*S of the fourth pull-up transistor T21*i*, and the second portion C2*a*2 of the second electrode plate C2*a* of the second capacitor C2 are arranged in sequence along the first direction.

In some embodiments, in the circuit diagram of the present disclosure, to illustrate the connection relationships of each transistor, each transistor has a gate, a first electrode, and a second electrode. However, during actual design processes, electrodes of some transistors are formed using a same structure to reduce the space occupied by the transistors. For example, the first electrode of the third pull-up control sub-transistor T81*i*1 and the second electrode T81*i*2D of the fourth pull-up control sub-transistor T8112 can be formed using the same structure. Therefore, in the diagram, only the second electrode T81*i*2D of the fourth pull-up control sub-transistor T81*i*2 is identified. It can be understood that this structure also serves as the first electrode of the third pull-up control sub-transistor T81*i*1. Similarly, the structure of the electrodes of other transistors can be determined.

In some embodiments, as shown in FIGS. 24 to 28, the first portion C2*a*1 of the first electrode plate C2*a* of the second capacitor C2 is connected to the second portion C2*a*2 of the first electrode plate C2*a* of the second capacitor C2.

In some embodiments, as shown in FIGS. 24 to 28, the third portion VST2*c* of the second reset control line VST2 is connected to the second portion VST2*b* of the second reset control line VST2 and the first portion VST2*a* of the second reset control line VST2. The third portion CKCc of the third clock signal line CKC is connected to the second portion CKCb of the third clock signal line CKC and the first portion CKCa of the third clock signal line CKC.

In some embodiments, as shown in FIG. 28, the third portion CKCc of the third clock signal line CKC includes the third portion CKC4*c* of the third clock fourth line CKC4, the third portion CKC3*c* of the third clock third line CKC3, the third portion CKC2*c* of the third clock second line CKC2, and the third portion CKC1*c* of the third clock first line CKC1 arranged in sequence along the first direction.

In some embodiments, as shown in FIGS. 24 to 28, the third portion CKC1*c* of the third clock first line CKC1 is connected to the second portion CKC1*b* of the third clock first line CKC1 and the first portion CKC1*a* of the third clock first line CKC1. The third portion CKC2*c* of the third clock second line CKC2 is connected to the second portion CKC2*b* of the third clock second line CKC2 and the first portion CKC2*a* of the third clock second line CKC2. The third portion CKC3*c* of the third clock third line CKC3 is connected to the second portion CKC3*b* of the third clock third line CKC3 and the first portion CKC3*a* of the third clock third line CKC3. The third portion CKC4*c* of the third clock fourth line CKC4 is connected to the second portion CKC4*b* of the third clock fourth line CKC4 and the first portion CKC4*a* of the third clock fourth line CKC4.

In some embodiments, as shown in FIG. 28, the first source-drain layer 221 includes the first electrode of the third pull-up control sub-transistor T81*i*1, the second electrode T81*i*1D of the third pull-up control sub-transistor T81*i*1, the first electrode T81*i*2S of the fourth pull-up control sub-transistor T81*i*2, the second electrode T81*i*2D of the fourth pull-up control sub-transistor T81*i*2. The first electrode T81*i*2S of the fourth pull-up control sub-transistor T81*i*2, the second electrode T81*i*2D of the fourth pull-up control sub-transistor T81*i*2, and the second electrode T81*i*1D of the third pull-up control sub-transistor T81*i*1 are arranged in sequence along the second direction.

In some embodiments, as shown in FIG. 28, the first source-drain layer 221 includes the first electrode T41*i*1S of the third pull-down sub-transistor T41*i*1, the second electrode T41*i*1D of the third pull-down sub-transistor T41*i*1, the first electrode of the fourth pull-down sub-transistor T41*i*2 T41*i*2S, the second electrode T41*i*2D of the fourth pull-down sub-transistor T41*i*2, the second electrode T41*i*2D of the fourth pull-down sub-transistor T41*i*2, the first electrode T41*i*2S of the fourth pull-down sub-transistor T41*i*2, and the second electrode T41*i*1D of the third pull-down sub-transistor T41*i*1 are arranged in sequence along the second direction.

In some embodiments, as shown in FIG. 28, the first source-drain layer 221 includes the first electrode T42*i*1S of the third pull-down maintaining sub-transistor T42*i*1, the second electrode of the third pull-down maintaining sub-transistor T42*i*1, the first electrode T42*i*2S of the fourth pull-down maintaining sub-transistor T42*i*2, the second electrode T42*i*2D of the fourth pull-down maintaining sub-transistor T42*i*2, the first electrode T42*i*2S of the fourth pull-down maintaining sub-transistor T42*i*2, and the first electrode T42*i*1S of the third pull-down maintaining sub-transistor T42*i*1 arranged in sequence along the second direction.

In some embodiments, as shown in FIG. 28, the first source-drain layer 221 includes the first electrode T43*i*1S of the third reset sub-transistor T43*i*1, the second electrode T43*i*1D of the third reset sub-transistor T43*i*1, the first electrode of the fourth reset sub-transistor T4312, the second electrode T43*i*1D of the fourth reset sub-transistor T4312, the second electrode T431*i*D of the fourth reset sub-transistor T4312, the first electrode of the fourth reset sub-transistor T4312, and the second electrode T431*i*D of the third reset sub-transistor T43*i*1 arranged in sequence along the second direction.

In some embodiments, as shown in FIG. 28, the first source-drain layer 221 includes the first electrode T51*i*1S of the third inverter sub-transistor T51*i*1, the second electrode T51*i*1D of the third inverter sub-transistor T51*i*1, the first electrode of the fourth inverter sub-transistor T51*i*2, the second electrode T51*i*2D of the fourth inverter sub-transistor T51*i*2, the first electrode T51*i*1S of the third inverter sub-transistor T51*i*1, the second electrode T51*i*1D of the third inverter sub-transistor T51*i*1, and the second electrode T51*i*2D of the fourth inverter sub-transistor T51*i*1 arranged in sequence along the first direction.

In some embodiments, as shown in FIG. 28, the first source-drain layer 221 includes the first electrode of the third anti-negative bias sub-transistor T61*i*1, the second electrode T61*i*1D of the third anti-negative bias sub-transistor T61*i*1, the first electrode T61*i*2S of the fourth anti-negative bias sub-transistor T61*i*2, the second electrode T61*i*2D of the fourth anti-negative bias sub-transistor T61*i*2, the first electrode T61*i*2S of the fourth anti-negative bias sub-transistor T61*i*2, the second electrode T61*i*2D of the fourth anti-negative bias sub-transistor T61*i*2, and the second electrode T61*i*1D of the third anti-negative bias sub-transistor T61*i*1 arranged in sequence along the first direction.

In some embodiments, as shown in FIGS. 7, 8 to 12, and 29 to 33, in the first direction, at least one of the second low potential signal line VGL2 and the second high potential signal line VGH2 is arranged between the second-type gate circuit 22*b* and the third low potential signal line VGL3. At least one of the second low potential signal line VGL2 and the second high potential signal line VGH2 is arranged between the second-type gate circuit 22*b* and the third low potential signal line VGL3, so that the length of the connection line that needs to be provided when connecting each signal line to the corresponding transistor can be reduced. As such, there is no need for the signal line outside the transistor region to extend into the transistor region, thereby reducing a space outside the transistor region occupied by the signal line and a space within the transistor region. Thus, the lateral space occupied by the signal line connected to the third-type gate circuit 22*c* is reduced, the lateral space occupied by the third-type gate circuit 22*c* is reduced, and the bezel of the display panel 2 is reduced.

In some embodiments, as shown in FIGS. 7, 8 to 12, and 29 to 33, the third-type gate circuit 22*c* includes a third pull-down maintaining module 334. The third pull-down maintaining module 334 is electrically connected to the second low potential signal line VGL2. The second low potential signal line VGL2 is arranged between the third pull-down maintaining module 334 and the third low potential signal line VGL3. The second low potential signal line VGL2 is arranged between the third pull-down maintaining module 334 and the third low potential signal line VGL3, so that the lateral space occupied by the second low potential signal line VGL2 can be reduced, the lateral space occupied by the third-type gate circuit 22*c* can be reduced, and the bezel of the display panel 2 can be reduced.

In some embodiments, as shown in FIGS. 7, 8 to 12, and 29 to 33, the third-type gate circuit 22*c* includes a third pull-up module 332. The third pull-up module 332 is electrically connected to the second high potential signal line VGH2.

In the first direction, the second high potential signal line VGH2 is arranged between the second low potential signal line VGL2 and the third pull-up module 332. The second high potential signal line VGH2 is arranged between the second low potential signal line VGL2 and the third pull-up module 332, so that the lateral space occupied by the second high potential signal line VGH2 can be reduced, the lateral space occupied by the third-type gate circuit 22*c* can be reduced, and the bezel can be reduced.

In some embodiments, as shown in FIGS. 7, 8 to 12, and 29 to 33, the third-type gate circuit 22*c* includes a third pull-down module 333. The third pull-down module 333 is electrically connected to the third low potential signal line VGL3.

In the first direction, the third low potential signal line VGL3 is arranged on a side of the third pull-down module 333 away from the third pull-up module 332. The third low potential signal line VGL3 is arranged on the side of the third pull-down module 333 away from the third pull-up module 332, so that the lateral space occupied by the third low potential signal line VGL3 can be reduced, the lateral space occupied by the third-type gate circuit 22*c* can be reduced, and the bezel can be reduced.

In some embodiments, as shown in FIG. 7, the third-type gate circuit 22*c* includes the third pull-up control module 331, the third pull-up module 332, the third pull-down module 333, the third pull-down maintaining module 334, a third inverter module 335, and a third anti-negative bias module 336. The third pull-up control module 331 is electrically connected to the third pull-up module 332 at the third pull-up node Q3[*n*]. The third pull-down module 333 is electrically connected to the third pull-up node Q3[*n*] and a third signal output terminal REF[n] of the third-type gate circuit 22*c* of the current stage. The third pull-down maintaining module 334 is electrically connected between the third pull-up node Q3[*n*] and the second low potential signal line VGL2. The third inverter module 335 is electrically connected to the third pull-up node Q3[*n*], the first high potential signal line VGH1, the second low potential signal line VGL2, a first signal output terminal Gn[n−1] of the first-type gate circuit 22*a* of the upper stage, the second signal output terminal INI[n] of the second-type gate circuit 22*b* of the current stage, and the second signal output terminal INI[n+1] of the second-type gate circuit 22*b* of the next stage. The third anti-negative bias module 336 is electrically connected between the first high potential signal line VGH1 and the third pull-up node Q3[*n*].

In some embodiments, as shown in FIGS. 7 and 29, at least two of the third pull-up control module 331, the third pull-up module 332, the third pull-down module 333, the third pull-down maintaining module 334, the third inverter module 335, and the third anti-negative bias module 336 are arranged along the second direction. The angle between the first direction and the second direction is greater than 0 degrees and less than or equal to 90 degrees. At least two of the third pull-up control module 331, the third pull-up module 332, the third pull-down module 333, the third pull-down maintaining module 334, the third inverter module 335, and the third anti-negative bias module 336 are arranged along the second direction, so that the lateral space occupied by the first-type gate circuit 22*c* can be shortened, thereby reducing the lateral space occupied by the gate driving circuits 22 and reducing the bezel of the display panel 2.

In some embodiments, compared with the comparative display device in which each module is arranged laterally, in the embodiments of the present disclosure, at least two modules in the third-type gate circuit 22*c* are arranged along the second direction, so that the lateral space occupied by the third-type gate circuit 22*c* is reduced, thereby reducing the lateral space occupied by the gate driving circuits 22 and reducing the bezel of the display panel 2.

In some embodiments, as shown in FIGS. 7 and 29, a part of the third pull-up control module 331, a part of the third pull-down maintaining module 334, a part of the third inverter module 335, the third anti-negative bias module 336 are arranged along the second direction. Another part of the third pull-up control module 331, another part of the third inverter module 335, and a part of the third pull-down module 333 are arranged along the second direction. A part of the third pull-up control module 331, the third pull-down maintaining module 334, a part of the third inverter module 335, and the third anti-negative bias module 336 are arranged along the second direction. Another part of the third pull-up control module 331, another part of the third inverter module 335, and a part of the third pull-down module 333 are arranged along the second direction. As such, a lateral space occupied by the third pull-up control module 331, the third pull-down maintaining module 334, the third inverter module 335, the third anti-negative bias module 336, and the third pull-down module 333 can be reduced, and the lateral space occupied by the third-type gate circuit 22*c* can be reduced, and the lateral space occupied by the gate driving circuits 22 can be reduced, thereby reducing the bezel of the display panel 2.

In some embodiments, as shown in FIG. 29, it can be seen that in the second direction, the third pull-up control module 331 is arranged below the third anti-negative bias module 336, the third anti-negative bias module 336 is arranged on the third pull-down maintaining module 334, and the third pull-down maintaining module 334 is arranged below a part of the third inverter module 335. The third pull-up control module 331 is arranged below a part of the third inverter module 335, a part of the third inverter module 335 is arranged below a part of the third pull-down module 333, and a part of the third inverter module 335 is arranged above a part of the third pull-down module 333.

In some embodiments, as shown in FIGS. 7 and 29 to 33, the third inverter module 335 includes an eleventh inverter transistor T51*r*, a twelfth inverter transistor T52*r*, a thirteenth inverter transistor T53*r*, a fourteenth inverter transistor T54*r*, a fifteenth inverter transistor T55*r*, and a sixteenth inverter transistor T56*r*. A gate T51*r*G of the eleventh inverter transistor T51*r* and a first electrode T51*r*S of the eleventh inverter transistor T51*r* are electrically connected to the first signal output terminal Gn[n−1] of the first-type gate circuit 22*a* of the upper stage. A second electrode T51*r*D of the eleventh inverter transistor T51*r* is electrically connected to a second electrode T52*r*D of the twelfth inverter transistor T52*r*. A gate T52*r*G of the twelfth inverter transistor T52*r* is electrically connected to the second signal output terminal INI[n] of the second-type gate circuit 22*b* of the current stage. A first electrode T52*r*S of the twelfth inverter transistor T52*r* is electrically connected to the second low potential signal line VGL2. A gate T53*r*G of the thirteenth inverter transistor T53*r* is electrically connected to the second electrode T51*r*D of the eleventh inverter transistor T51*r*. A first electrode T53*r*S of the thirteenth inverter transistor T53*r* is electrically connected to the first high potential signal line VGH1. A gate T54*r*G of the fourteenth inverter transistor T54*r* is electrically connected to the second electrode T51*r*D of the eleventh inverter transistor T51*r*. A first electrode T54*r*S of the fourteenth inverter transistor T54*r* is electrically connected to the first high potential signal line VGH1. A second electrode T54*r*D of the fourteenth inverter transistor T54*r* is electrically connected to the third pull-down node QB3[*n*]. A gate T55*r*G of the fifteenth inverter transistor T55*r* is electrically connected to the third pull-up node Q3[*n*]. A first electrode T55*r*S of the fifteenth inverter transistor T55*r* is electrically connected to the second low potential signal line VGL2. A second electrode of the fifteenth inverter transistor T55*r* is electrically connected to a third pull-down node QB3[*n*]. A gate T56*r*G of the sixteenth pull-down transistor T56*r* is electrically connected to the second signal output terminal INI[n+1] of the second type gate circuit 22*b* of next stage. A first electrode T56*r*S of the sixteenth pull-down transistor T56*r* is connected to the second low potential signal line VGL2. A second electrode T56*r*D of the sixteenth pull-down transistor T56*r* is electrically connected to the third pull-down under node QB3[*n*].

The thirteenth inverter transistor T53*r*, the eleventh inverter transistor T51*r*, and the twelfth inverter transistor T52*r* are arranged along the first direction. The thirteenth inverter transistor T53*r* and the fourteenth inverter transistor T54*r* are arranged along the second direction. The eleventh inverter transistor T51*r*, the fifteenth inverter transistor T55*r*, and the sixteenth inverter transistor T56*r* are arranged along the second direction, so that the lateral space occupied by the third inverter module 335 is reduced, thereby reducing the bezel of the display panel 2.

In some embodiments, as shown in FIGS. 7 and 29 to 33, the eleventh inverter transistor T51*r* includes a fifth inverter sub-transistor T51*r*1 and a sixth inverter sub-transistor T51*r*2. A gate T51*r*1G of the fifth inverter sub-transistor T51*r*1 and a first electrode T51*r*1S of the fifth inverter sub-transistor T51*r*1 are electrically connected to the first signal output terminal Gn[n−1] of the first-type gate circuit 22*a* of the upper stage. A second electrode T51*r*1D of the fifth inverter sub-transistor T51*r*1 is electrically connected to a first electrode of the sixth inverter sub-transistor T51*r*2. A gate T51*r*2G of the sixth inverter sub-transistor T51*r*2 is electrically connected to the first signal output terminal Gn[n−1] of the first-type gate circuit 22*a* of the upper stage. A second electrode T51*r*2D of the sixth inverter sub-transistor T51*r*2 is electrically connected to the second electrode T52*r*D of the twelfth inverter transistor T52*r*.

The fifth inverter sub-transistor T51*r*1 and the sixth inverter sub-transistor T51*r*2 are arranged along the second direction. The eleventh inverter transistor T51*r* includes the fifth inverter sub-transistor T51*r*1 and the sixth inverter sub-transistor T51*r*2, so that the performance of the eleventh inverter transistor T51*r* can be improved. Furthermore, the fifth inverter sub-transistor T51*r*1 and the sixth inverter sub-transistor T51*r*2 are arranged along the second direction, thereby reducing a lateral space occupied by the eleventh inverter transistor T51*r* and reduce the bezel of the display panel 2.

In some embodiments, as shown in FIGS. 7 and 29 to 33, the twelfth inverter transistor T52*r* includes a seventh inverter sub-transistor T52*r*1 and an eighth inverter sub-transistor T52*r*2. A gate T52*r*1G of the seventh inverter sub-transistor T52*r*1 and a first electrode T52*r*1S of the seventh inverter sub-transistor T52*r*1 are electrically connected to the second signal output terminal INI[n] of the second-type gate circuit 22*b* of the current stage. A second electrode T52*r*1D of the seventh inverter sub-transistor T52*r*1 is electrically connected to the first electrode of the eighth inverter sub-transistor T52*r*2. A gate T52*r*2G of the eighth inverter sub-transistor T52*r*2 is electrically connected to the second signal output terminal INI[n] of the second-type gate circuit 22*b* of the current stage. A second electrode T52*r*2D of the eighth inverter sub-transistor T52*r*2 is electrically connected to the second electrode T51*r*D of the eleventh inverter transistor T51*r*.

The seventh inverter sub-transistor T52*r*1 and the eighth inverter sub-transistor T52*r*2 are arranged along the second direction. The twelfth inverter transistor T52*r* includes the seventh inverter sub-transistor T52*r*1 and the eighth inverter sub-transistor T52*r*2, so that the performance of the twelfth inverter transistor T52*r* can be improved. Furthermore, the seventh inverter sub-transistor T52*r*1 and the eighth inverter sub-transistor T52*r*2 are arranged along the second direction, thereby reducing a lateral space occupied by the twelfth inverter transistor T52*r* and reducing the bezel of the display panel 2.

In some embodiments, as shown in FIGS. 7 and 29 to 33, the third pull-up control module 331 includes a seventh pull-up control transistor T11*r*. A gate T11*r*G of the seventh pull-up control transistor T11*r* is electrically connected to the second signal output terminal INI[n+1] of the second-type gate circuit 22*b* of the next stage. The first electrode T11*r*S of the seventh pull-up control transistor T11*r* is electrically connected to the first high potential signal line VGH1. The second electrode T11*r*D of the seventh pull-up control transistor T11*r* is electrically connected to the third pull-up node Q3[*n*].

The seventh pull-up control transistor T11*r* and the eleventh inversion transistor T51*r* are arranged along the second direction. The seventh pull-up control transistor T11*r* and the eleventh inversion transistor T51*r* are arranged along the second direction, so that the lateral space occupied by the third inverter module 335 and the third pull-up control transistor T81*j* can be reduced, and the bezel of the display panel 2 can be reduced.

In some embodiments, as shown in FIGS. 7 and 29 to 33, the third pull-down module 333 includes a seventh pull-down transistor T31*r* and an eighth pull-down transistor T41*r*. A gate T31*r*G of the seventh pull-down transistor T31*r* is electrically connected to the third pull-down node QB3[*n*]. A first electrode T31*r*S of the seventh pull-down transistor T31*r* is electrically connected to the third low potential signal line VGL3. A second electrode T31*r*D of the seventh pull-down transistor T31*r* is electrically connected to the third signal output terminal REF[n] of the third-type gate circuit 22*c* of the current stage. A gate T41*r*G of the eighth pull-down transistor T41*r* is electrically connected to the first signal output terminal of the first-type gate circuit 22*a* of the upper stage. A first electrode T41*r*S of the eighth pull-down transistor T41*r* is connected to the second low potential signal line VGL2. A second electrode T41*r*D of the eighth pull-down transistor T41*r* is electrically connected to the third pull-up node Q3[*n*].

The eighth pull-down transistor T41*r* is arranged between the eleventh invert transistor T51*r* and the fifteenth invert transistor T55*r* along the second direction. The eighth pull-down transistor T41*r* is arranged between the eleventh inverter transistor T51*r* and the fifteenth inverter transistor T55*r* along the second direction, so that the space occupied by the third pull-down module 333 and the third inverter module 335 can be reduced, and the bezel of the display panel 2 can be reduced.

In some embodiments, as shown in FIGS. 7 and 29 to 33, the eighth pull-down transistor T41*r* includes a fifth pull-down sub-transistor T41*r*1 and a sixth pull-down sub-transistor T41*r*2. A gate T41*r*1G of the fifth pull-down sub-transistor T41*r*1 is electrically connected to the first signal output terminal of the first-type gate circuit 22*a* of the upper stage. A first electrode T41*r*1S of the fifth pull-down sub-transistor T41*r*1 is electrically connected to the second low potential signal line VGL2. A second electrode T41*r*1D of the fifth pull-down sub-transistor T41*r*2 is electrically connected to the first electrode of the sixth pull-down sub-transistor T41*r*2 at a third internal node N3[*n*]. A second electrode T41*r*2D of the sixth pull-down sub-transistor T41*r*2 is electrically connected to the first signal output terminal of the first-type gate circuit 22*a* of the upper stage. A second electrode T41*r*2D of the sixth pull-down sub-transistor T41*r*2 is electrically connected to the third pull-up node Q3[*n*].

The fifth pull-down sub-transistor T41*r*1 and the sixth pull-down sub-transistor T41*r*2 are arranged along the second direction. The eighth pull-down transistor T41*r* includes the fifth pull-down sub-transistor T41*r*1 and the sixth pull-down sub-transistor T41*r*2, so that the performance of the eighth pull-down transistor T41*r* can be improved. Furthermore, the fifth pull-down sub-transistor T41*r*1 and the sixth pull-down sub-transistor T41*r*2 are arranged along the second direction, so that a lateral space occupied by the eighth pull-down transistor T41*r* can be reduced, and the bezel of the display panel 2 can be reduced.

In some embodiments, as shown in FIGS. 7 and 29 to 33, the third pull-down maintaining module 334 includes a third pull-down maintaining transistor T42*r*. A gate T42*r*G of the third pull-down maintaining transistor T42*r* is electrically connected to the third pull-down node QB3[*n*]. A first electrode T42*r*S of the third pull-down maintaining transistor T42*r* is electrically connected to the second low potential signal line VGL2. A second electrode T42*r*D of the third pull-down maintaining transistor T42*r* is electrically connected to the third pull-up node Q3[*n*].

In a second direction, the third pull-down maintaining transistor T42*r* is arranged between the twelfth inverter transistor T52*r* and the seventh pull-up control transistor T11*r*, so that a lateral space occupied by the third pull-down maintaining transistor T42*r*, the twelfth inverter transistor T52*r*, and the seventh pull-up control transistor T11*r* can be reduced, and the bezel of the display panel 2 can be reduced.

In some embodiments, as shown in FIGS. 7 and 29 to 33, the third pull-down maintaining transistor T42*r* includes a fifth pull-down maintaining sub-transistor T42*r*1 and a sixth pull-down maintaining sub-transistor T42*r*2. A gate T42*r*2G of the sixth pull-down maintaining sub-transistor T42*r*2 is electrically connected to the third pull-down node QB3[*n*]. A first electrode T42*r*2S of the sixth pull-down maintaining sub-transistor T42*r*2 is electrically connected to the second low potential signal line VGL2. A second electrode T42*r*2D of the sixth pull-down maintaining sub-transistor T42*r*2 is electrically connected to a first electrode T42*r*1S of the fifth pull-down maintaining sub-transistor T42*r*1 at the third internal node N3[*n*]. A gate T42*r*1G of the fifth pull-down maintaining sub-transistor T42*r*1 is electrically connected to the third pull-down node QB3[*n*]. A second electrode T42*r*1D of the fifth pull-down maintaining sub-transistor T42*r*1 is electrically connected to the third pull-down node QB3[*n*].

The fifth pull-down maintaining sub-transistor T42r1 and the sixth pull-down maintaining sub-transistor T42r2 are arranged along the second direction. The third pull-down maintaining transistor T42r includes the fifth pull-down maintaining sub-transistor T42r1 and the sixth pull-down maintaining sub-transistor T42r2, so that the performance of the third pull-down maintaining transistor T42r can be improved. Furthermore, the fifth pull-down maintaining sub-transistor T42r1 and the sixth pull-down maintaining sub-transistor T42r2 are arranged along the second direction, so that the lateral space occupied by the third pull-down maintaining transistor T42r can be reduced, and the bezel of the display panel 2 is reduced.

In some embodiments, as shown in FIGS. 7 and 29 to 33, the third anti-negative bias module 336 includes a third anti-negative bias transistor T61r. A gate T61rG of the third anti-negative bias transistor T61r is electrically connected to the third pull-up node Q3[n]. A first electrode T61rS of the third anti-negative bias transistor T61r is electrically connected to the first high potential signal line VGH1. A second electrode T61rD of the third anti-negative bias transistor T61r is electrically connected to the third internal node N3[n].

The third anti-negative bias transistor T61r is arranged between the seventh pull-up control transistor T11r and the third pull-down maintaining transistor T42r along the second direction. The third anti-negative bias transistor T61r is arranged on a side of the eighth pull-down transistor T41r away from the fourteenth inverter transistor T54r along the first direction. The third anti-negative bias transistor T61r is arranged between the seventh pull-up control transistor T11r and the third pull-down maintaining transistor T42r along the second direction, so that a lateral space occupied by the third anti-negative bias module 336 can be reduced, and the bezel of display panel 2 is reduced.

In some embodiments, as shown in FIGS. 7 and 29 to 33, the third anti-negative bias transistor T61r includes a fifth anti-negative bias sub-transistor T61r1 and a sixth anti-negative bias sub-transistor T61r2. A gate T61r2G of the sixth anti-negative bias sub-transistor T61r2 is electrically connected to the third pull-up node Q3[n]. A first electrode T61r2S of the sixth anti-negative bias sub-transistor T61r2 is electrically connected to the first high potential signal line. A second electrode T61r2D of the sixth anti-negative bias sub-transistor T61r2 is electrically connected to a first electrode of the fifth anti-negative bias sub-transistor T61r1. A gate T61r1G of the fifth anti-negative bias sub-transistor T61r1 is electrically connected to the third pull-up node Q3[n]. A second electrode T61r1D of the fifth anti-negative bias sub-transistor T61r1 is electrically connected to the third internal node N3[n].

The fifth anti-negative bias sub-transistor T61r1 and the sixth anti-negative bias sub-transistor T61r2 are arranged along the second direction. The third anti-negative bias transistor T61r includes the fifth anti-negative bias sub-transistor T61r1 and the sixth anti-negative bias sub-transistor T61r2, so that the performance of the third anti-negative bias transistor T61r can be improved. Furthermore, the fifth anti-negative bias sub-transistor T61r1 and the sixth anti-negative bias sub-transistor T61r2 are arranged along the second direction, so that a lateral space occupied by the third anti-negative bias transistor T61r can be reduced, and the bezel of the display panel 2 is reduced.

In some embodiments, the third pull-up module 332 includes a fifth pull-up transistor T21r. A gate T21rG of the fifth pull-up transistor T21r is electrically connected to the third pull-up node Q3[n]. A first electrode T21rS of the fifth pull-up transistor T21r is electrically connected to the second high potential signal line VGH2. A second electrode T21rD of the fifth pull-up transistor T21r is electrically connected to the third signal output terminal REF[n] of the third-type gate circuit 22c of the current stage.

The second high potential signal line VGH2 is arranged adjacent to the fifth pull-up transistor T21r in the first direction. As such, the second high potential signal line VGH2 does not need to route from outside the transistor region and extend into the transistor region, so that the the width of the second high potential signal line VGH2 is arranged adjacent to the transistor connected thereto with fewer crosses, thereby reducing the space occupied by the second high potential signal line VGH2 and reducing the bezel of the display panel 2.

In some embodiments, as shown in FIG. 7, the third-type gate circuit 22c further includes a third capacitor C3. One electrode plate of the third capacitor C3 is electrically connected to the third pull-up node Q3[n], and the other electrode plate of the third capacitor C3 is electrically connected to the third stage transmission output terminal REF[n] of the third-type gate circuit 22c of the current stage.

In some embodiments, the third capacitor C3 includes a first electrode plate C3a of the third capacitor C3 and a second electrode plate C3b of the third capacitor C3. The first electrode plate C3a of the third capacitor C3 includes a first portion C3a1 of the first electrode plate C3a of the third capacitor C3 and a second portion C3a2 of the first electrode plate C3a of the third capacitor C3.

In some embodiments, as shown in FIG. 7, the third-type gate circuit 22c further includes a fourth capacitor C4. One electrode plate of the fourth capacitor C4 is electrically connected to the first high potential signal line VGH1, and the other electrode plate of the fourth capacitor C4 is electrically connected to the second electrode T51rD of the eleventh inverter transistor T51r.

In some embodiments, the fourth capacitor C4 includes a first electrode plate C4a of the fourth capacitor C4 and a second electrode plate C4b of the fourth capacitor C4.

In some embodiments, as shown in FIGS. 29 and 30, the display panel 2 includes the light shielding layer 212. The light shielding layer 212 includes a first portion VGL2a of the second low potential signal line VGL2, a first portion VGH2a of the second high potential signal line VGH2, a first portion C3a1 of the first electrode plate C3a of the third capacitor C3, and a first portion VGL3a of the third low potential signal line VGL3 arranged in sequence along the first direction.

In some embodiments, as shown in FIGS. 29 and 31, the display panel 2 includes an active layer 216. The active layer 216 includes an active portion T11rA of the seventh pull-up control transistor T11r, an active portion T21rA of the fifth pull-up transistor T21r, an active portion T31rA of the seventh pull-down transistor T31r, an active portion T41rA of the eighth pull-down transistor T41r, an active portion T42rA of the third pull-down maintaining transistor T42r, an active portion T51rA of the eleventh inverter transistor T51r, an active portion T52rA of the twelfth inverter transistor T52r, an active portion T53rA of the thirteenth inverter transistor T53r, an active portion T54rA of the fourteenth inverter transistor T54r, an active portion T55rA of the fifteenth inverter transistor T55r, an active portion T56rA of the sixteenth inverter transistor T56r, and an active portion T61rA of the third anti-negative bias transistor T61r.

The active portion T53rA of the thirteenth inverter transistor T53r, the active portion T54rA of the fourteenth inverter transistor T54r are arranged in sequence along the second direction. The active portion T51rA of the eleventh inverter transistor T51r, the active portion T41rA of the eighth pull-down transistor T41r, the active portion T55rA of the fifteenth inverter transistor T55r, the active portion T56rA of the sixteenth inverter transistor T56r, and the active portion T11rA of the seventh pull-up transistor T11r are arranged in sequence along the second direction. The active portion T52rA of the twelfth inverter transistor T52r, the active portion T42rA of the third pull-down maintaining transistor T42r, the active portion T61rA of the third anti-negative bias transistor T61r, the active portion T11rA of the seventh pull-up control transistor T11r are arranged in sequence along the second direction. The active portion T53rA of the thirteenth inverter transistor T53r, the active portion T51rA of the eleventh inverter transistor T51r, the active portion T52rA of the twelfth inverter transistor T52r, the active portion T21rA of the fifth pull-up transistor T21r, and the active portion T31rA of the seventh pull-down transistor T31r are arranged in sequence along the first direction.

In some embodiments, as shown in FIG. 31, the active portion T41rA of the eighth pull-down transistor T41r includes an active portion T41r1A of the fifth pull-down sub-transistor T41r1 and an active portion T41r2A of the sixth pull-down sub-transistor T41r2. The active portion T41r1A of the fifth pull-down sub-transistor T41r1 and the active portion T41r2A of the sixth pull-down sub-transistor T41r2 are arranged along the second direction.

In some embodiments, as shown in FIG. 31, the active portion of the fifth pull-down maintaining transistor includes an active portion T42r1A of the fifth pull-down maintaining sub-transistor T42r1 and an active portion T42r2A of the sixth pull-down maintaining sub-transistor T42r2. The active portion T42r1A of the fifth pull-down maintaining sub-transistor T42r1 and the active portion T42r2A of the sixth pull-down maintaining sub-transistor T42r2 are arranged along the second direction.

In some embodiments, as shown in FIG. 31, the active portion T51rA of the eleventh inverter transistor T51r includes an active portion T51r1A of the fifth inverter sub-transistor T51r1 and an active portion T51r2A of the sixth inverter sub-transistor T51r2. The active portion T51r1A of the fifth inverter sub-transistor T51r1 and the active portion T51r2A of the sixth inverter sub-transistor T51r2 are arranged along the second direction.

In some embodiments, as shown in FIG. 31, the active portion T52rA of the twelfth inverter transistor T52r includes an active portion T52r1A of the seventh inverter sub-transistor T52r1 and an active portion T52r2A of the eighth inverter sub-transistor T52r2. The active portion T52r1A of the seventh inverter sub-transistor T52r1 and the active portion T52r2A of the eighth inverter sub-transistor T52r2 are arranged along the second direction.

In some embodiments, as shown in FIG. 31, the active portion T61rA of the third anti-negative bias transistor T61r includes an active portion T61r1A of the fifth anti-negative bias sub-transistor T61r1 and an active portion T61r2A of the sixth anti-negative bias sub-transistor T61r2. The active portion T61r1A of the fifth anti-negative bias sub-transistor T61r1 and the active portion T61r2A of the sixth anti-negative bias sub-transistor T61r2 are arranged along the second direction.

In some embodiments, as shown in FIGS. 29 and 32, the display panel 2 includes the gate layer 218. The gate layer 218 includes a second portion VGL2b of the second low potential signal line VGL2, a second portion VGH2b of the second high potential signal line VGH2, the second electrode plate C3b of the third capacitor C3, the second electrode plate C4b of the fourth capacitor C4, a second portion VGL3b of the third low potential signal line VGL3, the gate T11rG of the seventh pull-up control transistor T11r, the gate T21rG of the fifth pull-up transistor T21r, the gate T31rG of the seventh pull-down transistor T31r, the gate T41rG of the eighth pull-down transistor T41r, the gate T42rG of the third pull-down maintaining transistor T42r, the gate T51rG of the eleventh inverter transistor T51r, the gate T52rG of the twelfth inverter transistor T52r, the gate T53rG of the thirteenth inverter transistor T53r, the gate T54rG of the fourteenth inverter transistor T54r, the gate T55rG of the fifteenth inverter transistor T55r, the gate T56rG of the sixteenth inverter transistor T56r, and the gate T61rG of the third anti-negative bias transistor T61r.

The gate T53rG of the thirteenth inverter transistor T53r and the gate T54rG of the fourteenth inverter transistor T54r are arranged in sequence along the second direction. The gate T51rG of the eleventh inverter transistor T51r, the gate T41rG of the eighth pull-down transistor T41r, the gate T55rG of the fifteenth inverter transistor T55r, the gate T56rG of the sixteenth inverter transistor T56r, and the gate T11rG of the seventh pull-up control transistor T11r are arranged in sequence along the second direction. The gate T52rG of the twelfth inversion transistor T52r, the gate T42rG of the third pull-down maintaining transistor T42r, the gate T61rG of the third anti-negative bias transistor T61r, and the gate T11rG of the seventh pull-up control transistor T11r are arranged in sequence along the second direction. The second electrode plate C3b of the third capacitor C3 and the gate T21rG of the fifth pull-up transistor T21r are arranged along the second direction. The second electrode plate C4b of the fourth capacitor C4, the gate T53rG of the thirteenth inverter transistor T53r, the gate T51rG of the eleventh inverter transistor T51r, the gate T52rG of the twelfth inverter transistor T52r, the second portion VGL2b of the second low-potential signal line VGL2, the second portion VGH2b of the second high potential signal line VGH2, the gate T21rG of the fifth pull-up transistor T21r, the gate T31rG of the seventh pull-down transistor T31r, and the second portion VGL3b of the third low-potential signal line VGL3 are arranged in sequence along the first direction.

In some embodiments, as shown in FIG. 32, the gate T41rG of the eighth pull-down transistor T41r includes the gate T41r1G of the fifth pull-down sub-transistor T41r1 and the gate T41r2G of the sixth pull-down sub-transistor T41r2. The gate T41r1G of the fifth pull-down sub-transistor T41r1 and the gate T41r2G of the sixth pull-down sub-transistor T41r2 are arranged along the second direction.

In some embodiments, as shown in FIG. 32, the gate of the fifth pull-down maintaining transistor includes the gate T42r1G of the fifth pull-down maintaining sub-transistor T42r1 and the gate T42r2G of the sixth pull-down maintaining sub-transistor T42r2. The gate T42r1G of the fifth pull-down maintaining sub-transistor T42r1 and the gate T42r2G of the sixth pull-down maintaining sub-transistor T42r2 are arranged along the second direction.

In some embodiments, as shown in FIG. 32, the gate T51rG of the eleventh inverter transistor T51r includes the gate T51r1G of the fifth inverter sub-transistor T51r1 and the gate T51r2G of the sixth inverter sub-transistor T51r2. The gate T51r1G of the fifth inverter sub-transistor T51r1 and the gate T51r2G of the sixth inverter sub-transistor T51r2 are arranged along the second direction.

In some embodiments, as shown in FIG. 32, the gate T52rG of the twelfth inverter transistor T52r includes the gate T52r1G of the seventh inverter sub-transistor T52r1 and the gate T52r2G of the eighth inverter sub-transistor T52r2. The gate T52r1G of the seventh inverter sub-transistor T52r1 and the gate T52r2G of the eighth inverter sub-transistor T52r2 are arranged along the second direction.

In some embodiments, as shown in FIG. 32, the gate T61rG of the third anti-negative bias transistor T61r includes the gate T61r1G of the fifth anti-negative bias sub-transistor T61r1 and the gate T61r2G of the sixth anti-negative bias sub-transistor T61r2. The gate T61r1G of the fifth anti-negative bias sub-transistor T61r1 and the gate T61r2G of the sixth anti-negative bias sub-transistor T61r2 are arranged along the second direction.

In some embodiments, as shown in FIGS. 29 and 33, the display panel 2 includes the first source-drain layer 221. The first source-drain layer 221 includes a third portion VGL2c of the second low potential signal line VGL2, a third portion VGH2c of the second high potential signal line VGH2, the second portion C3a2 of the first electrode plate C3a of the third capacitor C3, the first electrode plate C4a of the fourth capacitor C4, a third portion VGL3c of the third low potential signal line VGL3, the first electrode T11rS of the seventh pull-up control transistor T11r, the first electrode T21rS of the fifth pull-up transistor T21r, the first electrode T31rS of the seventh pull-down transistor T31r, the first electrode T41rS of the eighth pull-down transistor T41r, the first electrode T42rS of the third pull-down maintaining transistor T42r, the first electrode T51rS of the eleventh inverter transistor T51r, the first electrode T52rS of the twelfth inverter transistor T52r, the first electrode T53rS of the thirteenth inverter transistor T53r, the first electrode T54rS of the fourteenth inverter transistor T54r, the first electrode T55rS of the fifteenth inverter transistor T55r, the first electrode T56rS of the sixteenth inverter transistor T56r, the first electrode T61rS of the third anti-negative bias transistor T61r, the second electrode T11rD of the seventh pull-up control transistor T11r, the second electrode T21rD of the fifth pull-up transistor T21r, the second electrode T31rD of the seventh pull-down transistor T31r, the second electrode T41rD of the eighth pull-down transistor T41r, the second electrode T42rD of the third pull-down maintaining transistor T42r, the second electrode T51rD of the eleventh inverter transistor T51r, the second electrode T52rD of the twelfth inverter transistor T52r, the second electrode T53rD of the thirteenth inverter transistor T53r, the second electrode T54rD of the fourteenth inverter transistor T54r, the second electrode of the fifteenth inverter transistor T55r, the second electrode T56rD of the sixteenth inverter transistor T56r, and the second electrode T61rD of the third anti-negative bias transistor T61r.

The first electrode T53rS of the thirteenth inverter transistor T53r and the first electrode T54rS of the fourteenth inverter transistor T54r are arranged in sequence along the second direction. The first electrode T51rS of the eleventh inverter transistor T51r, the first electrode T41rS of the eighth pull-down transistor T41r, the first electrode T55rS of the fifteenth inverter transistor T55r, the first electrode T56rS of the sixteenth inverter transistor T56r, and the first electrode T11rS of the seventh pull-up control transistor T11r are arranged in sequence along the second direction. The first electrode T52rS of the twelfth inverter transistor T52r, the first electrode T42rS of the third pull-down maintaining transistor T42r, the first electrode T61rS of the third anti-negative bias transistor T61r, and the first electrode T11rS of the seventh pull-up control transistor T11r are arranged in sequence along the second direction. The second portion C3a2 of the first electrode plate C3a of the third capacitor C3 and the first electrode T21rS of the fifth pull-up transistor T21r are arranged along the second direction. The first electrode plate C4a of the fourth capacitor C4, the first electrode T53rS of the thirteenth inverter transistor T53r, the first electrode T51rS of the eleventh inverter transistor T51r, the first electrode T52rS of the twelfth inverter transistor T52r, the third portion VGL2c of the second low-potential signal line VGL2, the third portion VGH2c of the second high potential signal line VGH2, the first electrode T21rS of the fifth pull-up transistor T21r, the first electrode T31rS of the seventh pull-down transistor T31r, and the third portion VGL3c of the third low potential signal line VGL3 are arranged in sequence along the first direction.

In some embodiments, in the circuit diagram of the embodiments of the present disclosure, to illustrate the connection relationships of each transistor, each transistor has the gate, the first electrode, and the second electrode. However, during the actual design process, in order to reduce the space occupied by the transistors, the electrodes of some transistors are formed using the same structure. It can be understood that this structure can be regarded as the electrodes of two transistors. Similarly, the structure of the electrodes of other transistors can be determined.

In some embodiments, as shown in FIGS. 29 to 33, the first portion C3a1 of the first electrode plate C3a of the third capacitor C3 is connected to the second portion C3a2 of the first electrode plate C3a of the third capacitor C3.

In some embodiments, as shown in FIGS. 29 to 33, the third portion VGL2c of the second low potential signal line VGL2 is connected to the second portion VGL2b of the second low potential signal line VGL2 and the first portion VGL2a of the second low potential signal line VGL2. The third portion VGH2c of the second high potential signal line VGH2 is connected to the second portion VGH2b of the second high potential signal line VGH2 and the first portion VGH2a of the second high potential signal line VGH2. The third portion VGL3c of the third low potential signal line VGL3 is connected to the second portion VGL3b of the third low potential signal line VGL3 and the first portion VGL3a of the third low potential signal line VGL3.

In some embodiments, as shown in FIG. 33, the first source-drain layer 221 includes the first electrode T41r1S of the fifth pull-down sub-transistor T41r1, the second electrode T41r1D of the fifth pull-down sub-transistor T41r1, the first electrode of the sixth pull-down sub-transistor T41r2, the second electrode T41r2D of the sixth pull-down sub-transistor T41r2, the first electrode T41r1S of the fifth pull-down sub-transistor T41r1, the second electrode T41r1D of the fifth pull-down sub-transistor T41r1, and the second electrode T41r2D of the sixth pull-down sub-transistor T41r2 arranged in sequence along the second direction.

In some embodiments, as shown in FIG. 33, the first source-drain layer 221 includes the first electrode T42r1S of the fifth pull-down maintaining sub-transistor T42r1, the second electrode T42r1D of the fifth pull-down maintaining sub-transistor T42r1, the first electrode T42r2S of the sixth pull-down maintaining sub-transistor T42r2, and the second electrode T42r2D of the sixth pull-down maintaining sub-transistor T42r2. The second electrode T42r2D of the sixth pull-down maintaining sub-transistor T42r2, the first electrode T42r2S of the sixth pull-down maintaining sub-transistor T42r2, and the first electrode T42r1S of the fifth pull-down maintaining sub-transistor T42r1 are arranged in sequence along the second direction.

In some embodiments, as shown in FIG. 33, the first source-drain layer 221 includes the first electrode T51*r*1S of the fifth inverter sub-transistor T51*r*1, the second electrode T51*r*1D of the fifth inverter sub-transistor T51*r*1, the first electrode of the sixth inverter sub-transistor T51*r*2, the second electrode T51*r*2D of the sixth inverter sub-transistor T51*r*2, the first electrode T51*r*1S of the fifth inverter sub-transistor T51*r*1, the second electrode T51*r*1D of the fifth inverter sub-transistor T51*r*1, and the first electrode of the sixth inverter sub-transistor T51*r*2 arranged in sequence along the second direction.

In some embodiments, as shown in FIG. 33, the first source-drain layer 221 includes the first electrode T52*r*1S of the seventh inverter sub-transistor T52*r*1, the second electrode T52*r*1D of the seventh inverter sub-transistor T52*r*1, the first electrode T52*r*2S of the eighth inverter sub-transistor T52*r*2, the second electrode T52*r*2D of the eighth inverter sub-transistor T52*r*2, the first electrode T52*r*1S of the seventh inverter sub-transistor T52*r*1, the second electrode T52*r*1D of the seventh inverter sub-transistor T52*r*1, and the first electrode T52*r*2S of the eighth inverter sub-transistor T52*r*2 arranged in sequence along the second direction.

In some embodiments, as shown in FIG. 33, the first source-drain layer 221 includes the first electrode of the fifth anti-negative bias sub-transistor T61*r*1, the second electrode T61*r*1D of the fifth anti-negative bias sub-transistor T61*r*1, the first electrode T61*r*2S of the sixth anti-negative bias sub-transistor T61*r*2, the second electrode T61*r*2D of the sixth anti-negative bias sub-transistor T61*r*2, the second electrode T61*r*1D of the fifth anti-negative bias sub-transistor T61*r*1, the second electrode T61*r*2D of the sixth anti-negative bias sub-transistor T61*r*2, and the first electrode T61*r*2S of the sixth anti-negative bias sub-transistor T61*r*2 arranged in sequence along the second direction.

In some embodiments, the signals output from the first low potential signal line VGL1, the second low potential signal line VGL2, and the third low potential signal line VGL3 may be different.

In some embodiments, the signals output from the first high potential signal line VGH1 and the second high potential signal line VGH2 may be different.

In some embodiments, the first signal output terminal Gn[m] of the first-type gate circuit 22*a* of another stage may be the first signal output terminal of the first-type gate circuit 22*a* of next stages. For example, the first signal output terminal Gn[m] of the first-type gate circuit 22*a* of another stage may be the first signal output terminal of the first-type gate circuit 22*a* of next stages. Taking n as 3 as an example, m can be 4. However, the embodiments of the present disclosure are not limited thereto. The first signal output terminal Gn[m] of the first-type gate circuit 22*a* of another stage may be the first signal output terminal of the first-type gate circuit 22*a* of next two stages or the first signal output terminal of the first-type gate circuit 22*a* of other stages.

In some embodiments, the above embodiments take some transistors including two sub-transistors as an example. However, the embodiments of the present disclosure are not limited thereto, and each transistor may only include one sub-transistor.

In some embodiments, as shown in FIG. 4, FIG. 4 provides a pixel driving circuit 21 of the display panel 2. The pixel driving circuit 21 includes a driving transistor T1, a switching transistor T2, a reset transistor T3, and an initialization transistor T4. The driving transistor T1, the switching transistor T2, and the reset transistor T3 are connected to a first pixel node g. The driving transistor T1 and the initialization transistor T4 are connected to a second pixel node s.

A gate of the switching transistor T2 is electrically connected to the first signal output terminal Gn[n] of the first-type gate circuit 22*a* of the current stage. A gate of the initialization transistor T4 is electrically connected to the second signal output terminal INI[n] of the second-type gate circuit 22*b* of the current stage. A gate of the reset transistor T3 is electrically connected to the third signal output terminal REF[n] of the third-type gate circuit 22*c* of the current stage. The gate of the switching transistor, the gate of the initialization transistor, and the gate of the reset transistor are electrically connected to the first signal output terminal Gn[n] of the first-type gate circuit 22*a* of the current stage, the second signal output terminal INI[n] of the second-type gate circuit 22*b* of the current stage, and the third signal output terminal REF[n] of the third-type gate circuit 22*c* of the current stage, signals can be input to the pixel driving circuit 21 through the gate driving circuit 22, so that the pixel driving circuit 21 works normally.

In some embodiments, as shown in FIG. 2, the display panel 2 further includes a light-emitting device LED. A gate of the driving transistor T1 is connected to the first node g. A first electrode of the driving transistor T1 is connected to a high potential power line VDD. A second electrode of the driving transistor T1 is connected to the second node s. A first electrode of the switching transistor T2 is connected to a data line Vdata. A second electrode of the switching transistor T2 is connected to the first node g. A first electrode of the reset transistor T3 is connected to a reference line Vref. A second electrode of the reset transistor T3 is connected to the first node g. A first electrode of the initialization transistor T4 is connected to an initialization signal line Vini. A second electrode of the initialization transistor T4 is connected to a positive electrode of the light-emitting device LED. A negative electrode of the light-emitting device LED is connected to a low potential power line VSS.

In some embodiments, it can be understood that the display panel 2 includes the plurality of rows of sub-pixels. Correspondingly, the plurality of stages of pixel driving circuits 21 are provided to drive each of the sub-pixels. Correspondingly, the plurality of stages of gate driving circuits 22 are provided. Each stage of the gate driving circuits 22 can be connected to a corresponding one or two rows of the pixel driving circuits 21.

In some embodiments, the type of each transistor in the gate driving circuit 22 in the embodiments of the present disclosure can be an N-type transistor or a P-type transistor. The type of each transistor in the pixel driving circuit 21 in the embodiments of the present disclosure can be an N-type transistor or a P-type transistor.

In some embodiments, the active portion of each transistor in the gate driving circuit 22 in the embodiments of the present disclosure may be formed using the active layer 216. The active portion of each transistor in the pixel driving circuit 21 in the embodiments of the present disclosure can be formed by the semiconductor layer 214, or can be partially formed by the semiconductor layer 214 and partially formed by the active layer 216.

In some embodiments, the first electrode can be the source and the second electrode can be the drain. Alternatively, the first electrode is the drain and the second electrode is the source.

The above-described embodiments describe the display panel 2 in detail from aspects of circuit, timing, transistor design, and the like of the display panel 2. It can be understood that when there is no conflict in the embodiments, the embodiments can be combined. For example, in the first direction, the second reset control line is arranged between the first reset control line and the third low potential signal line, and the low-frequency signal line is arranged between the first reset control line and the third low potential signal line.

Moreover, the embodiments of the present disclosure provide a display device. The display device includes the display panel 2 as described in any of the above embodiments.

The display panel and the display device are provided by the embodiments of the present disclosure. In the display panel, at least one of the first clock signal line, the second clock signal line, the third clock signal line, the first high potential signal line, the second high potential signal line, the first low potential signal line, the second low potential signal line, the second reset control line, and the low-frequency signal line is arranged between the first reset control line and the third low potential signal line in the first direction. Each of the signal lines arranged between the first reset control line and the third low potential signal line can be directly connected to a corresponding one of the transistors without occupying a space of the wiring regions of the gate driving circuits. Furthermore, a space occupied by transistor regions of the gate driving circuits can be reduced, a space occupied by the gate driving circuits can be reduced, and the bezel of the display panel can be reduced.

In the description of the present disclosure, it is to be understood that the terms “first”, “second” and the like are used for descriptive purposes only and are not to be construed as indicating or implying relative importance or implying an amount of indicated technical features. Thus, a feature defined with “first” or “second” may include one or more features, either explicitly or implicitly. In the description of this application, “plurality” means two or more, unless expressly and specifically defined otherwise.

In the above described embodiments, the description of each embodiment has its own emphasis, and parts not described in detail in a certain embodiment may be referred to the related description of other embodiments.

The embodiments, implementations and related technical features of the present disclosure can be combined and replaced with each other without conflict.

The above embodiments are merely preferred embodiments of the present disclosure, and do not limit the present disclosure in any form. Any simple modifications, equivalent changes, and modifications made to the above embodiments according to the technical essence of the present disclosure without departing from the content of the technical proposal of the present disclosure still fall within the scope of the technical proposal of the present disclosure.

What is claimed is:

1. A display panel, comprising:

a plurality of rows of pixels comprising light-emitting devices and pixel driving circuits; and a plurality of stages of gate driving circuits, wherein each of the plurality of stages of the gate driving circuits is electrically connected to a corresponding one of the pixel driving circuits and comprises:

a first-type gate circuit electrically connected to at least a first clock signal line, a second clock signal line, a first high potential signal line, a first low potential signal line, a second low potential signal line, a first reset control line, and a low-frequency signal line;

a second-type gate circuit electrically connected to at least the first high potential signal line, the second low potential signal line, a third clock signal line, and a second reset control line; and a third-type gate circuit electrically connected to at least the first high potential signal line, a second high potential signal line, the second low potential signal line, and a third low potential signal line;

wherein the first reset control line, the first-type gate circuit, the second-type gate circuit, the third-type gate circuit, and the third low potential signal line are arranged along a first direction, and in the first direction, at least one of the first clock signal line, the second clock signal line, the third clock signal line, the first high potential signal line, the second high potential signal line, the first low potential signal line, the second low potential signal line, the second reset control line, and the low-frequency signal line is arranged between the first reset control line and the third low potential signal line.

2. The display panel according to claim 1, wherein in the first direction, at least one of the first clock signal line, the second clock signal line, and the third clock signal line is arranged between the first reset control line and the third low potential signal line.

3. The display panel according to claim 2, wherein in the first direction, the first clock signal line and the second clock signal line are arranged between the first reset control line and the third low potential signal line.

4. The display panel according to claim 3, wherein in the first direction, the first clock signal line and the second clock signal line are arranged between the first reset control line and the second-type gate circuit.

5. The display panel according to claim 4, wherein the first-type gate circuit comprises a first pull-up control module and a first pull-up module, the first pull-up control module is electrically connected to the first pull-up module at a first pull-up node, the second clock signal line comprises a first group of sub-lines and a second group of sub-lines, and the first pull-up module comprises:

a first pull-up transistor, wherein an electrode of the first pull-up transistor is electrically connected to the first clock signal line;

a second pull-up transistor, wherein an electrode of the second pull-up transistor is electrically connected to the first group of sub-lines; and a third pull-up transistor, wherein an electrode of the third pull-up transistor is electrically connected to the second group of sub-lines; and wherein the first pull-up transistor, the second pull-up transistor, and the third pull-up transistor are arranged in sequence along the first direction, and in the first direction, the first clock signal line is arranged between the first pull-up control module and the first pull-up transistor, the first group of sub-lines is arranged between the first pull-up transistor and the second pull-up transistor, and the second group of sub-lines is arranged between the second pull-up transistor and the third pull-up transistor.

6. The display panel according to claim 2, wherein in the first direction, the third clock signal line is arranged between the first reset control line and the third low potential signal line.

7. The display panel according to claim 6, wherein in the first direction, the third clock signal line is arranged between the first-type gate circuit and the third-type gate circuit.

8. The display panel according to claim 7, wherein the second-type gate circuit comprises a second pull-up control module and a second pull-up module, the second pull-up control module is electrically connected to the second pull-up module at a second pull-up node, and the second pull-up module is electrically connected to the third clock signal line; and wherein in the first direction, the third clock signal line is arranged between the second pull-up control module and the second pull-up module.

9. The display panel according to claim 1, wherein in the first direction, the first high potential signal line is arranged between the first reset control line and the third low potential signal line, and/or the second high potential signal line is arranged between the first reset control line and the third low potential signal line.

10. The display panel according to claim 9, wherein the first-type gate circuit comprises a first pull-up control module electrically connected to the first high potential signal line; and wherein in the first direction, the first high potential signal line is arranged between the first reset control line and the first pull-up control module.

11. The display panel according to claim 9, wherein the third-type gate circuit comprises a third pull-up control module and a third pull-up module, the third pull-up control module is electrically connected to the third pull-up module at a third pull-up node, and the third pull-up module is electrically connected to the second high potential signal line; and wherein in the first direction, the second high potential signal line is arranged between the third pull-up control module and the third pull-up module.

12. The display panel according to claim 1, wherein in the first direction, the first low potential signal line is arranged between the first reset control line and the third low potential signal line, and/or the second low potential signal line is arranged between the first reset control line and the third low potential signal line.

13. The display panel according to claim 12, wherein the first-type gate circuit comprises a first pull-down maintaining module electrically connected to the first low potential signal line; and wherein in the first direction, the first low potential signal line is arranged between the first pull-down maintaining module and the second-type gate circuit.

14. The display panel according to claim 12, wherein the third-type gate circuit comprises a third pull-down maintaining module electrically connected to the second low potential signal line; and wherein in the first direction, the second low potential signal line is arranged between the third pull-down maintaining module and the third low potential signal line.

15. The display panel according to claim 1, wherein in the first direction, the second reset control line is arranged between the first reset control line and the third low potential signal line, and/or the low-frequency signal line is arranged between the first reset control line and the third low potential signal line.

16. The display panel according to claim 15, wherein the second-type gate circuit comprises a second reset module electrically connected to the second reset control line; and wherein in the first direction, the second reset control line is arranged between the second reset module and the first-type gate circuit.

17. The display panel according to claim 15, wherein the first-type gate circuit comprises a first inverter module electrically connected to the low-frequency signal line; and wherein in the first direction, the low-frequency signal line is arranged between the first inverter module and the second-type gate circuit.

18. A display panel according to claim 1, wherein the first-type gate circuit comprises a first pull-up control module and a first pull-up module electrically connected to each other, and the first pull-up module comprises a first pull-up transistor, a second pull-up transistor, and a third pull-up transistor;

wherein the second-type gate circuit comprises a second pull-up control module and a second pull-up module electrically connected to each other;

wherein the third-type gate circuit comprises a third pull-up control module and a third pull-up module electrically connected to each other;

wherein the second clock signal line comprises a first group of sub-lines and a second group of sub-lines; and wherein in the first direction, the first reset control line, the first high potential signal line, the first pull-up control module, the first low potential signal line, the low-frequency signal line, the first clock signal line, the first pull-up transistor, the first group of sub-lines, the second pull-up transistor, the second group of sub-lines, the third pull-up transistor, the second reset control line, the second pull-up control module, the third clock signal line, the second pull-up module, the third pull-up control module, the second low potential signal line, the second high potential signal line, the third pull-up module, and the third low potential signal line are arranged in sequence.

19. The display panel according to claim 18, further comprising:

a substrate;

a light shielding layer disposed on a side of the substrate;

a gate layer disposed on a side of the light shielding layer away from the substrate; and a first source-drain layer disposed on a side of the gate layer away from the light shielding layer;

wherein at least one of the first clock signal line, the second clock signal line, the third clock signal line, the first high potential signal line, the second high potential signal line, the first low potential signal line, the second low potential signal line, the third low potential signal line, the first reset control line, the second reset control line, and the low-frequency signal line comprises a first portion, a second portion, and a third portion, the first portion is disposed in the light shielding layer, the second portion is disposed in the gate layer, the third portion is disposed in the first source-drain layer, and each of the first portion, the second portion, and the third portion extends along a second direction;

wherein in each of the plurality of stages of the gate driving circuits, the first portion is continuous, the second portion is disconnected, and the third portion is disconnected, and wherein the first portion is connected to the third portion, and the second portion is connected to the third portion; and wherein an angle between the first direction and the second direction is greater than 0 degrees and less than or equal to 90 degrees.

20. A display device, comprising a display panel, wherein the display panel comprises:

a plurality of rows of pixels comprising light-emitting devices and pixel driving circuits; and a plurality of stages of gate driving circuits, wherein each of the plurality of stages of the gate driving circuits is electrically connected to a corresponding one of the pixel driving circuits and comprises:

a first-type gate circuit electrically connected to at least a first clock signal line, a second clock signal line, a first high potential signal line, a first low potential signal line, a second low potential signal line, a first reset control line, and a low-frequency signal line;

a second-type gate circuit electrically connected to at least the first high potential signal line, the second low potential signal line, a third clock signal line, and a second reset control line; and a third-type gate circuit electrically connected to at least the first high potential signal line, a second high potential signal line, the second low potential signal line, and a third low potential signal line;

wherein the first reset control line, the first-type gate circuit, the second-type gate circuit, the third-type gate circuit, and the third low potential signal line are arranged along a first direction, and in the first direction, at least one of the first clock signal line, the second clock signal line, the third clock signal line, the first high potential signal line, the second high potential signal line, the first low potential signal line, the second low potential signal line, the second reset control line, and the low-frequency signal line is arranged between the first reset control line and the third low potential signal line.

* * * * *